(12) United States Patent
Noble, Jr. et al.

(10) Patent No.: US 8,535,059 B1
(45) Date of Patent: Sep. 17, 2013

(54) LEARNING MANAGEMENT SYSTEM FOR CALL CENTER AGENTS

(71) Applicant: Noble Systems Corporation, Atlanta, GA (US)

(72) Inventors: James K. Noble, Jr., Marietta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 13/624,023

(22) Filed: Sep. 21, 2012

(51) Int. Cl.
*G09B 19/00* (2006.01)

(52) U.S. Cl.
USPC .................. 434/219; 379/265.05; 379/265.06

(58) Field of Classification Search
USPC .............. 434/219, 350, 322, 323; 379/93.12, 379/265.05, 265.06, 265.12
See application file for complete search history.

(56) References Cited

U.S. PATENT DOCUMENTS

| | | | |
|---|---|---|---|
| 5,270,920 A * | 12/1993 | Pearse et al. | 705/7.16 |
| 6,157,808 A * | 12/2000 | Hollingsworth | 434/350 |
| 6,301,573 B1 | 10/2001 | McIlwaine et al. | |
| 6,324,282 B1 | 11/2001 | McIllwaine et al. | |
| 6,459,787 B2 | 10/2002 | McIllwaine et al. | |
| 6,628,777 B1 | 9/2003 | McIllwaine et al. | |
| 6,775,377 B2 | 8/2004 | McIllwaine et al. | |
| 7,043,193 B1 | 5/2006 | Vashi et al. | |
| 7,158,628 B2 | 1/2007 | McConnell et al. | |
| 7,174,010 B2 | 2/2007 | McIlwaine et al. | |
| 7,660,407 B2 | 2/2010 | Fama | |
| 7,801,055 B1 | 9/2010 | Blair | |
| 7,826,608 B1 | 11/2010 | Peleg | |
| 8,108,237 B2 | 1/2012 | Bourne et al. | |
| 8,112,306 B2 | 2/2012 | Lyerly et al. | |
| 8,117,064 B2 | 2/2012 | Bourne et al. | |
| 8,402,070 B2 | 3/2013 | Szlam et al. | |
| 2004/0165717 A1 | 8/2004 | McIlwaine et al. | |
| 2004/0202258 A1 | 10/2004 | Baggenstoss | |
| 2004/0202309 A1 | 10/2004 | Baggenstoss et al. | |
| 2005/0175971 A1 | 8/2005 | McIlwaine et al. | |
| 2006/0072739 A1 | 4/2006 | Baggenstoss et al. | |
| 2006/0111953 A1 * | 5/2006 | Setya | 705/8 |
| 2006/0233346 A1 * | 10/2006 | McIlwaine et al. | 379/265.02 |
| 2006/0256953 A1 | 11/2006 | Pulaski et al. | |
| 2006/0256954 A1 | 11/2006 | Patel et al. | |
| 2007/0088563 A1 * | 4/2007 | Nardotti et al. | 705/1 |
| 2007/0111180 A1 * | 5/2007 | Sperle et al. | 434/350 |
| 2007/0127689 A1 | 6/2007 | McIlwaine et al. | |
| 2007/0195944 A1 | 8/2007 | Korenblit et al. | |
| 2007/0195945 A1 | 8/2007 | Korenblit | |

(Continued)

OTHER PUBLICATIONS

Noble Systems Corporation, NobleWFM 2010.0.0 User Guide, Mar. 28, 2011, 324 pages, Atlanta, GA.

(Continued)

*Primary Examiner* — Bruk Gebremichael

(57) ABSTRACT

A learning management system provides e-learning to call center agents. Agents can receive training provided in various training formats, which are characterized as fixed-time, flex-time, human-initiated, or system-initiated. A training process flow illustrates how the various training formats can be provided using processes involving agent selection, registration, scheduling, content delivery, and post-training reporting. A modular system provides the training flow and coordinates the function of various call center components to provide training in a seamless and integrated manner using existing call center scheduling systems, such as workflow management components.

8 Claims, 28 Drawing Sheets

(56) References Cited

U.S. PATENT DOCUMENTS

2007/0198322 A1    8/2007  Bourne et al.
2007/0198325 A1    8/2007  Lyerly
2007/0198330 A1*   8/2007  Korenblit et al. ............... 705/11

OTHER PUBLICATIONS

Noble Systems Corporation, ShiftTrack Plus User Manual 5.5.0, Jun. 2010, 1281 pages, Atlanta, GA.

* cited by examiner

|  | Fixed-Time Training | | Flex-Time Training | |
| --- | --- | --- | --- | --- |
| Parameter | Conventionally Scheduled Training | Automatically Scheduled Training | Snippet Training | On-Demand Training |
| 1. Course ID | Beginning Skills 101 | Beginning Skills 202 | Call Skills Reminders | Improving Selling Skills |
| 2. Agent Identifier | Jane Doe | Jane Doe | Jane Doe | Jane Doe |
| 3. Training Format | CST | AST | Snippet | On-Demand |
| 4. Duration of Course | 30 min. | 30 min. | 5 min | 30 min. |
| 5. Scheduled Date/Time | 7/12/2012; 2:00 p.m. | 7/14/2012; 2:00 p.m. | N.A. | N.A. |
| 6. Course Completion Date | 7/12/2012 | 7/16/2012 | N.A. | 7/12/2012 |
| 7. Facilities Based | No | No | No | No |
| 8. Course Series Indicator | 1 of 1 | 1 of 1 | 1 of 1 | 1 of 2 |
| 9. Bookmarkable | Yes | No | Yes | Yes |
| 10. Completion Status | Not Completed | Not Completed | Not Completed | Not Completed |
| 11. Start Status | Not Started | Not Started | Not Started | Started |
| 12. Training Scheduled By | Administrator 1 | System | N.A. | N.A. |
| 13. Training Format for Remaining Portion of Course | On-Demand | Automatic | Snippet | On-Demand |

FIG. 10

LEARNING MANAGEMENT SYSTEM FOR CALL CENTER AGENTS

BACKGROUND

Call centers often employ a number of agents for handling inbound and outbound calls. The nature and purpose of the calls may vary greatly over a short time. For example, outbound calling campaigns may involve originating calls to collect debts, solicit donations for a non-profit organization, or offer new products for sale. Agents assigned to these campaigns must be familiar with the appropriate debt collection practices, the non-profit organization for which donations are sought, or the products being offered for sale. These same agents may also be involved in handling inbound calls, and may be required to answer questions associated with various products, customers seeking service, etc. These agents must be trained in a variety of areas, including trained in operating the call center computer workstations, interacting with other customer information systems for updating customer records, researching product features, or for being familiar with guidelines and policies associated with a telemarketing campaign. Additionally, it is not uncommon for employee turnover in call centers to be relatively high, requiring continual training of new agents.

Training of the agents is important, since training increases their effectiveness. Failure to train an agent can result in a poor customer service, loss of revenue, and other adverse impacts. Thus, an efficient and effective infrastructure for training call agents is necessary.

Training systems for providing computer-based learning allow each agent to receive training in a manner that suits the agent's schedule. Some training systems are designed to be locally executed on the agent's computer while other training systems can be hosted on a server and provided to the agent via network interconnection.

However, such training systems are not integrated into the call center infrastructure and cause additional administrative burdens to coordinate training between the agent, call handling systems, and the training infrastructure. Thus, the administration process of accomplishing agent training is distinct from scheduling the agent for their work schedule, and when the training break arrives, the agent cannot seamlessly transition from handling calls to receiving training, and vice versa. This can increase the complexity and cost for the call center provider, in addition complicating the administration of training both for the call center administrator as well as the agent.

Thus, an integrated approach for administering training to call center agents is required, and it is in regard to this and other aspects that the present disclosure is presented.

BRIEF SUMMARY

Technologies are generally presented herein pertaining to a learning management system for providing training courses, which can be provided to call center agents in one embodiment. Various training formats are accommodated that can be categorized as being flex-time or fixed-time, and further categorized as being initiated by a human or by a computer system. The provision of training is described as a training flow that may include various processes depending on the training format of the training course. These processes may include, in one embodiment, an agent selection process, a registration process, a scheduling process, a content delivery process, and a post-training reporting process. These processes may be coordinated by a workflow manager that, in part, determines which processes are involved in the training flow.

The above processes may generate and/or modify data in an agent training list. The agent training list may include training context data that may be used by the various processes to perform training related operations as appropriate for the specific training format. For example, the training context data may be used to indicate whether a course can be suspended and resumed, or how the training content delivery is to be initiated.

An architecture for one embodiment is disclosed involving components found in a call center, and which may include: a call handling system, a workflow manager, an agent's workstation, various databases, and an e-learning module that may be incorporated in a e-learning system or in another system. The e-learning module may comprise further modules including, but not limited to: one or more an agent selection modules, a registration module, a schedule module, an interface module to a content delivery system, a post-training reporting module, a course data and training management module. A workflow manager coordinates operation involving the above modules.

The architecture uses various data structures that allow appropriate information to be maintained about the training status and how courses are to be provided to agent. The architecture allows training to be provided to agents in a flexible and adaptable manner, and allows various levels of integration with operation of the call center components.

The subject matter disclosed herein may be implemented as a computer-controlled apparatus, a computer process, a computing system, or as an article of manufacture such as a computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIG. 10 illustrates one embodiment of training context data;

FIG. 25 is an exemplary schematic diagram of a server used in one embodiment of the call center architecture to practice the technologies disclosed herein; and.

DETAILED DESCRIPTION

Figure 1:
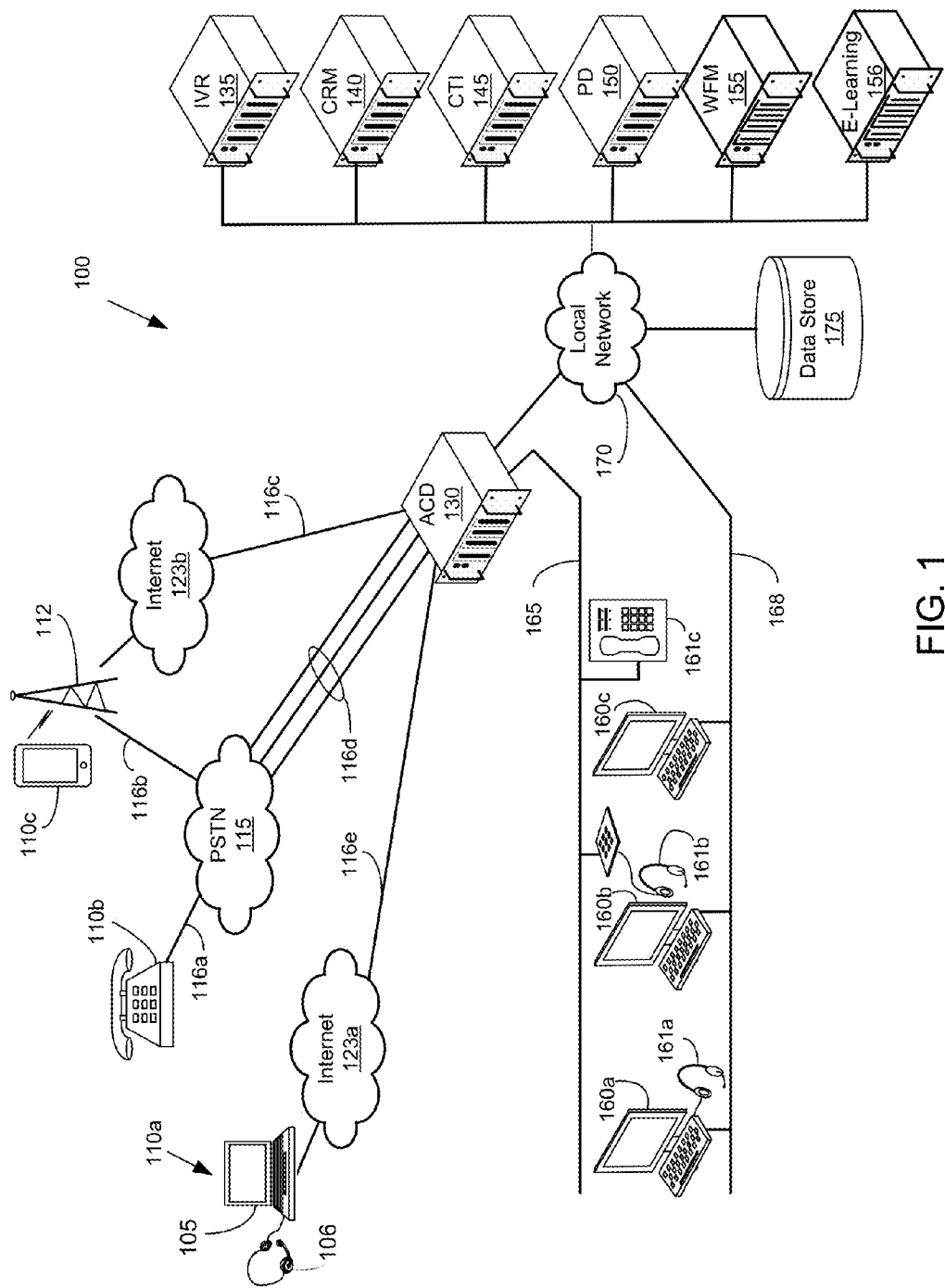
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed herein are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

FIG. 1 shows one embodiment of a call center architecture 100 illustrating the various technologies disclosed herein. The call center shown in FIG. 1 may process voice calls that are inbound-only, outbound-only, or a combination of both (sometimes referred to as a "blended" call center). Although many aspects of call center operation is disclosed in the context of voice calls, the call center may process other forms of communication such as facsimiles, emails, text messages, video calls, chat messages, and other forms. Since the call center may handle calls originating from a calling party, or initiated to a called party, the term "party" without any further qualification refers to a person associated with a call processed by the call center, where the call is either received from or placed to the party. The term "caller," if used, may generally refer to a party calling the call center, but in many cases this usage is exemplary. Thus, use of the term "caller" is not intended to necessarily limit the concepts herein to only inbound calls unless the context dictates such.

Inbound voice calls may originate from calling parties using a variety of phone types. A calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of a call.

Inbound voice calls may also originate from a mobile device 110c, such as a smart phone or tablet, which wirelessly communicates with a mobile service provider ("MSP") 112. The voice calls may be routed to the PSTN 115 using an integrated services digital network ("ISDN") interface 116b or other types of interfaces that are well known to those skilled in the art. The MSP 112 may also route calls as packetized voice, referred to herein as voice-over-IP ("VoIP") to an Internet provider 123a using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" as referred to herein is not limited to time-division multiplexing ("TDM") technology.

Voice calls may also originate from a calling party employing a so-called "IP phone," "VoIP phone," or "soft phone" 110a. In one embodiment, this device may comprise a computing device 105, such as a laptop, desktop, or computing tablet, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, conventional telephone, 110b, a mobile device 110c, or other device known in the art. The term "call" as used herein may mean an active instance of two-way communication, an attempt to establish two-way communication, or a portion of the two-way communication. For example, a user at a conventional telephone 110b can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, e.g., text messages, video chat, facsimile, etc.

Inbound calls from callers to the call center may be received at an automatic call distributor ("ACD") 130. The ACD 130 may be a specialized switch for receiving and routing inbound calls under various conditions. The ACD 130 may be embodied as a dedicated form of equipment readily available from various manufacturers, or the ACD 130 can be a so-called "soft switch" comprising a suitable programming module executed by a processing device to perform the necessary functions. The ACD 130 may route an incoming call over call center facilities 165 to an available agent. The facilities 165 may be any suitable technology for conveying the call, including, but not limited to, a local area network ("LAN"), wide area network ("WAN"), ISDN, or conventional TDM circuits. The facilities 165 may be the same or different from the facilities used to transport the call to the ACD 130.

Calls may be routed over facilities 165 to an agent for servicing. That is, the party may speak with an agent for receiving, for example, customer service. The physical area at which the agent sits is often referred to as an agent "position" and these positions are often grouped into clusters that are managed by a supervisor, who may monitor calls and the agents' productivity. An agent usually uses a computing device, such as a computer 160a-160c and a voice device 161a-161c. The combination of computer and voice device may be referred to as a "workstation." Thus, the workstation collectively has a data capability and a voice capability, though separate devices may be used. In some instances, "workstation" may be used in reference to specifically either the data or voice capability at the agent's position, as appropriate to the context. For example, "routing the call to the agent's workstation" means routing a call to one of the voice devices 161a-161c at the agent's position. Similarly, "routing the call to the agent" means routing a call to the appropriate equipment at an agent's position.

The voice device used by an agent may be a soft phone device exemplified by a headset 161a connected to the computer 160a. The soft phone may be virtual telephone implemented in part by an application program executing in a computer. The phone may also comprise an Internet Protocol ("IP") based headset 161b or a conventional phone 161c. Use of the term "phone" is intended to encompass all these types of voice devices used by an agent, unless indicated otherwise.

An agent typically logs onto their workstation prior to handling calls. This allows the call center to know which agents are available for handling calls. The ACD 130 may also maintain data of an agent's skill level that is used to route a specific call to the agent, or group of agents having the same skill level. If a suitable agent is not available to handle a call, the ACD 130 may queue the call for the next available agent. As can be expected, various algorithms may be employed to process calls in an efficient manner.

Two types of signaling information may be provided with the inbound call that the ACD 130 uses in processing the call. The first type of signaling information indicates the telephone number dialed by the caller, and is frequently referred to as "DNIS," derived from the Dialed Number Identification Service associated with this capability. A call center may provide various services, such as sales, customer service, technical support, etc., each of which may be associated with a different telephone number (e.g., multiple toll free "800" numbers). The DNIS can be used by the ACD 130 to determine the purpose of the call, and potentially identify a group of agents having the appropriate skill level to handle the call. The ACD 130 may prioritize and route calls to an agent based on the required skill level. Skills-based routing may be a rule-based set of instructions that the ACD 130 uses to handle calls. Skills-based routing may be implemented by the ACD 130, or by the ACD 130 interacting with a computer-telephone integrated ("CTI") server 145.

The CTI server 145 may be incorporated in a call center to control and/or coordinate other components of the call center architecture 100. Specifically, the CTI server may interact with the ACD 130 to coordinate call processing. Thus, in some embodiments, the CTI server 145 may control the routing of calls from the ACD 130 to the various agent workstations and/or provide data to other components processing the call. The CTI server 145 may also provide call reporting functionality based on data collected during calls.

The second type of signaling information that may be provided with an inbound call is the calling telephone number, often referred to as automatic number identification or "ANI." In one configuration, the ACD 130 and/or CTI server 145 may use the ANI of an incoming call to retrieve caller information from a data store 175 and provide the data to the agent's workstation computer along with routing the call to the agent's workstation phone. For example, the ANI can also be used to ascertain a party's status (e.g., a "Gold Level" customer warranting premium service) to facilitate the ACD 130 routing the call to a select group of agents. The data store 175 can be a database storing records of caller information. The data store 175 can be integrated with the CTI server 145, the ACD 130, or segregated as a standalone database. Thus, the call and associated call data retrieved from the data store 175 are presented at the agent's headset 161b and their computer 160b. In other embodiments, data may be stored in the data store 175 by the agent, ACD, or other entity.

The ACD 130 may place a call in a queue if there are no suitable agents available, or it may route the call to an interactive voice response server ("IVR") 135 to play voice prompts. These prompts may be in a menu type structure and the IVR 135 may collect and analyze responses from the party in the form of dual-tone multiple frequency ("DMTF") tones and/or speech. The IVR 135 may be used to further identify the purpose of the call to the CTI server 145, such as prompting the party to enter account information, or otherwise obtain information used to service the call. The IVR 135 may interact with other servers, such as the CTI server 145 or the data store 175, in order to retrieve or provide information for processing the call. In other configurations, the IVR 135 may be used to only provide announcements.

The interaction between the ACD 130, IVR 135, CTI server 145, agent computers 160a-160c, as well as other components, may involve using a local area network ("LAN") 170. Other communication configurations are possible, such as, but not limited to, using a wide area network, wireless network, router, bridge, direct point-to-point links, etc.

When an agent is interacting with a called or calling party, the agent may use their workstation computer 160b to further interact with other enterprise computing systems, such as a customer relationship management ("CRM") server 140. A CRM server 140 may be used to integrate information from various enterprise business systems to facilitate the agent servicing the call. A variety of applications may be provided by a CRM server 140.

In addition to receiving inbound communications, including voice calls, emails, and facsimiles, and the call center may also originate communications to a called party, referred to herein as "outbound" communications. In some embodiments, a call center may employ a dialer 150, such as a predictive dialer, to originate outbound calls on behalf of an agent at a rate designed to meet various criteria. Similar to the other components within the call center architecture 100, the dialer 150 may comprise one or more software modules executing on processing device hardware platform.

The dialer 150 is typically configured to dial a list of telephone numbers to initiate outbound calls, which can be accomplished in one embodiment by instructing the ACD 130 to originate calls. In some embodiments, the ACD may include functionality for originating calls, and if so, this component may be referred to as a private automatic branch exchange ("PBX" or "PABX"). In other embodiments (not shown), the dialer 150 may directly interface with voice trunks using facilities 116c, 116d to the PSTN 115 for originating calls. After the calls are originated, a transfer operation by the ACD 130 or the dialer 150 may connect the call with an agent, or place the call in a queue for an available agent. In the latter case, announcements or music may be provided to the party. In various embodiments, the dialer 150 may make use of one or more algorithms to determine how and when to dial a list of numbers so as to minimize the likelihood of a called party being placed in a queue while maintaining target agent utilization.

Another component that may be employed in a call center is a workforce management ("WFM") 155. This component maintains information to generate agent's schedules to effectively handle inbound/outbound calls. The WFM 155 may maintain historical call volume information for call campaigns and forecast expected call volume to predict the number of agents needed to handle the call volume at a defined service level. The WFM 155 can then apply information about available agents to then generate a work roster of agents. In other words, the WFM 155 schedules agents for their work shifts according to the anticipated needs of the call campaigns.

Finally, in various embodiments, the call center architecture 100 may include an e-learning system 156 to perform various training-related functions. The e-learning system 156 may coordinate other components to provide training to agents. In some embodiments, the e-learning system 156 could be a distinct system that cooperates with the WFM 155, or the e-learning system could comprise a module incorporated in the WFM 155. Various embodiments are possible and FIG. 1 only illustrates one embodiment. Further details on the e-learning architecture will be discussed below.

An agent may be considered as having one of four different states when working. Thus, these can be said to describe the agent during a shift. During a shift, the agent is "logged-in" to the ACD and/or the WFM. The agent may be available and ready for receiving calls, if any are present. This can be described as the "ready" mode. If the agent is connected and speaking with a caller, then the agent can be described as being in the "connected" mode. Once the call terminates, the agent may have additional work to perform, including recording notes on the caller's record. This can be described as "after-call-work". Once the caller has indicated a disposition, the agent returns to the ready mode. In addition, the agent can be removed from the "ready" mode by being placed into a "pause" mode. The ACD suspends offering calls to the agent. The agent may enter the pause mode by another entity (e.g., the supervisor) or the agent may request entering the pause mode. If the agent requests entering the pause mode, they are usually prompted to enter a "pause code." This indicates the nature of the break, such as a lunch break, bathroom break, etc. Typically, if the agent is in the connected mode and requests entry into the pause mode, the call is allowed to complete, e.g., requesting the pause mode does not interrupt a current call. The ready mode, connect mode, after-call-work mode, and the pause mode all occur when the agent is logged-in to the ACD. When the agent logs off or logs out, then none of the above states can exist. Thus, the above states presume that the agent is logged-in. An agent that is not logged-in is presently working their shift and would be "off-the-clock."

Although the above components may be variously referred to as "servers," each may be also referred to as a "processing device," "unit," "component" or "system" and may incorporate a local data store or database, or interface with an external database. Use of the word "server" herein does not require the component to interact in a client-server arrangement using web-based protocols with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, the IVR server 135, the CRM server 140, the CTI server 145, and/or the dialer 150 may be combined into single hardware platform executing one of more software modules. In addition, the call center architecture 100 may be provided as a hosted solution, where the call processing functionality is provided as a communication service (a so-called "communication as a service" or "CaaS") to a call center operator. Thus, there is no requirement that the servers identified above actually be located or controlled by a call center operator. Specifically, the learning management system disclosed herein can be provided in a hosted basis in a variety of configurations.

In addition, the agent positions can be co-located in a single physical call center or in multiple physical call centers. The agents can be remotely located from the other components of the call center, and may also be remotely located from each other, sometimes referred to as a "virtual call center." A virtual call center may describe a scenario where agents work at home, using their own computers and telephones as workstations. In some configurations, a single physical location of the call center may not be readily identifiable. This may occur when the call processing functions are provided as a service in a hosted cloud computing environment and the agents positions are in their individual residences.

Those skilled in art will recognize FIG. 1 represents one possible configuration of a call center architecture 100, and that variations are possible with respect to the protocols, configuration, facilities, technologies, and equipment used. The specific components that are present in a call center may vary, and for this reason a generic term of a "call handling system" will be used.

Overview of Training Formats

The training flow refers to the high level sequence of operations or functions associated with accomplishing agent training. These operations may variously involve other call center system components and may involve interaction with various individuals, including agents receiving the training and individuals administrating the training. The training flow may involve a different number of high level processes depending on the embodiment. The number of high level training processes involved in the training flow operations depends on the training format provided. For purposes of illustration, embodiments involving four or five high level processes are disclosed. In other embodiments, the functions and operations may be combined so that a greater or fewer number of high level processes are involved in the training flow.

Thus, it should be recognized that different sequences of high level operations may be involved for different forms of agent training. In some embodiments, a subset of the same operations may be involved whereas additional training types may be defined in other cases.

The training flow disclosed herein can be used to describe actions associated with four common training formats or training types. These are referred to as:
  Conventional scheduled training ("CST"),
  Automatically scheduled training ("AST"),
  Snippet training, and
  On-demand training.

The descriptions provided herein may reference "agent training" or use the word "agent" in reference to the form of training (e.g., "conventional scheduled agent training"). The inclusion of the word "agent" should not be construed as limiting the concepts to only call center agents, as the concepts and technologies may be applied to other types of employees, individuals, or persons. Specifically, the use of a call center is not meant to limit the principles herein from being applied to other applications. Further, although four main training formats are described, other training variations are possible that can be described using the training flow processes.

The four training formats are given a label for simplicity of identification. The four training formats can be also described in terms of two categories: 1) training format type, which can be either fixed-time or flex-time and 2) training initiation, which can be human-initiated or system-initiated. Thus, four combinations are possible, each of which is associated with one of the four above mentioned labels.

The training format that can be fixed-time or flex-time. "Fixed-time" refers to training that is scheduled to occur at a given time. In other words, a time is set at which training is to be provided. "Flex-time" refers to training that is not constrained to be provided at a certain time, but can occur whenever initiated, within limits.

The training initiation can be human initiated or system initiated. "Human-initiated" is training for an agent that involve human input, which is typically either a call center administrator or training coordinator ("Administrator") or the agent. System-initiated is training that is initiated as the result of a non-human intervention, e.g., automatic intervention by e.g., a computer system. The four combinations could also be referred to as:

fixed-time/human triggered ("conventional scheduled training"),
fixed-time/system triggered ("automatic scheduled training"),
flex-time/human triggered ("on-demand training"), and
flex-time/system triggered ("snippet training").

Conventional scheduled training ("CST") is "fixed-time training" that is initiated by the "Administrator" (fixed-time/human-initiated). In other words, the training session is scheduled to occur at a certain time ("fixed-time") and the Administrator has determined that the training should occur ("human-initiated"). Stated another way, the immediate triggering of the training was caused at some level by the Administrator.

A byproduct of fixed-time or scheduled training is that the training can only be scheduled with the granularity of the scheduling system providing agent scheduling. For example, if scheduling only allows scheduling of training sessions on the hour or half-hour for an agent, then CST can be scheduled on the hour or half-hour. In addition to start times, scheduled training sessions also have an end time. In some embodiments, the scheduling intervals are 15 minute intervals (on the quarter-hour) so that training can be scheduled to the nearest 15 minute starting time. Although fixed-time training does not require content to be delivered for the entire training session, the schedule ending of the training session does coincide with the scheduling interval. In other words, if scheduling occurs at 15 minute intervals, then a training session typically begins and ends on those intervals. If the training content ends earlier, then there may be some incidental time during the training session when training content is not actually being delivered to the agent.

Generally, with fixed-time scheduling, the training session occurs when scheduled. The training session may not begin at the exact second, since the agent is usually allowed to complete an active call, as opposed to having the call abruptly terminated at the designated beginning of the training session. For illustration purposes, it will be assumed that the training session is able to start when scheduled, and that the agent is not on a call at that time. In one embodiment, the CHS will stop offering calls to the agent at the beginning of the training session Thus, unless intervention of some sort is defined, the agent will progress to the training session if available, even if call volumes for that agent, call center, or campaign are at high levels.

Automatically scheduled training ("AST"—fixed-time/system initiated) is fixed-time training that is initiated by a system, not by the Administrator or the agent. Although an Administrator may have been involved in authorizing training for the agent, the direct scheduling of the training is attributed to the learning management system as programmed. Note that the Administrator may define rules, which the learning management system uses to select the agent.

In fixed-time training (of either type), the agent may be informed of an upcoming training session. The agent may even be queried to confirm that they will accept the agent training. If offered to the agent, but the agent declines, then an exception condition may be reported. Generally, it would be unusual for the Administrator to schedule CST training for an agent, which the agent then refuses to participate in. However, in CST form of training, allowing the agent to accept or decline may be desirable. In one embodiment, the agent may be only able to defer the start time of the training session for a brief amount when presented with the notification of the training session (such as to institute a bathroom break before starting the training session).

There are two forms of flex-time training. Flex-time training is not limited to the time boundaries as is a scheduled training session. One form of on-demand training is initiated by the training system and called "snippet" training (flex-time/system triggered). Snippet training is further disclosed in U.S. patent application Ser. No. 13/454,841, entitled Non-Scheduled Training For An Agent In a Call Center, filed on Apr. 24, 2012, the contents of which are incorporated by reference for all that it teaches. The other form of flex-training is called "on-demand" training ("ODT"). On-demand is training is not scheduled to occur at a fixed time, but is initiated by the agent (flex-time/human triggered). Flex-time training is not limited to occurring at only certain times that coincide with scheduling intervals, as is the case with fixed-time scheduling. Thus, flex-time training is not limited by scheduling intervals that may exist in the scheduling systems of a call center.

Flex-time may be, in some embodiments, bounded by training windows during which training may be, though not necessarily, provided. For example, in one embodiment, the time windows coincide with the agent's shift so that whenever the agent is working, the agent is eligible to receive flex-training. Other embodiments may conditions when flex-time training cannot be provided, or indicate only certain times when it may be provided. For example, restrictions may be defined that prohibit all agents from requesting flex-time training at the same time or spending more than a certain percentage of their time training. Flex-time training could also be accessed by an agent outside of their normal shift hours. Further distinctions of each form of training will be provided below.

Whereas flex-time may be triggered and end based on various conditions (such as call volumes), fixed-time training sessions usually begin and end independent of such other conditions and are only dependent on time. Thus, in some embodiments, it would be unusual to interrupt or terminate a fixed-time training session because of an increase in call volume.

CST reflects a common embodiment where an Administrator schedules training for an agent at a certain time. CST provides a convenient basis to illustrate the operations in the training flow since it is conventional for agents to be scheduled for training in call centers. For example, agents participating in a new call campaign contracted to start in two months in a call center may be scheduled for training by the Administrator on the day prior to the start of the campaign. Using the training flow for CST as a baseline, it can be seen how variations to the training flow can illustrate the other training formats.

The use of the phrase "training session" generally refers to a period of time where training occurs. A training session can be potentially fixed-time or flex-time. A "training session" by itself does not necessarily imply an identified training course content, but that some form of training is provided. The use of the phrase "training course" generally refers to a particular training course provided during a training session. In certain cases, the phrases may be used interchangeably, such as "scheduling a training session" and "scheduling a training course." The use of the term "training course" does not limit the application of the principles herein from being used to present other forms of materials, including, e.g., entertainment, games, contests, general instruction, etc. Thus, the training session could provide any form of interactive interface. However, the principles of the concepts and technologies are illustrated in the context of providing training session. Thus, although the content delivered is referred to as "training content," it could easily be other forms of content.

Although the embodiments describing the concepts and technologies herein presume that the activity involves a training session, in other embodiments the activity at this processing stage may another form. For example, the overall training flow described herein may be applied for scheduling an audition, and the activity is an audition performance by a performer as opposed to a training session involving an agent. As noted before, for the sake of brevity, the concepts herein are illustrated using an embodiment involving delivering training content to agents.

Training Flow

Figure 2:
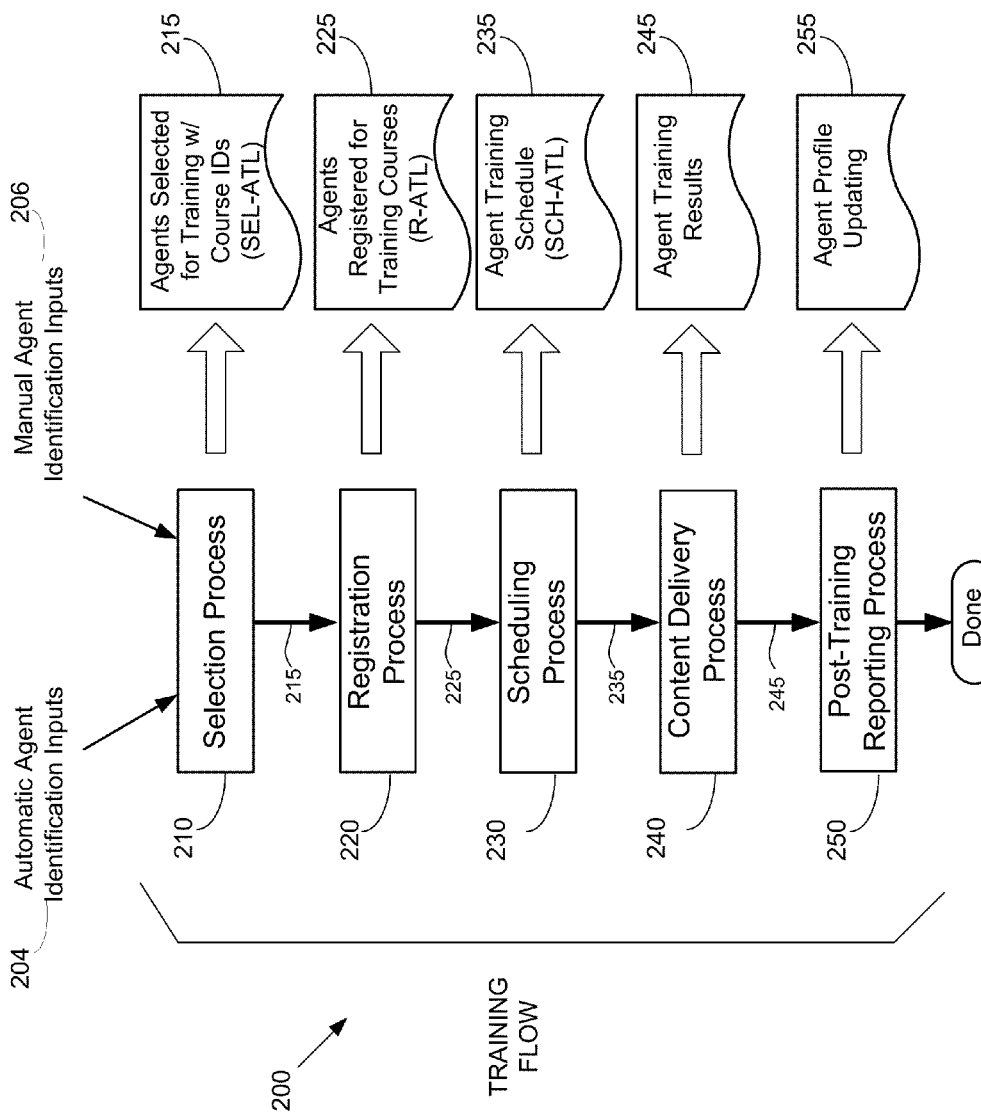
FIG. 2 illustrates one embodiment of a training flow overview for a fixed-time, non-facilities based training session.

Turning to FIG. 2, an overview of the training flow 200 is illustrated that is associated with CST training (fixed-time/human-initiated). There are up to five distinct high level processes which may be associated in this embodiment of the training flow 200. In some embodiments of the training flow 200, a given high level process may be absent or there may be a variation as to how a given process may occur. In general, each individual training flow 200 produces an output of some form, which is diagrammatically shown to the right of the corresponding process. In FIG. 2, there are five processes, namely the section process 210, the registration process 220, the scheduling process 230, the content delivery process 240, and the post-training reporting process 250. The corresponding outputs of a process may be lists, schedules, results, or other data structures.

Selection Process

The selection process 210 is the initial high level process in the training flow. Although shown as a single process, there are two variations, which could alternately have been shown as two separate sub-processes. However, because there is similarity for many of the aspects, this is shown as a single process. The two main variations are:

an automatic agent selection process, and
a manual agent selection process.

The manual agent selection process will be discussed initially, as the automatic agent selection process can be easily described as a variation of the other. As evident, the manual agent selection process involves processing human-provided inputs and corresponds to "human initiated" training formats, while the automatic agent selection process involves processing system-generated inputs and corresponds to "system initiated" training forms.

The selection process 210 receives Administrator input 206. The Administrator input may involve different forms and user interfaces to select agents for training. In a simple embodiment, the agent training selection inputs may involve identifying a file listing agents identified by the Administrator for training. In other embodiments, various agent selection tools ("AST") may be defined in the selection process 210 and used by the Administrator to select the agents. The AST could be a wizard-based program allowing the Administrator to select various criteria for selecting agents for training. This may involve selecting agents or combinations or subsets based on seniority, skills, work schedules, contract terms, pay scale, employee type (full-time or part-time), prior training history, or other criteria. The wizard may prompt the Administrator for agent selection criteria allowing identifying agents that meet certain defined qualifications. In other embodiments, the AST may be based on a structured database query language, and may involve the Administrator providing a textual-based query for a database search. For example, the Administrator could select all agents lacking a certain skill level available on a certain date for training. In other embodiments, the AST could involve a graphical user interface ("GUI") allowing the Administrator to select agents from a list of scheduled agents and variously construct a list of agents to be trained. In each case, agents to receive training are identified. Thus, there are various forms that could be used to receive the manual agent selection input 206. The Administrator may also provide, or be prompted for, other inputs which indicate which course agents are to receive, the nature of the training format, application of other conditions, rules, limitations, etc.

The output of the selection process 210 is referred to as an agent training list ("ATL"). At this point during the training flow, the ATL comprises a list of agents associated with training courses, as well as other information. As will be evident, there are various forms of the ATL that may be produced by the training flow processes, which account for the different training formats. Subsequent processes in the training flow may either generate further information which can be manifested in another, distinct ATL, or that may supplement the data structure in the ATL. In other words, various embodiments may define an initial ATL that is modified at various stages of the training flow 200, whereas other embodiments may define different ATLs that are associated together in some manner. This is an implementation aspect which may vary, and either form is within the scope of the concepts presented herein. For sake of illustration, and not for limitation, it is presumed that the ATL is initially produced by the selection process and is modified in subsequent processes.

To distinguish between the various instances of the ATL as modified by a particular process, a qualifier may preface the word "ATL." For example, the ATL produced by the selection process 210 may be further referred to as a "Selected ATL" ("SEL-ATL") 215 referring to the agents that have been selected for training by the selection process 215. This input could be a list of agents to take a particular course, which becomes the genesis of the Selected ATL.

The Selected ATL is generated by the selection process 210, which in one embodiment is based on Administrator input. In another embodiment, the Administrator may define criteria, which is further processed, from which the selection process identifies agents. Thus, in various embodiments, different levels of processing may be required by the selection process to identify the agents.

The Administrator may also indicate which training courses are involved with the agents. The training course is typically identified by a course identifier ("course ID") which identifies the subject matter that the agent is to receive training, and which may allow retrieval of other information providing details of the training. In other embodiments, a course name may be used. As long as the identifier is unique, either format may be used. In other embodiments, the Administrator may request the selection process to identify courses that certain agents have not been trained on, and therefore the selection process determines the course to be associated with the agent.

The generation of the Selected-ATL during the selection process 210 typically identifies at least one agent and associates that agent with a training course (or vice versa). This often involves generating a record using a record structure that not only identifies the agent and course but further includes additional information associated with completing the training process. This additional information beyond the agent name and course provides information on the training context and this data may be collectively referred to as a training context data ("TCD"). In other embodiments, the ATL may simply link to another record of data indicating the TCD. For purposes of illustration, it is assumed that the TCD is incorporated into the ATL, hence, a record in the ATL and the associated TCD may be one and the same record.

The specific data elements in the TCD used by a given process in the training flow may be a subset of the TCD. Further, each subset of TCD used by a given process may vary according to the process. Further, the TCD stored in the ATL may be augmented or modified by a process during the training flow. In many examples, TCD may be generated by one process in the training flow, and then subsequently used by another process in the training flow.

The TCD provides information about the training to be provided, including the course duration, course prerequisites, the training format, etc. Any information needed to accomplish the training flow may be stored in the TCD and may be generated by or during various processes or received from the Administrator input.

Registration Process

The next process in the training flow 200 is the registration process 220 that may begin after the selection process 210 has generated an ATL of selected agents. The purpose of the registration process is to register the agents identified in the previously generated Selected-ATL. Registration may involve determining whether various conditions and requirements are met so that the agent can be registered to take the course. This process may be thought of as a screening process to ensure that agents are eligible to receive training. Eligibility may be based on examining course related information and/or rules established that may limit registration. In other words, the Selected-ATL merely identifies agents for which training is desired. The registration process ensures that the selected agents can actually take or receive the training courses. Thus, the Selected-ATL has to be processed to ensure that the agents can actually take the course as desired.

Screening may involve, for example, determining whether the agent has met the indicated course pre-requisites. For example, a training course may only be available for agents who have completed certain prior training courses, who have a minimum seniority level, or have a minimum skill level. The screening may involve a so-called "white list" (approved items) as well as a "black list" (prohibited items). In other words, pre-requisites may be predicated on certain requirements being present or being absent. For example, a course may require an agent to have at least 6 months work experience before registering for a course, or the course may not be open to agents having less than 6 months work experience.

Other restrictions may be examined to determine whether an agent can register for a course. These include course capacity, cost, or other non-schedule restrictions. For example, a training course may be associated with a fixed capacity. The capacity may be due to classroom size, a maximum number of students that have been contracted to receive training, or software licensing restrictions. Hence, a limited number of agents can be registered as students. In some embodiments, wait-listing may occur.

Other restrictions may be defined as rules which prohibit, for example, an agent from receiving training where travel is required to attend the training session. Other restrictions could limit classroom-based instruction only to agents living in the same metropolitan area. For example, an agent based in Florida may be precluded from registering for a facility-based training course offered in California, but the same agent may be able to register for the same course if offered in Florida. A call center may have a list of agents which are explicitly excluded from receiving training courses, or who have already received training. The number and type of restrictions may vary greatly in different embodiments.

The registration process 220 can apply separate rules or criteria for flex-time and fixed-time training. A course may be offered to an agent only on a fixed-time basis, or a flex-time basis. Indeed, some course material is better suited for delivery in a fixed-time format. Other course material may be adapted to delivery in short and unscheduled formats. Some courses may be mandatory, whereas some may be optional, and may require supervisor approval.

The output of the registration process 220 is a list of agents registered for training courses 225, referred to as the "registered ATL" ("R-ATL"). This list represents agents that are registered, i.e., can receive the training course. Again, in various embodiments the R-ATL could be embodied as a separate list or as information that is added to the Selected ATL.

Scheduling Process

The next process in the training flow 200 may be the scheduling process 230. This process is optional and may not be present in all training flows. If present, the scheduling process 230 may begin any time after the registration process 220 completes. The scheduling process may receive as input the R-ATL 225. The purpose of the scheduling process 230 is to schedule agents indicated in the R-ATL as receiving fixed-time training.

Scheduling may involve determining whether the indicated agent can be scheduled for the course in light of various scheduling requirements, rules, and conditions. If so, e.g., the agent can be scheduled, then one of the results may be a defined time for when the indicated agent is to receive training. In some embodiments, the time for when training is to occur is provided as an input by the Administrator. If so, then the scheduling process is simplified.

The scheduling process, by its very nature, involves scheduling an agent for fixed-time training. Thus, the scheduling process 230 is absent if flex-time training is involved. Specifically, the scheduling process 230 is used for CST and for AST (which are both forms of fixed-time training) but not for flex-time training.

For other forms of training that are flex-time, e.g., snippet and on-demand training, there is no set time that the agent must receiving training, so the scheduling process 230 may be by-passed. For purposes of this illustration, which is based on CST, the scheduling process 230 is used to schedule an agent to receive training at a defined time. The scheduling process uses as input the R-ATL 235.

The output of the scheduling process 230 is an ATL list that may include the scheduled training times for the agents. This may be referred to herein as a "scheduled ATL" (SCH-ATL) since the times for receiving training are indicated in the ATL. As will be discussed, in some embodiments, the information generated by the scheduling process may be kept in a separate file from the R-ATL. This is because the scheduling function may be implemented using the scheduling engine in the WFM of a call center, and the training related scheduling information can be stored along with the agent's work schedule.

In other embodiments, to generate the SCH-ATL, the R-ATL may be augmented with further information to create the SCH-ATL.

Content Delivery Process

The next process in the training flow 200 is the content delivery process 240. The content delivery process may have different forms, but it is present in some form whenever training is provided. In some embodiments, the delivery of content may be computer-based, web-based, or another form of e-learning. In other embodiments, content delivery can be highly manual in nature, such as a lecture provided by an instructor in a classroom. For purposes herein, reference to a "content delivery system" refers to an electronic based system for facilitating delivery of content of various types unless otherwise stated. A content delivery system would encompass, for example, computer-based, web-based, or other forms involving computers. It is possible for the training flow 200 to work with a manual content delivery process, as will be seen, but the greatest efficiencies and benefits of the technologies disclosed herein often involve delivery of e-learning content.

In the context of CST, the content delivery occurs at the scheduled time, which is indicated in the SCH-ATL 235. Other forms of training may occur in a non-scheduled manner. For example, on-demand training may involve delivery of content when the agent requests training.

When the training content is delivered in a fixed-time manner, the delivery may be coordinated with the CHS. The CHS may be instructed to automatically "pause" the agent at the appropriate time when a training session is to begin, and may be instructed to resume call handling at the end of the training session to "resume" the agent's call handling. To "resume" the agent is to return them to the ready mode. This integrated approach allows a seamless transition for the agent from handling calls, receiving training, and then returning back to receiving calls. Further, in an integrated approach, the agent is not required to log-out from the CHS and log-in to the CDS or learning management system. The CDS is informed as to the agent receiving training, and there is no need to replicate the identification and validation procedures associated with logging-in to the CHS.

At the end of the content delivery process 240, the agent has received the training, which can be in various training formats. The content delivery process 240 generates an ATL list that reflects the training received by the agents. This may be referred to herein as a "completed training ATL" ("CT-ATL") 245. This essentially updates the ATL to reflect the training provided.

The training content itself can be in various forms. As noted, can be an e-learning type of delivery, involving interactive presentations, multi-media, videos, or voice narratives. The content delivery may comprise an information presentation part followed by an optional testing part. The test may reflect that the agent comprehended the concepts presented, and a minimum level may be required to "pass." In other embodiments, a series of learning modules may be presented as a curriculum, and optionally followed by a testing module.

The content delivery process 240 may occur well after the scheduling process 230 occurs. It is common for an agent to be scheduled for a training session weeks in advance, so that the agent is prepared for a new call campaign before it begins. The content delivery process may be of varying duration. The training content can be a few minutes to several hours long. For example, a scheduled training session can easily last several hours while a snippet training session may last a few minutes.

Post-Training Reporting Process

The next process to occur in the training flow 200 is the post-training reporting process ("PTR process") 250. The PTR process 250 involves reporting results of the training content delivered to the agent, and may involve updating an agent training profile. For example, an agent completing a training course may have their training profile updated to reflect that the agent has completed the training and has successfully passed a testing module leading to an updated skill The PTR process 250 may also update the CHS so that skills-based routing in the CHS is updated appropriately.

The data updated by the PTR process 250 is called the Agent Training Profile ("ATP"). The ATP may be considered a special case of the ATL or it may be considered as a separate data structure. One distinction is that the ATL data may be more transient as compared to data in the ATP. In one embodiment, the ATL reflects a temporary list of agent training related records, but the ATP is a more permanent result of the training process. Thus, the ATL may be erased after training and the permanent results stored in the ATP. Thus, for purposes of illustration, the ATL is presumed to contain the short-term training-related results, and any data in the ATL that is then stored on a long-term basis is termed the ATP.

Specific examples of ATP would include the dates and courses that an agent has completed, along with optional test scores, and other training certifications. In some embodiments, minimal information is retained in the ATP. For example, the only long term data retained as ATP may be the update skill level of an agent that is updated in the CHS. In this embodiment, the dates/time/courses delivered to an agent could be erased. The choice of what and how much data to retain as ATP may vary.

The specifics of the PTR process 250 depend in part on the training format of the training. In the example provided above (CST), the training involved e-learning provided at a fixed-time and an automated routine may update the ATP. In other embodiments, such as with classroom-based instruction, a course instructor may provide inputs that are processed and used to update the ATP. Thus, even manually provided data can be received by the PTR process 250.

The overall training flow 200 in FIG. 2 shows that all five processes (selection process 210, registration process 220, scheduling process 230, content delivery process 240, and the post-training reporting process 250) are involved in providing training to an agent. Each process uses an input and produces an output. The overall training flow 200 is initiated when the Administrator provides input 206 and ends when the reporting in the PTR process 250 completes.

Role of the Workflow Manger

The transition from one process in the training flow to another is controlled by a workflow manager (not shown in FIG. 2). The workflow manager ensures that when the selection process 210 completes, the transition process 215 occurs so as to begin the registration process 220. Similarly, when the registration process 220 completes, the workflow manager ensures that transition 225 occurs to begin the scheduling process 230, if appropriate. Similarly, when the scheduling process 230 completes, the workflow manager ensures that transition 235 to the content delivery process 240 occurs. Similarly, the workflow manager ensures the transition 245 to the posting-training reporting process 250 occurs. The workflow manager may alter the training flow, as will be seen, for different types of training. For example, in some embodiments the workflow manager will effectively bypass the scheduling process. As noted before, the training flow 200 in FIG. 2 depicts a CST form of training where training is scheduled to occur at a fixed time.

Training Flow Variations

A variation of the training flow 200 in FIG. 2 can be illustrated by initiating the training flow by a different form of input. Specifically, instead of the Administrator input 206 initiating the process resulting in manually selecting agents, automated agent selection may occur. In this case, the automated input comprises agent performance metrics 204, which are automatically generated by analyzing an agent's performance. These metrics may originate from several systems. In one embodiment, voice recordings for the agent are recorded, analyzed, and compared to criteria for the agent. This processing may occur after regular shift hours (e.g., early morning) and the results may be provided to the learning management system for selecting agents for training. For example, an agent's speech recording may be analyzed to detect the presence (or absence) of certain words or phrases. Specifically, a telemarketing sales pitch may be analyzed to ensure that the agent mentioned various features of the product. Failure to mention these features may be a basis for automatically selecting that agent to receive additional product training, and initiating the selection process 210.

In another embodiment, agent call processing metrics known as key processing indicators ("KPIs") may be analyzed. These call processing metrics include, for example, average call holding time, answered calls, after-call work time, etc. A particular KPI may suggest that the agent is lacking in a certain skill, which can be analyzed and used to again initiate the selection process 210. The call processing metrics may be generated by various CHS equipment in the call center.

The above variations disclose a training flow that is initiated by system inputs that are processed using rules, as opposed to manual inputs. This agent selection mechanism can be used for a form of remedial training, where training for agents is initiated by the system to address a deficiency, or bolster skills in a certain area. Thus, the process in FIG. 2 can be used to describe the process flows for either automated selecting of training (AST) for agents or a conventional, manual approach for selecting agents (CST), based on how the selection process 210 is initiated. Both of these processing flows are examples of fixed-time scheduling, where the training occurs at a scheduled time for the selected agent.

While the overall training flow 200 in FIG. 2 is similar for AST and CST, there may be distinctions that occur subsequently in a particular process flow depending on whether the AST or CST training was initiated. For example, one distinction between AST and CST may involve a test just prior to, or during, the content delivery process 240. This distinction is explained using FIG. 3.

Figure 3:
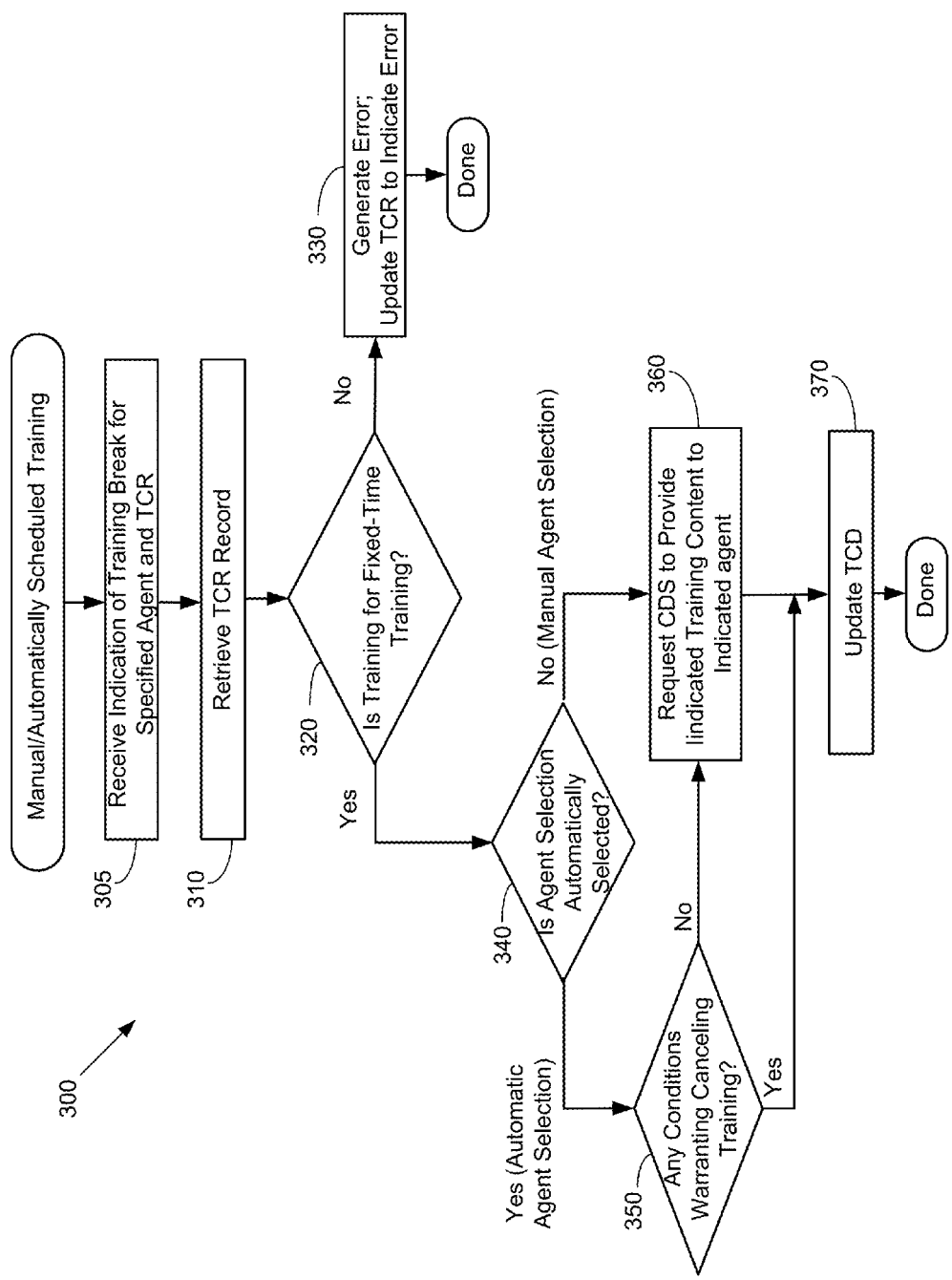
FIG. 3 illustrates one embodiment of a process flow for automatic agent selection.

Turning to FIG. 3, the process 300 represents one embodiment that may occur by the workflow manager in determining whether the transition 235 should occur. The process picks up with operation 305 by receiving an indication of a training break scheduled for the agent. In operation 310, contextual training information is obtained by retrieving a training context data. Recall that the TCD provides contextual information about the training that is to be provided to the agent.

In operation 320, a test is made to determine if the training is a fixed-time type of training. Since it was determined in operation 305 that the training was a form of scheduled training (e.g., an indication of a scheduled training break was received), then the TCD should confirm that the training is fixed-time training. Consequently, an indication in operation 320 that the training is not fixed-time training would suggest an error. If so, then an error message is recorded in the TCD in operation 330 and the process completes.

Assuming that the training is determined in operation 320 to be fixed-time training, then a test is made in operation 340 to determine how the agent was selected (manually or automatically). If the agent was not automatically selected (e.g., manually selected), then in operation 360 a request is made to the content delivery system ("CDS") to provide the training content to the agent. The TCD in operation 370 is updated to reflect that training was requested to be provided to the agent.

If however, in operation 340 the agent was automatically selected, then this means that the agent was selected based on a performance metric that was analyzed. The agent may have been selected, registered, and scheduled for training without the knowledge of the Administrator and independent of staffing levels and calling volumes. A test is then performed in operation 350 to determine if there any conditions that warrant canceling the automatic scheduled agent training. In some embodiments, the Administrator's approval may be required before training can be provided. In this embodiment, the agent training is automatically scheduled to occur, and there may be a number of conditions which warrant postponing the training. For example, a high priority call campaign may be under way and requires the agent to handle calls as opposed to be engaged in training at that time. Or, a staff shortage condition may exist, etc. If conditions warrant cancelling the training, then in operation 370 the TCD is updated to reflect this as well, otherwise the request for training in operation 360 occurs.

Thus, the training flow shown in FIG. 3 illustrates two training formats based on fixed-time training. While these two flows involve similar processing steps, a branch in the workflow may occur for automatic agent scheduling that prohibits the start of the content delivery process. With this example in mind, other variations of the processing steps and workflow are described below.

Facilities-Based Training

The above discussion involved fixed-time training for scheduling an agent to receive e-learning-based training at a particular time. Another form of fixed-time training is a conventional classroom, instructional-type of format. This format involves the use of classroom facilities, and may be referred to as "facilities-based" training. In this form, students show up to a facility at a scheduled time to receive their training. Although this does not incorporate all the advantages of e-learning content provided to an agent's workstation, the concepts and technologies herein can accommodate this conventional form of training.

Figure 4:
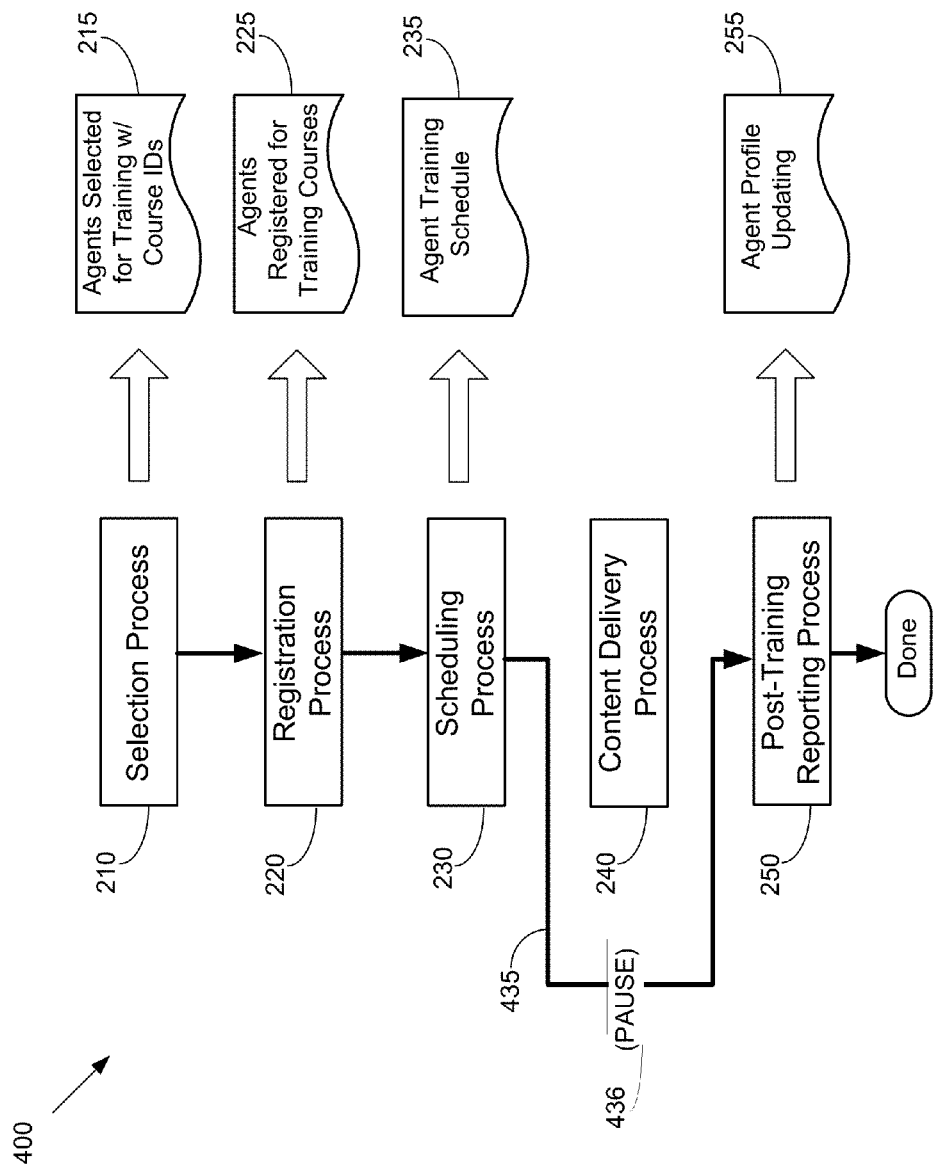
FIG. 4 illustrates one embodiment of a training flow overview for a fixed-time, facilities-based training session.

One depiction of the process flow is shown in FIG. 4. In one embodiment, content delivery is human-based, not e-learning based instruction. The selection process 210, registration process 220, and scheduling process 230 are similar to as described above, and are not discussed further. However, since the content is being delivered by conventional lecture-style format, the workflow manager effectively bypasses the e-learning content delivery process. Or, in other words, the content delivery process is performed by a human.

This is illustrated by transition 435 in FIG. 4. In this illustration, the content is still being delivered, but by a human. Thus, the workflow 435 is depicted as having a pause 436, which reflects the occurrence of the content being delivered by a human as opposed by an (electronic) content delivery system. The workflow manager has minimal involvement with the actual provision of the content delivery (aside from perhaps indicating to the agent or instructor when the training session should begin and end). The main focus of the workflow manager in this embodiment is to coordinate the selection, registration, scheduling, and post-training reporting operations associated with the training. The workflow manager knows from the TCD the appropriate context of the training and that there is no e-learning content delivery to coordinate, because the training is for facilities-based training. The workflow manager may know that human input is required to provide the PST reporting.

In another embodiment, the facility may be a classroom housing computers used to provide e-learning content to the agents. In this case, the training remains facilities-based, but computer-based instruction is still involved, and hence the workflow would appear more like FIG. 2 than FIG. 4. In another embodiment, the facilities-based training could involve viewing a live webinar. The students could report to a classroom and view a live webinar, which could be viewed from a single screen with audio broadcasted in the room. Alternatively, the students could individually view the webinar at separate computers deployed in the classroom. In this case, the students could individually view the same live webinar, or distinct, previously recorded webinars. The workflow manager may be aware of this context and may be configured to accommodate the various forms. If the workflow manager provides e-learning to the students, it can be configured to ensure that an adequate delay occurs between the beginning of the training session and the delivery of computer based instruction to allow the agents to report to the classroom.

Figure 5:
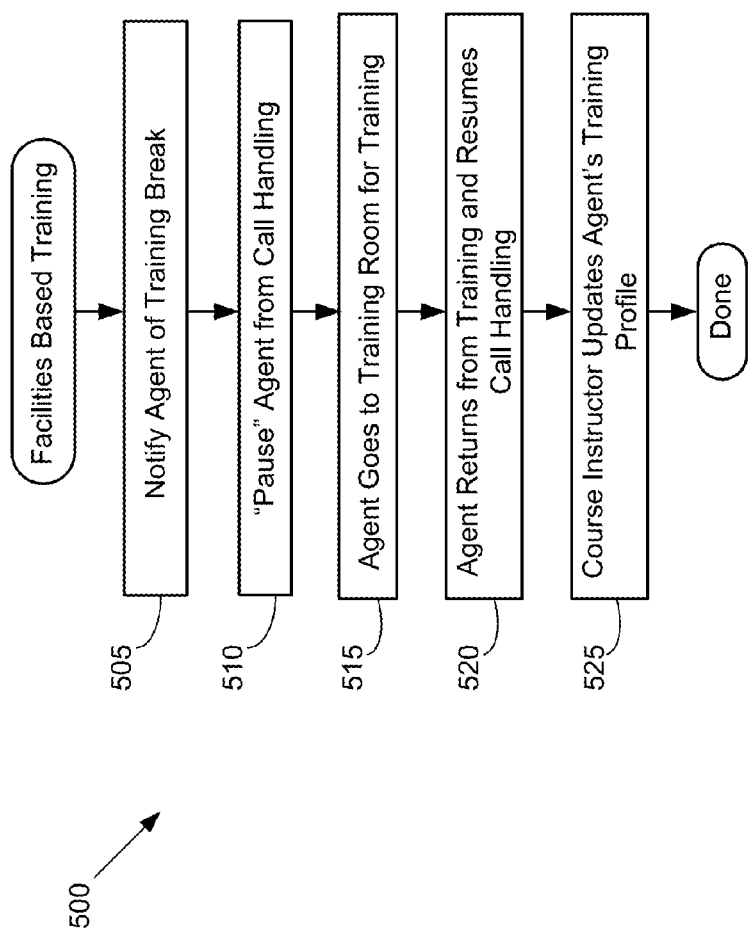
FIG. 5 illustrates a process flow for facilities-based training.

A service flow associated with facilities-based training is shown in FIG. 5. In one embodiment, the agent is notified in operation 505 of an upcoming scheduled training break. The agent is then "paused" or suspended from call handling in operation 510. As will be seen, the e-learning system may coordinate this action with the CHS. The agent then physically relocates to the training room in operation 515 to receive training. In operation 520, the agent returns at the end of the training break and resumes call handling. In operation 525 the course instructor provides training-related information for updating the agent's training profile. The agent may be "resumed" for call handling when the agent returns to their workstation. Thus, even for a facilities-based training session, there can be a level of service integration by the learning management system.

Flex-Time Training

The above illustrations are examples of fixed-time training, where training occurs at a scheduled time for the agent. In another embodiment, flex-time training, the training occurs on a non-scheduled basis. Specifically, the training can occur at the initiation of the agent or a system, without regard to a previously scheduled time. When an agent initiates flex-time training, it is referred to herein as "on-demand" training. When the learning management system initiates the training, it is referred to herein as "snippet" training. The name "snippet" refers to the frequent, relatively short, nature of the training session, based on the context in which it is provided. Both on-demand and snippet training may occur at various times, and have the common aspect in that they are not scheduled with respect to starting or stopping at certain times.

There may be different criteria used to initiate the training or termination of flex-time training, as well as different characteristics of the content being delivered. For example, on-demand training may allow the same course content to be accessed by an agent that was initially provided to the agent during fixed-time training (e.g., the agent did not pass the course test). While the fixed-time training could be defined as non-interruptible, the on-demand form may be interruptible, and accessed when time allows. On the other hand, snippet training sessions may be shorter, and may be readily interrupted under various conditions. In one embodiment of snippet training, the training sessions may be shorter relative to on-demand course, but the snippet course content is effectively much larger than typical on-demand courses. Specifically, snippet training may involve a very long course (which is continually augmented or changed), but the training sessions only allow intermittent and short access. Thus, the agent may receive snippet training from a course content, which essentially, is never completed.

Figure 6:
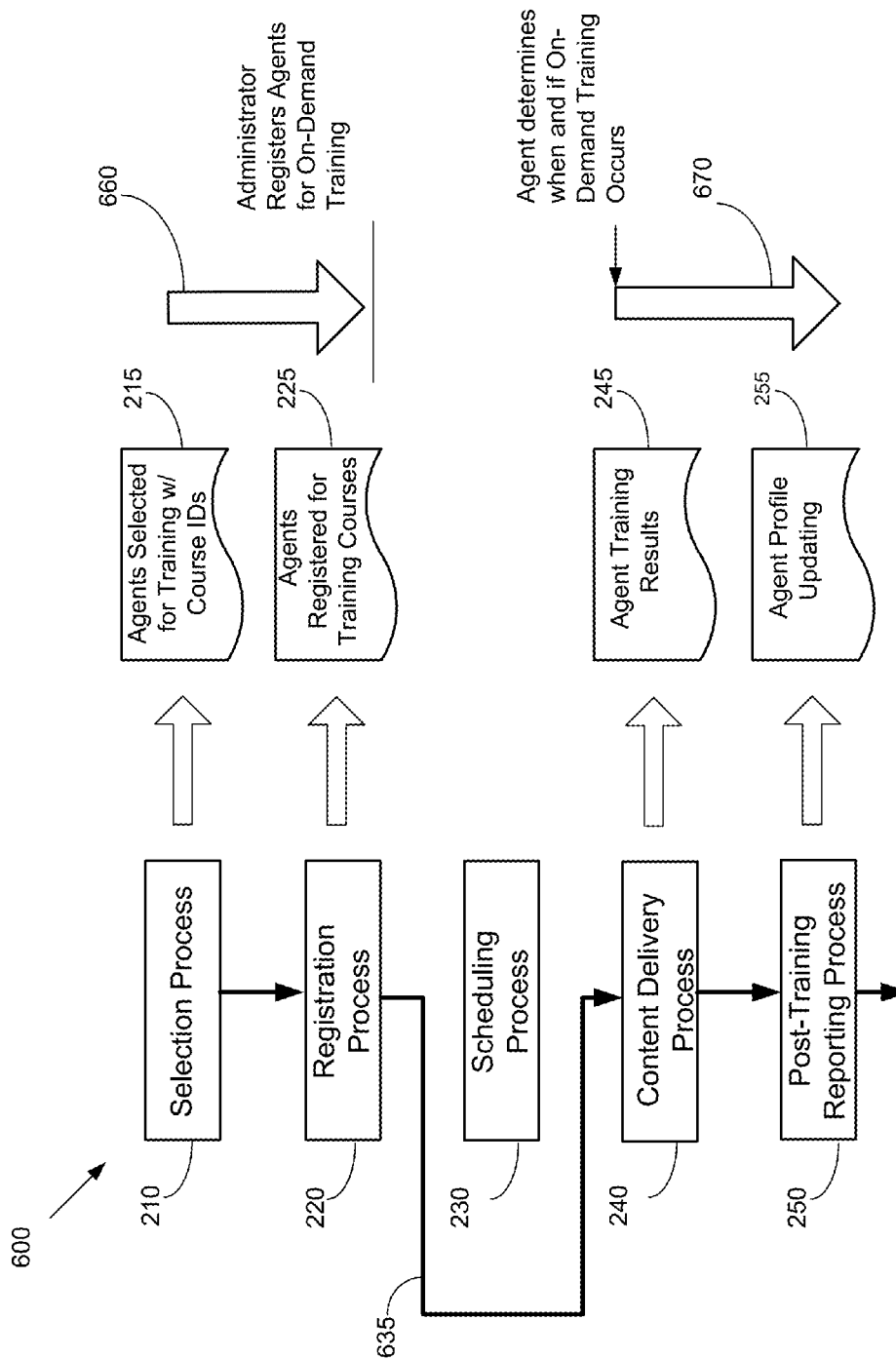
FIG. 6 illustrates one embodiment of a training flow overview for a flex-time, non-facilities-based training session.

Because flex-time training is not scheduled, the scheduling process 230 may be bypassed in the training flow. This is reflected in FIG. 6 which illustrates a flex-time process. In FIG. 6, the selection process and the registration process are similar to as described earlier. In one embodiment, an agent that is allowed to invoke on-demand training is selected using the manual agent identified process. Specifically, an Administrator may define criteria indicating that the agent is allowed to invoke on-demand learning. The criteria could be as simple, e.g., as providing the agent's name to the system during the agent selection process.

An agent that is automatically selected for snippet training may be selected by the system based on automated analysis of agent performance data, although it is possible for the Administrator to manually select which agents are allowed to receive snippet training. In this case, the agent must be authorized by the Administrator to be selected by the system to receive snippet training.

FIG. 6 illustrates that the transition 635 bypasses the scheduling process. The workflow manager determines when to invoke the content delivery process 240 based on the training context (indicated by the TCD). For purposes herein, it is presumed that flex-training involves delivery of e-learning based content. It would be unconventional for an agent to request, e.g., facilities-based training on an on-demand basis, though such an embodiment is within the scope of the concepts and technologies herein. Hence, the content delivery system is presumed to involve e-learning that is provided in the context of flex-time training.

Returning to FIG. 6, the process 660 involving the selection process 210 and the registration process 220 may occur fairly quickly in succession time-wise. However, after the registration process, it may be a while before the content delivery process 240 occurs. For on-demand training, it is only when and if the agent in process 670 requests training that the content delivery process 240 is initiated and the post-training reporting process 250 occurs. Upon completion of the content delivery process 240 the post-training reporting process 250 may occur immediately.

Figure 7:
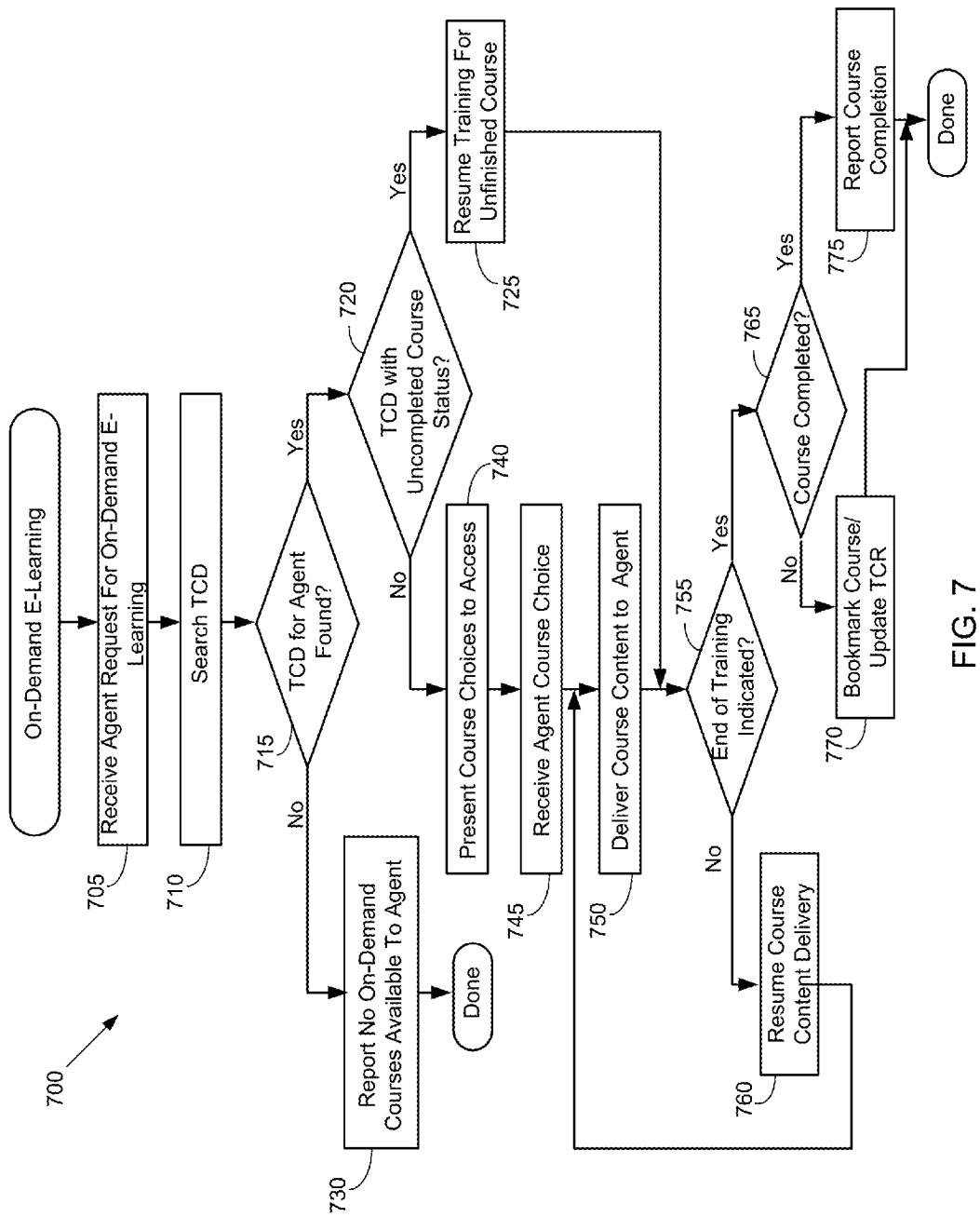
FIG. 7 illustrates a process flow for flex-time training.

An exemplary service flow associated with on-demand learning is shown in FIG. 7. This represents one possible embodiment of processing associated with providing on-demand training to an agent. In operation 705, the system receives a request from the agent for on-demand training. In operation 710, a search of the TCD is performed so that information about the current training context can be identified. If no TCD are found in operation 715 for that agent (indicating the agent cannot invoke on-demand training), then it is reported to the agent in operation 730 that no on-demand training courses are available to the agent.

The TCD in operation 715 will indicate that one or more on-demand training courses are available for the agent. The TCD is defined when the agent is selected and registered for the training course (these information would be in the R-ATL at this stage). In operation 720, a test occurs to see whether the TCD indicates that a previously started training course was unfinished. A uncompleted status indicator indicates a prior flex-time training session involving the course was interrupted. Consequently, the previously started, but uncompleted, course is resumed in operation 725.

If there is no TCD with an uncompleted status indicator in operation 720, then a menu of one or more available on-demand training courses is presented to the agent in operation 740. After receiving the agent's course selection in operation 745, the course content is delivered to the agent in operation 750. If the end of the training session occurs as indicated in operation 755, then another test is performed in operation 765 to determine if the course was completed. If not, then in operation 770 the course is "bookmarked" and the content delivery process completes. A "bookmark" is an index pointing to a location into the course content indicating where the training course was suspended, so that the remaining portion can be presented upon a subsequent on-demand training session. If the course is determined to be completed in operation 765, then the appropriate records are updated in the agent training profile and the process completes. If the end of training has not occurred in operation 755, then the process loops to continue delivering content to the agent.

The flow 700 of FIG. 7 is one exemplary embodiment for an on-demand learning session. Specifically, in this embodiment, the trigger for the process is initiated in operation 705 by receiving a request from the agent for on-demand based training. Further, the termination of the training session in operation 755 may also result from an agent-initiated action.

The provision of on-demand training can be further configured to be dependent on various factors. The Administrator can define various conditions which must be met (or which cannot be present) in order to act upon an on-demand request from an agent. This includes: defining specific time windows or flex-time training windows when on-demand training request can be processed. These can be expressed in different ways, including as, e.g., time periods during which on-demand requests will not be fulfilled or may be fulfilled. An absolute time can be indicated when on-demand training request will not be provided (e.g., not during any morning shifts, but only during the late-night shifts). The time could be indicated as a percentage into, or from the beginning or ending of the agent's shift. The provision of on-demand training could be limited, for example, to only during the last 25% of time in the agent's shift. Or, the rules could limit an agent's on-demand training to be limited to 5% or no more than 1 hour/shift. A combination of conditions could be defined as well. Thus, if 10% of the agents are already engaged in on-demand learning, other requests may be rejected. Alternatively, the provision of on-demand training could be limited only during certain campaigns or when the overall call center capacity is below a certain threshold. The training window for on-demand flex training does not guarantee training will be provided, but defines time periods in which it may be provided. In one embodiment, the training window could be set to "anytime." Those skilled in the art will recognize that various conditions and limitations beyond those identified herein can be defined for providing on-demand training.

Snippet Training Session

Snippet training is another form of training that is flex-time based training. This training is further characterized in that the learning management system (not a human) determines when to initiate the training. In some embodiments the learning management system or the Administrator may determine the course subject matter. This can be distinguished from on-demand training where the agent determines when the training is to begin and may also select the training course.

In one embodiment, the distinction between on-demand and snippet training can be characterized by:
    On-demand Training: agent initiates flex-time training session, versus
    Snippet Training: learning management system initiates flex-time training session Further, in another characterization, the distinction is:
    On-demand Training: agent selects course content (if more than one choice available), versus
    Snippet Training: learning management system or Administrator selects course content.

In many embodiments, the snippet training session has a shorter duration than a typical on-demand training session, since snippet training may be "inserted" into the agent's work flow when call volume is low. Since it is desirable to keep agents busy in handling calls, the snippet training session may be only a few minutes in length. Usually, though not required, on-demand training is longer in duration, as constant interruptions may reduce the efficacy of on-demand training.

Snippet training may be in a format that is based on relatively short, self-contained modules of training materials. For example, one form of snippet training could be in the form of trivia questions, which incorporates an educational aspect and can be frequently interrupted and resumed without a loss of continuity. The trivia aspect can be further coupled with a point system for providing rewards and/or incentives to agents.

Figure 8:
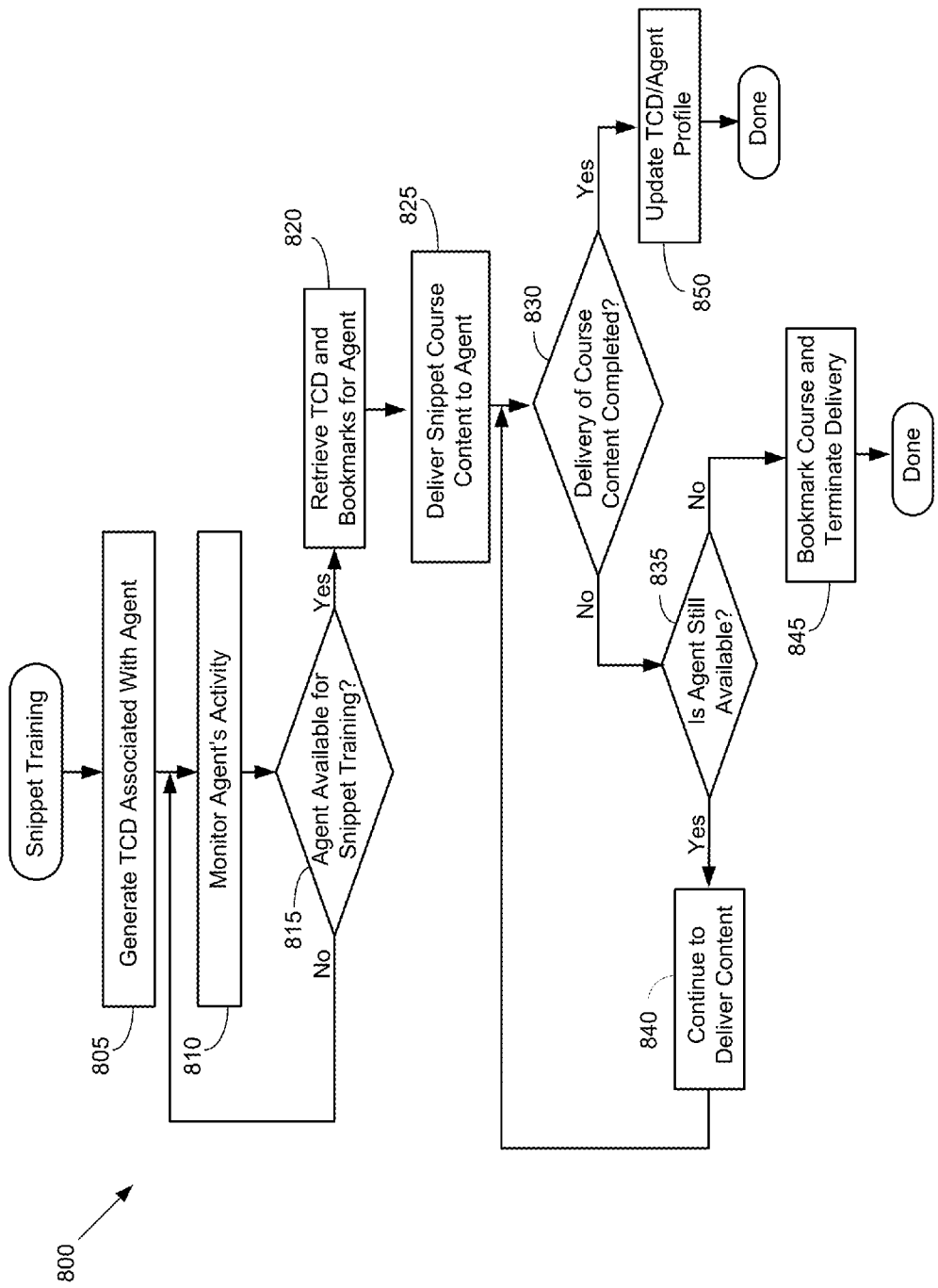
FIG. 8 illustrates a process flow for one embodiment of flex-time training.

The process flow for snippet training is similar to FIG. 6 except, as noted, the agent does not determine when and what course is to be provided. The service flow for snippet training can be illustrated in one embodiment in the process flow of FIG. 8. The process presumes in operation 805 that TCD is previously generated, which typically occurs when the agent is selected and registered for a training course. As noted earlier, there is no scheduling process for this form of flex-time training, and instead, the agent's activity is monitored in operation 810 and a test occurs in operation 815 to determine whether the agent is available for snippet training. If not, then the process loops back to operation 810 and continues monitoring the agent's activity.

If the agent is available for snippet training, the training context and bookmarks for previously started courses (if any) are retrieved in operation 820. In operation 825, the training is delivered to the agent. If the course content is completed in operation 830, then the completion of the training course is reflected in the TCD and the agent profile is updated. In this manner, if the snippet training session is reinstituted, then this particular course will not be resumed, since it was completed, and other course content can be selected. In some embodiments, the snippet training may comprise a large number of trivia questions, so that in effect, there is only one training course where questions are selected from. This course content can be continually amended to add new questions. Various techniques can be used for defining bookmarks or avoiding their use all-together (including, e.g., selecting questions at random).

If the delivery of the course content is not completed in operation 830, then another test is made in operation 835 to determine if the agent is still available. The process continues to deliver content in operation 840 and loops back to operation 830 to continue testing whether the course is finished. If the agent is no longer available in operation 835, then the location in the course is bookmarked by updating the TCD and content delivery is terminated.

Snippet training may be provided when the agent is available, and the criteria for "available" can be variously defined. In one embodiment, an agent may be "available" based on how long the agent is the waiting mode (e.g., waiting for a call). A threshold may be defined and this value can be determined by querying the CHS or reviewing recent activity logs generated by the CHS. In other embodiments, other mechanisms can be used, such as monitoring keystroke activity in real time from the agent's computer.

In other embodiments, a determination of whether an agent is available is made based on analyzing the status of a group to which the agent belongs to. For example, agents having the same skill set may be defined in a certain group. A call center may have more than one group of agents defined. If that group's capacity is such that the call center can adequately handle the call volume with one less agent, then one agent from the group can be selected for snippet training. If the group is functioning at capacity, then it may not be appropriate to provide snippet training to the one available agent, as it may increase the average call waiting time for callers. Further, the analysis may be made for agents working only on a particular type of call, e.g., for a particular campaign. Thus, determining whether an agent is available may involve more than just determining whether the agent or call center is operating at a certain capacity.

Similarly, the determination that snippet training should be terminated may be determined based on the overall call volume requiring that particular skill set of that agent, or the call volume handled by the group to which the agent is assigned to. It would accomplish little to terminate snippet training to an agent because of increased calls to the call center, if that agent were not capable of handling those types of calls.

Similar to the provision of on-demand training, the delivery of snippet training can be further configured to be dependent on various factors. The Administrator can define various conditions which must be met (or which cannot be present) in order to deliver snippet training. This includes: defined training time windows, which can be expressed in different ways. An absolute time can be indicated when, e.g., snippet training cannot be provided (e.g., not during any morning shifts, but only during the late-night shifts). The time could be indicated as a percentage into, or from the boundaries of the agent's shift. For example, only provide snippet training during the last 25% of time in the agent's shift. A combination of conditions could be defined as well. Snippet training could be limited to being provided only during certain campaigns or when the overall call center capacity is below a certain threshold. The training window indicates time periods when training may potentially occur, not that it is required to occur. Those skilled in the art will recognize that various conditions and limitations for providing snippet training can be defined.

Book Marking

Bookmarking refers to management of an index into the course content indicating the point where content was last delivered to an agent. Bookmarking allows computer based course content to be interrupted. Interruptions can occur for various reasons, including: limited duration of training sessions, change in work load circumstances, or that the agent merely needs a break from training content delivery. Bookmarking provides a mechanism to interrupt a training session and easily return the agent to the location at which content delivery was interrupted. Thus, the ability to bookmark is often used to facilitate interruption of a training session to minimize wasted time associated with starting a training session again from the beginning.

Figure 9:
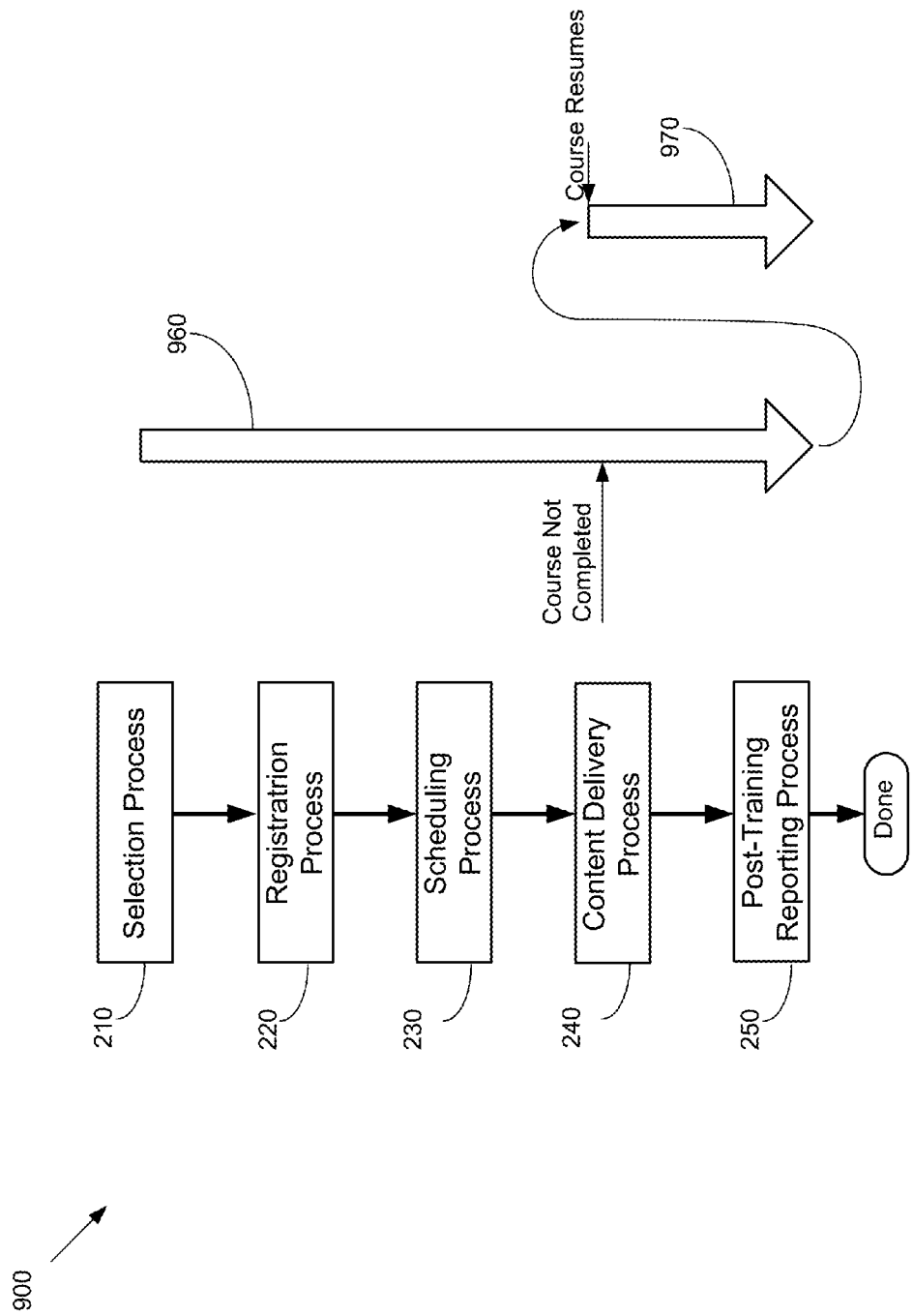
FIG. 9 illustrates one embodiment of a training flow overview where content delivery is interrupted and then resumed.

With respect to the process flow previously described, the process of bookmarking can be illustrated with FIG. 9. FIG. 9 illustrates the process flow for a fixed-time training flow (note the presence of the scheduling process 230 in the training flow). The agent is selected, registered, and scheduled as described previously. The content delivery process 240 is initiated, but during the training session, the process 960 is suspended. Process 960 is shown nevertheless as continuing to the post-training reporting process even though the content delivery process 240 is not completed. This is because the post-training reporting process may be used to report not only completed training sessions, but incomplete training sessions. Whenever the training session is stopped, it is not necessarily apparent at that time whether the interruption is merely temporary (e.g., a mini-break by the agent during the training session) or whether the training session will be resumed. Thus, the post-training reporting process is invoked at the cessation of content delivery and reports that the training commenced, but was not completed. This allows a bookmark to be established, which can be resumed if the training session resumes.

The resumption of the training course is depicted in process flow 970. The agent may have, e.g., decided to resume content delivery after a break in the training session. The remaining course content is delivered and the post-training reporting process is again invoked, but this time to report the completion of the training content delivery for the agent.

Training Context Data

The training context data comprises information used to determine a training context. The training context allows the appropriate work flow to occur. Depending on the features defined in an embodiment of an agent-based training system, the information stored in the TCD may vary. Recall that the genesis of the TCD is in the ATL generated by the selection process and one embodiment is shown in FIG. 10. This embodiment is not intended to be limiting, as different structures may be defined. While the TCD comprises information used in the provision of training, the TCD typically does not include the training content itself of the training course. Further, some information in the TCD may duplicate information found in meta-data associated with the training course. For example, the training course content may have meta-data indicating the course duration, which may also be indicated in the TCD. As it will be seen, in some embodiments the meta-data of the training content may be provided by a third-party content provider, and may not be readily available to the agent-based training system, hence it may be duplicated in the TCD.

The TCD can be indexed in various ways. In one embodiment, there is a record for each course associated with each agent. Thus, if ten agents are to receive the same course content, then there would be ten ATL records. If an agent were to receive six different training courses, then again, there would be six different records. In one embodiment, the provision of any training course, regardless of the training format, is uniquely associated with an ATL record. Thus, even a facilities-based, lecture-style training session may have one or more ATL records when using the agent-based training system to schedule the training session.

Turning to FIG. 10, the set of ATL records 1000 depicts four records comprising TCD for courses taken by the same agent. Each ATL record can be indicated by a column 1002, 1004, 1006, and 1008 each comprising a series of data elements. The function and utility of the ATL record can be illustrated by explaining each of these records and their respective data elements.

The first row of the table 1000 includes classifications (e.g., "Parameter, Fixed-Time Training, Conventionally Scheduled Training, etc.) which are aids used to explain the categories of the examples. These values are not part of the record. The record comprises a series of data elements (numbered 1-13.) The first record, shown in column 1002, illustrates one potential format for a fixed-time training session, which can also be characterized as a "conventionally scheduled training" session. In other words, this TCD reflects a course scheduled by an Administrator for that agent at a specific time. This value is reflected in the third data element, "CST".

The "Course ID" data element, the first data element, indicates the name or identifier of the training course. In this embodiment, for column 1002 it is "Beginning Skills 101," but could also be a numerical identifier. The next data element, "Agent Identifier," indicates the name of the agent. These values are determined during the agent selection process, which may be provided by the Administrator during agent selection. During the agent selection process, the Administrator may be prompted for these values, which are stored in the appropriate record. In this embodiment, Jane Doe is to receive training for the course entitled "Beginning Skills 101."

The "Training Format" data element, the third data element, indicates the training format. Choices may include: "conventional", "automatic", "snippet", and "on-demand". These values are shorthand indications for the characteristics of the training: "conventional" is shorthand for "conventionally scheduled training" which refers to fixed-time training that is scheduled by an Administrator. This value is typically determined during the agent selection process. "Automatic" is shorthand for "automatically scheduled training", which is fixed-time training scheduled by the system. "Snippet" and "on-demand" indicate snippet and on-demand training, which are flex-time training formats which are initiated by the system and an agent respectively.

The "Duration" data element indicates the time duration of course, which is indicated for this record 1002 as "30 min." This value may be copied from meta-data which is stored with the course data or which may be set by an Administrator when defining the course. This may be the actual duration of the content delivery time, or may be the time necessary to be allocated to the training session to deliver the content.

The "Scheduled Date/Time" data element indicates the scheduled date/time of the course. In this embodiment, Jane Doe is scheduled to receive the course content on Jul. 12, 2012, at 2:00 p.m. This value may be determined at different times. In one embodiment, the training may be determined by the Administrator well in advance of the work schedule for an agent. For example, the Administrator may know that a new campaign will be offered in two months, and that agent training will be required the week before it begins. In this case, the date or date/time of the training is known at the time the agent is selected. In another embodiment, the date of training is not indicated and will be determined taking into account the agent's work schedule. Regardless of when and how the training time is determined, it is determined at some point prior to the actual occurrence of the training and indicated in the TCD. Note that if the training is flex-time, then there is no scheduled date/time (which can be indicated by "N.A."). Because the training format is "CST", there should be a scheduled data/time value determined at some point.

The "Course Completion Date" indicates the latest date when the course should be completed. For fixed-time training, the completion date may be the same day on which training is provided. This data element is also useful for flex-time training, as will be seen. Specifically, for flex-time training, this indicates a date by when the training must be completed or should be provided. For flex-time training that may be perpetually available, this value may be set to a long-off future value.

The "Facilities Based" data element indicates if training is based in a training facility, e.g., a classroom. For the first record, which is column 1002, this value is set to "no," so training is not based in a particular facility or location. If the value is set to "no," the training is presumed in this embodiment to be e-learning-based training occurring at the agent's workstation. Conversely, if training does occur at a given facility (e.g., the value is set to "yes") then the training will not be provided at the agent's workstation, but at a facility. It is possible that the training in the facility may or may not be computer-based. The concepts and technologies disclosed herein can be used to deliver e-learning content to computers in a classroom.

The "Course Series Indicator" data element indicates whether there are multiple modules in a course or multiple courses associated in a curriculum. In the first record 1002, the value "1 of 1" indicates that this is a stand-alone course. A value of, e.g., 2 of 2 would indicate in one embodiment that this is the second of a two-part course or the second of two modules. This value may be used to determine if training should automatically continue with the next module or course in a series. Thus, in an "on-demand" context, after completing a first course, and there is another request for training, then the training may continue with the second course. In a fixed-time context, the modules may be presented in order during the training session. Other data structures can be used for indicating a course hierarchy as required. This data element can be further used to determine if all the courses in a curriculum have been taken, which can be used to determine that the agent has completed a course of study. Further information may be provided in the record to identify a link or identifier to the subsequent courses. Thus, the data structure could be used to link a series of records together in a curriculum.

The "Bookmarkable" data element indicator is used to indicate whether the course can be interrupted and resumed, e.g., bookmarked. Some courses may be structured so that they cannot be interrupted, and if so, then the course is reported as not completed and must be restarted from the beginning. Other embodiments may allow courses to be interrupted, and resumed after a break. In the first record 1002, the Bookmarkable indication is set as "yes" indicating this course in this training session can be interrupted. The actual bookmark value indicating where a bookmark is in the course content may be stored in the content itself or as another data element in the TCD.

The "Completion Status" data element indicates whether the course has been completed. Upon completion of the course, the Post-Training Reporting Process will set this data element value to "completed." In certain embodiments, a test score may be included in the TCD or linked to, along with an indication of whether the course was passed or failed. The post-training reporting process may record this information in the agent training profile. As noted previously, the TCD records can be viewed in one embodiment as transient information used to provide training courses, and are differentiated from information that is stored for long-term reference purposes, referred to as agent training data. Thus, the completion status may be copied into the agent training data to report that the agent completed training of the indicated course.

Other embodiments may also store in the agent training profile the date the course was taken, the test score, passing indicator, etc.

The "Start Status" data element indicates whether the course has been started. When the TCD is initially generated, this value is usually set to "no." Only when the agent has started the course is this value set to "yes." A "yes" value does not necessarily mean that the course was completed. This value is useful in flex-time training situations, since flex-time training sessions may be shorter and interruptible. If set to "yes" and the training course has not completed, then this suggests a bookmark was created.

The "Training Scheduled By" data element indicates the source that initiated the training flow. This value is largely used to differentiate between fixed-time training that is the result of Administrator input (e.g., manual agent selection) or the learning management system (e.g., automatic agent selection). If the former, then the Administrator identifier may be indicated for tracking purposes. This value may be used by the learning management system to determine whether to pre-empt training for an agent scheduled based on current circumstances. For example, training where the agent was automatically scheduled may be terminated or postponed if call volume load increases at the time of the training session and requires all available agents in the call center to handle the call volume.

The "Training Format for Remaining Portion" data element indicates how an unfinished portion of the training course may be delivered. Specifically, a training course maybe associated with an agent that is to be provided in one training format, but if uncompleted, it may be provided in another training format. In this embodiment, Jane Doe is to receive Beginning Skills 101 on the scheduled date/time (in a conventionally scheduled fixed-time training format). However, if the course is not completed (recall that the training session in this record can be bookmarked), then the remaining portion of the course could be accessed by the agent on an on-demand basis. In other embodiments, the remaining portion of the course might require rescheduling of the course in a fixed-time training format.

The other examples of the training context data in the other records, namely in columns 1002-1004 illustrate other training embodiments. These will not be discussed in detail, but a number of the salient distinguishing aspects are noted below. In the second record 1004, the "Training Format" is indicated as "automatic" (for automatically scheduled training). This means that the agent was selected for training by the learning management system. Similarly, any unfinished, remaining portion of the course is also indicated as being offered on an "Automatic" training format. It is noted that the course is for the follow-up course, Beginning Skills 102, and it is scheduled two days after Jane Doe's initial Beginning Skills 101 course.

The third record 1006 indicates "Training Format" as "snippet" which means training content delivery may be initiated by the system when conditions allow. Snippet training is often indicated as "Bookmarkable" allowing the course to be resumed when conditions allow. Further, any unfinished content can be completed in a snippet training format. Some snippet training courses can comprises very large content, which essentially cannot be completed. For example, a snippet training course may have 1000 trivia questions, which are constantly being updated or augmented, so that the training is never completed. In other words, snippet training can always be provided.

The fourth record 1008 is an "On-demand" training format which indicates the agent may request the training course at their convenience. The course can be selected up to the scheduled completion date (Jul. 12, 2012). After this point, the course may not be shown as it is unavailable. In other embodiments, the date could be set far out so that the course is always available. The course is "Bookmarkable" and since the course has been started, but not completed, a bookmark should exist for this course so that when the agent resumes training, the course is resumed at the previous point. The agent can resume the remaining course in an "on-demand" type of training format.

Certain combinations of data element values may not be allowed, or make not be commonly used. For example, a course cannot be indicated both as "completed" and "not started." In another example, it may be uncommon to allows an on-demand training course to be bookmarked, but then only provide the remaining training content in a fixed-time manner. This would mean an agent could initiate training at will for a course, but if interrupted, then the remaining portion of the course would have to be scheduled. However, even uncommonly used combinations are within the scope of the concepts and technologies presented herein and may have applications not readily observed.

Other combinations of data elements and values may be present and defined to indicate other contextual training information. For example, as indicated previously, a number of conditions could be defined to limit when flex-time training is provided. Additional data elements could be defined for each of these conditions, to provide additional customization specifying when the flex-time training is to occur. For example, data elements could be defined when on-demand agent training is not allowed for an agent, or when snippet training may be provided. These may be referred to as flex-time "training windows" as they define time periods when flex-time training may be provided, e.g., when the agent is eligible for receiving training, though it is not guaranteed that training will be provided during a training window. Thus, a novice agent may be prohibited from accessing training content on-demand whereas a senior agent may be allowed to within certain parameters. Since there are a variety of conditions that could be defined to delimit a flex-time training window, the data elements in FIG. 10 are only illustrative of one set of training contextual data that could be defined.

Other data elements could be defined to indicate whether a course has a curriculum status; namely indicating whether the course is mandatory, optional or remedial. This may facilitate scheduling aspects. For example, all agents may be scheduled to receive mandatory training, whereas optional courses may be provided on-demand. Or a priority for scheduling may be based on whether courses are mandatory, optional, or remedial. Remedial training may be provided that is provided to reemphasize certain training aspects, and its provision may occur only in certain circumstances, such as via a snippet training format.

Learning Management System Architecture

The above describes the training process flow and various training formats, and a record structure for indicating a training context. One embodiment of a learning management system for providing these flows and training formats is described in FIG. 11A. This architecture is only one possible embodiment, as one skilled in the art will recognize that various functions illustrated can be implemented in different ways without departing from the concepts and technologies disclosed herein.

Figure 11A:
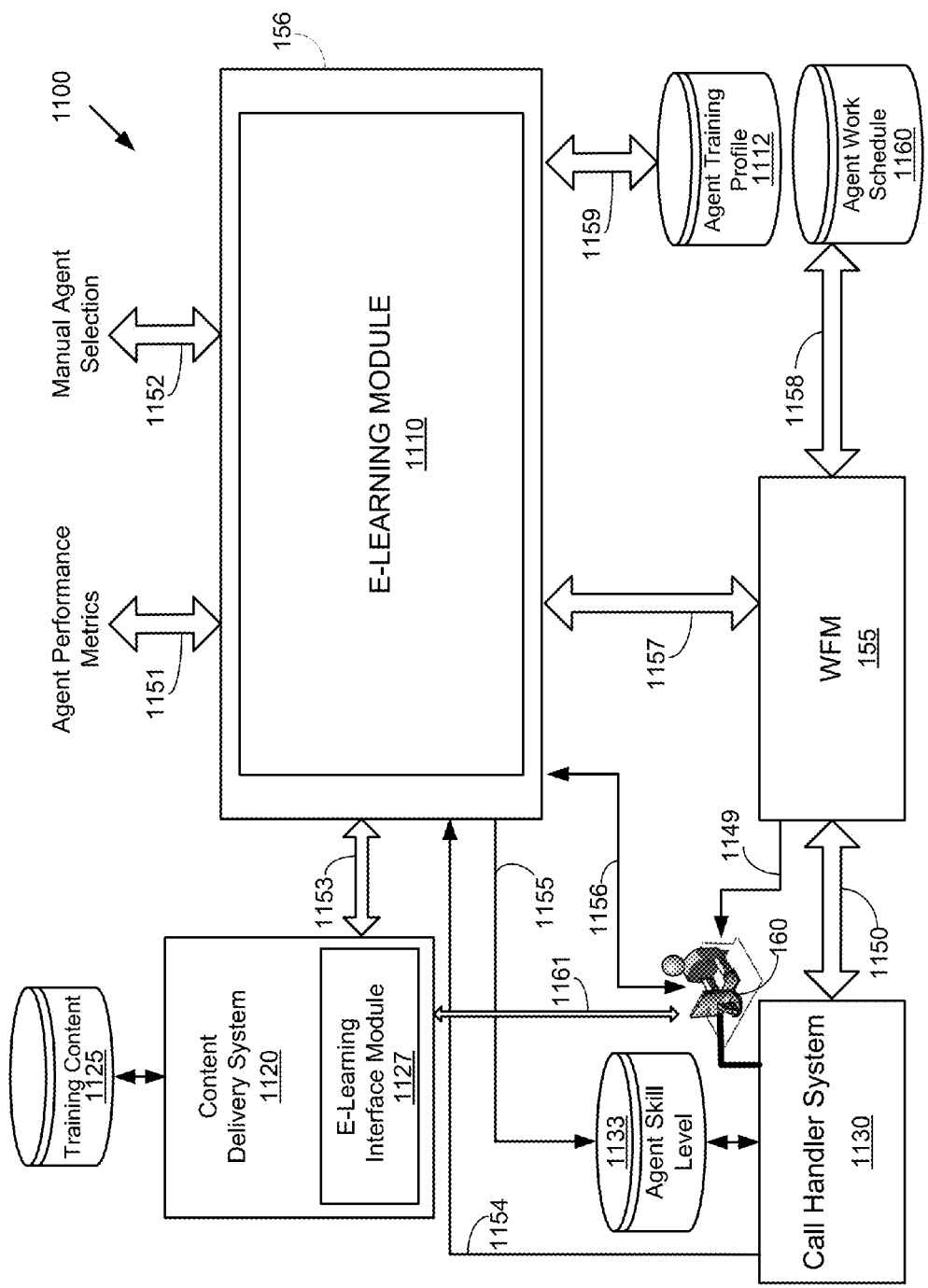
FIG. 11A illustrates one embodiment of a learning management system comprising an e-learning module.

Turning to FIG. 11A, the learning management system ("LMS") 1100 can broadly refer to the components shown, which may variously include modules, systems, and/or elements that interact and are used to accomplish delivery of training content as described herein. The e-learning system 156 is the platform that executes an e-learning module 1110, which in turn comprises a set of modules executing in one or more computing systems. The e-learning module 1110 is used to accomplish the training flow and coordination among other call center components that may be involved.

Before delving into the e-learning module 1110, some of the other components are discussed first. The call handler system 1130 refers to the various call processing components in FIG. 1 that may be present in a call center, which may include the ACD 130, dialer 150, CTI 145, and potentially other components. Because not all call centers may have each of these call handling components, the call handling system ("CHS") 1130 broadly refers to the components in FIG. 11A that are involved in handling calls, which can vary in each embodiment. The CHS 1130 may maintain a database 1133 storing agent skill level information, which can be used with skills-based routing of calls to an agent at a workstation 160.

The CHS 1130 may have an interface 1150 to a WFM 155 that schedules agents for working call campaigns in the call center. The WFM 155 may maintain a database 1160 of agent work schedule information, and which may store work schedules for each of the agents. The WFM 155 may provide notifications of the work schedule and training session to the agent via the agent workstation over an interface 1149 and/or over a mobile device used by the agent. The notifications may inform the agent of an upcoming lunch break, work break, or other activity, such as a training session. The WFM may also inform the CHS 1130 using interface 1150 when the agent's training session actually starts and ends. In this case, the WFM also identifies the agent to the CHS. This allows the CHS to suspend and resume call routing to the agent workstation 160 as appropriate. This avoids the agent from having to manually suspend and resume call processing. Consequently, when the agent is in a training session (or other break), the CHS is aware of the agent's status and suspends offering calls to the agent.

The LMS 1100 does not require that each embodiment necessarily include each of the components shown in FIG. 11A. In some embodiments, only a subset of the components may be present. For example, the CHS 1130 may be not integrated with the LSM 1100, which can be modeled as having the CHS effectively absent. In this embodiment, the LMS comprises the e-learning system, the WFM, and the CDS. The e-learning system coordinates with the WFM and CDS to providing training content to the agents, but there is no integration with the CHS. Thus, agents can be scheduled for training and receive content via their workstation, but the CHS is not apprised or updated in regard to the agent's training as completely as it could be otherwise. Thus, even if the CHS is not integrated with the e-learning system, the disclosed LMS can be deployed in a call center. In other embodiments, the LMS 1100 can be deployed in full or in part as a hosted service in a "cloud." The hosted LMS 1100 can interact and coordinate with various premise-based WFMs and/or CDS. Various other combinations of components may exist in other embodiments.

The WFM 155 may also provide a copy of the notifications of scheduled agent training session activities over interface 1157 to the e-learning module. Specifically, the WFM notifies the e-learning module when a specific agent is to begin or end a training session. (The e-learning module does not require being informed when the agent is on a work-break or lunch break). The WFM 155 only provides notifications for fixed-time training sessions, not for flex-time activities. Indeed, the WFM may not even be aware of flex-time training sessions involving the agent in all embodiments. Consequently, the WFM is aware of fixed-time training sessions for an agent, and will inform the e-learning module 1110 when a training session is to begin or end. The remaining coordination of training session activities is performed by the e-learning module 1110.

The e-learning module 1110 itself typically does not deliver the actual training content to the agent, but requests the content delivery system ("CDS") 1120 to provide the content to the agent. Thus, the e-learning module 1110 instructs the CDS to deliver or terminate specific course content to an agent. This is accomplished via an interface 1153 between the e-learning module 1110 and the CDS 1120. The CDS 1120 may be adapted to interface with the e-learning module by incorporating an e-learning interface module 1127. This allows streaming content delivery systems to be adapted for delivery of training content. The CDS 1120 may, in turn, access a database 1125 of training content, which is streamed or otherwise presented to the agent at their workstation computer.

In various embodiments, the CDS 1120 and training content database 1125 may be operated by a third-party service provider; e.g., by an entity that does not operate or control the e-learning module 1110, WFM 155, and/or CHS 1130. Thus, the interface 1153 may be configured to accommodate identification of a third-party CDS provider, incorporate appropriate security mechanisms, and accommodate invoicing and payment procedures. Further details about accommodating third-party CDS providers are discussed further below.

The e-learning module 1110 may also have interfaces into the CHS 1130, the agent skill level database 1133, and the agent workstation 160. The interface 1154 with the CHS is to receive indications of the agent's status, as well as call volume indicators and other data. The CHS can provide data indicating how busy the call center is, as well as a specific agent, or a group of agents. If that agent is not busy, the e-learning module 1110 can provide snippet training to the agent. If the call volume directed for a group of agents increases, then the e-learning module can cease snippet training to that agent.

The interface 1155 between the e-learning module 1110 and agent skill level database 1133 allows the e-learning module to update an agent's skill level once an agent has completed the appropriate training courses. Updating the agent skill level allows the CHS 1130 to update any skills-based routing after an agent has acquired new skills In this embodiment, the agent skill level database 1133 is distinct from the agent training profile database 1112.

Finally, the interface 1156 between the e-learning module 1110 and the workstation 160 allows the e-learning module to provide notifications to the agent regarding upcoming training sessions and perform other administrative functions involving the agent. This interface can be used by the agent to request, for example, on-demand training from the e-learning module 1110. The notifications can be provided on the agent's computer and/or to a smart phone used by the agent. The notifications may also inform the agent of successfully completing a course or curriculum, or achieving a higher skill level.

In some embodiment, the interface used by the agent to access on-demand learning may be from a different computer. Specifically, a call center agent may use their workstation at the call center to request on-demand training, but may also request on-demand training when at home, during their off-days. In this case, the interface 1156 may incorporate additional security mechanisms to allow an agent to log-on for on-demand training at another computer.

The e-learning module 1110 may also incorporate an interface 1151 to receive agent performance metrics. These metrics could be the result of agent call analysis using voice analytics or call handling metrics. These metrics could be provided by the CHS or quality assurance systems. (To the extent that these metrics are received from the CHS, then interface 1154 could be used.) The data received over this interface 1151 is used to select agents for training. The e-learning modules may incorporate various rules and thresholds used to analyze the agent performance metrics data in order to select agents for training.

Another interface that the e-learning module may incorporate is the manual agent selection interface 1152. This interface may be used for interacting with an Administrator for selection of agents for training. This may be based on a GUI interface used to access an agent selection tool to identify agents to be trained. In some embodiments, the manual agent selection interface 1152 is present whereas the agent performance metrics interface 1151 may be absent.

The e-learning module 1110 may also incorporate an interface 1159 to an agent training profile database 1112. The agent training profile stores agent training-related data that is maintained on a long-term or permanent basis. For example, the indication of training courses completed by an agent, the test results, and certifications of skill levels may be maintained in the agent training profile database 1112. Other information, including some which is found in the TCD, may not be retained. For example, information such as training course schedule times may warrant retention after training has occurred, although some embodiments may retain such records for a period of time after training. In some embodiments, the agent training profile database 1112 may be stored in the same physical storage unit as the agent work schedule database 1160, and in some embodiments both of these databases may be implemented with the WFM 155.

The diagrammatic representation of the system in FIG. 11A offers the benefit of, and addresses the corresponding problem of, adapting and reusing existing call center components as much as possible for use in a learning management system. This minimizes duplication of components to an extent and thus minimizes costs. The system architecture of FIG. 11A can be implemented using a variety of physical components and arrangements. Thus, the logical representation of the components in FIG. 11A can be implemented on a single processing system, a distributed processing system, or other configurations known in the art. Thus, it is possible that all the databases shown in FIG. 11A could be stored in one file on one storage system or as separate data structures in separate storage systems.

E-Learning Module

Figure 11B:
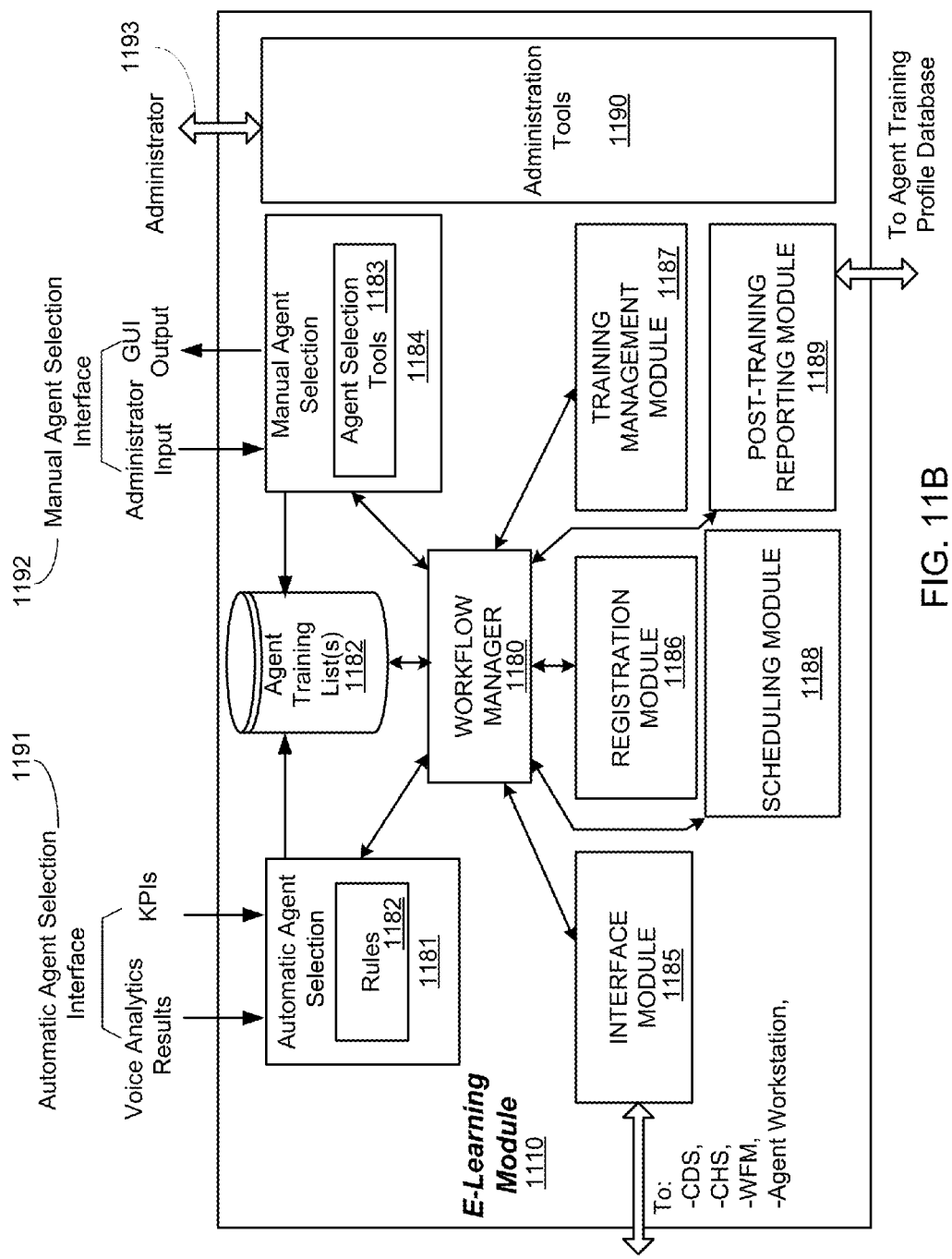
FIG. 11B illustrates one embodiment of the e-learning module.

The architecture of the e-learning module 1110 is further illustrated in FIG. 11B. The e-learning module 1110 can be implemented in various ways, and in one embodiment it may be incorporated into the WFM 155 as a module executing in the WFM platform. In other embodiments, the e-learning module 1110 could be implemented using a separate computing platform, the e-learning system 1111. Thus, the illustration of the e-learning module 1110 in FIG. 11A as being separate from the WFM is for illustration purposes only and does not imply any implementation requirements or limitations. To accommodate these various implementation options, reference is generally made to the e-learning module as opposed to the system platform it executes one.

In one embodiment, the e-learning module comprises a number of other modules performing various functions and operations. Again, various implementations may use a greater or fewer number of modules and/or allocate various functions and operations differently between the modules where feasible. In one embodiment, the modules correspond to the processes in the training flow previously discussed in conjunction with FIG. 2, specifically the agent selection process, the registration process, the scheduling process, the content delivery process and the post-training reporting process.

The selection process 210 is associated with two modules: the automated agent selection module 1181 and/or the manual agent selection module 1184. In other embodiments, only a single module may exist (e.g., the manual agent selection module), but for illustration purposes, two distinct modules are described. These two agent selection modules are both involved in selecting one or more agents to be trained and may incorporate various rules. Thus, these modules select agents in a different manner from each other, but share many common aspects. For example, the automatic agent selection module 1181 may receive inputs comprising agent performance metrics and agent voice analytic results and apply rules 1182 to select agents requiring training based on the received metrics. The manual agent selection interface 1192 may incorporate various agent selection tools 1184 aiding an Administrator in selection of agents. Both modules may interact with a database, the agent training list database 1182. This database stores the ATL including the TCD that is generated by the agent selection modules, and which may be accessed and/or updated by other modules during the training flow. These modules may retrieve a master list of agents from the WFM using the aforementioned interface 1157.

The registration module 1186 performs the functions of the registration process, and may utilize and/or update the ATL and TCD stored in the agent training list database 1182 generated by one of the agent selection modules 1181 or 1184. The registration module 1186 may also access information about training courses stored in a training management module 1187. The training management module may contain course related data (including course prerequisites) as well as defines rules for how registration may be governed. A result of the registration module completing is that the ATL is further updated to create the R-ATL.

Once the registration module 1186 completes registration, the scheduling module 1188 similarly may access and/or update the ATL in the agent training list database 1182 to schedule agents for the course. The interface to the content delivery system module 1185 provides the necessary interface to the CDS system 1120. Finally, the post-training reporting module 1189 reports the training results and updates the agent training profile database 1112.

The workflow manager 1180 controls which modules are invoked. Thus, after completion of the selection process by one of the agent selection modules 1181, 1184, the workflow manager will then invoke the registration module 1186 to perform the registration process. Next, the workflow manager may invoke the scheduling module 1188 to perform the scheduling process. The workflow manager may also invoke the interface to the content delivery system module 1185 to control the CDS 1120 delivering the training content. Finally, the workflow manager may invoke the port-training reporting module 1189 to accomplish the post-training reporting process.

The workflow manager may access the TCD in the ATL database 1182 to analyze the training context data to determine the proper workflow. As will be seen, the workflow manager may receive various triggering events that it processes to determine whether content delivery process should begin. Accessing the ATL database 1182 may be consulted to determine if the appropriate conditions have been met. In one embodiment, the initiation of the overall training flow may be started by one of the agent selection modules 1181 or 1184, and the remaining portion of the training flow is controlled by the workflow manager. In another embodiment, the overall training process can be initiated by the workflow manager, which then invokes one of the agent selection modules 1181 or 1184.

Finally, the administration tools 1190 provide an interface 1193 to the Administrator to define or modify various controls and parameters associated with system configuration. This may also allow the Administrator to access the training management module 1187 for setting, reviewing, and configuring the e-learning module. Thus, the interface 1193 can be used to define the available courses, course prerequisites, edit the TCD records, define rules associated with selection or registration, indicate course curriculums, define passing scores for a course etc. The interface 1193 and the administrator tools 1190 can also be used to review which agents have taken courses, average scores for a course, edit values, etc.

Although only the Administrator is shown as being able to access interface 1193 in FIG. 11B, certain functions of the interface, or a separate interface, may be available for agents to access. This allows the agents to review which courses they have taken or are available to take, when the agent is scheduled to take a course, review the curriculum or registered courses, request scheduling for a course, etc. The interfaces shown in FIG. 11B may be, in one embodiment, web-based so that either a user at a computer using a conventional web browser, or another computer using an appropriately defined application programming interface, can interact with the e-learning module as required.

The above description is a high level overview of one embodiment of the learning management system including the e-learning system 156 executing the e-learning module 1110. The various modules within the e-learning module could be implemented in various call center components. In one embodiment, the e-learning module is executed in the WFM 155, so that the WFM is effectively also the e-learning system 156. For example, the interface module 1185 may actually comprise further sub-modules for interfacing with various other components. The architecture disclosed in FIG. 11B can be embodied and implemented in various configurations without departing from the spirit of the concept and technologies disclosed herein. Further details about the modules within the e-learning module are discussed below.

Manual Agent Selection Module

The manual agent selection module 1184 may be used by an Administrator to select agents for training and to indicate the training courses agents are to receive. There may be various forms of agent selection tools 1183 provided to the Administrator for this purpose. In one embodiment, a GUI interface or wizard application can be provided by the manual agent selection module 1184 allowing the Administrator to select agents or indicate criteria for identifying agents for training. In some embodiments a structured query language or syntax can be defined allowing the Administrator to select agents by typing in a command line. Other tools for selecting agents may allow the Administrator to select and filter agents by various criteria, including by: seniority, employee type (full time/part time/seasonal), pay level, contract number, skill set, shift, days of week, etc.

The Administrator may indicate that agents are to be scheduled well in advance of normal work shift schedules. In such instances, the Administrator may indicate a time or date on which, or by when, training should be scheduled to occur. In other words, the training session is scheduled far out enough that the agent's work schedule, when subsequently generated, will accommodate the agent's scheduled training session. This may be referred to as the "training schedule leading the work schedule." In other embodiments, a work schedule may already exist for the indicated agents, and the training schedule is generated taking into account the existing agent's work schedule. In this case, the work schedule is said to "lead" the training schedule.

If the work schedule leads the training, then various criteria may be solicited from the Administrator to define when or how the training schedule should be incorporated into the agent's work schedule. For example, if the work schedule is already determined, but training is a priority, the system can schedule agent training on a priority basis without deference to the work schedule or call volumes. On the other hand, the Administrator may indicate that training should be incorporated into the work schedule at the lowest anticipated call volume. In this case, the training will be incorporated taking into account the anticipated call volumes during the agent's work schedule. The Administrator could further define certain days that training should be scheduled (e.g., on a day having historically low call volumes). In some embodiments, the Administrator can manually schedule the agents by indicating the training session times for each agent. Various other scenarios may be defined for incorporating the training into the work schedule.

If the training schedule leads the work schedule, then in one embodiment the Administrator selects the particular times or days on which training is to occur. This is quite often the case for facilities-based, fixed-time, training scheduling. In this embodiment, the Administrator may assign a group of agents for training on a certain date/time that coincides with the facility reservation. Thus, the form of the user interface provided to the Administrator via the manual agent selection module may vary based on the circumstances, e.g., whether the work schedule leads or the training schedule leads. The user interface may, as a first determination during the process, solicit input from the Administrator as to which schedule leads the other. If the training is flex-time, then another form of user interface may be appropriate.

Figure 12:
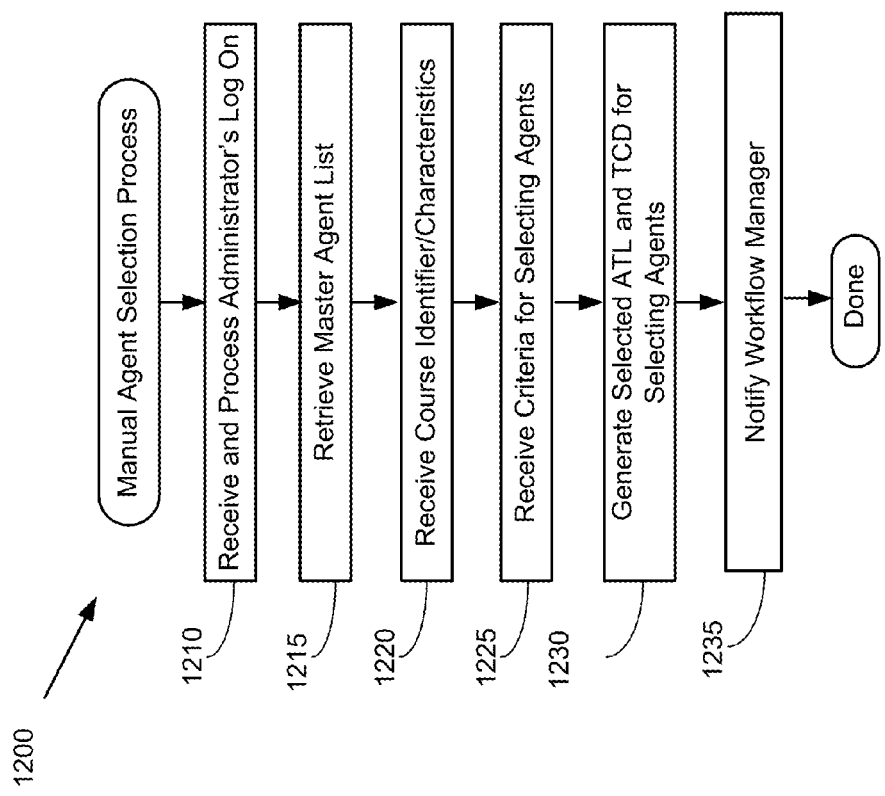
FIG. 12 illustrates one embodiment of a process flow associated with the manual agent selection module.

As evident, there are a number of procedures and process flows that can be associated with the manual agent selection module 1184. One high level embodiment is illustrated in FIG. 12. In this figure, the process begins with receiving and processing a log-on from the Administrator in operation 1210 that signifies initiating the training process. A master set of agents is retrieved from which the agents will be selected for training in operation 1215. The master list may be a list of all the employees that are employed in the call center. Agents that are not on the master list cannot then be selected to be included in an ATL.

In operation 1220, the manual agent selection module receives inputs from the Administrator indicating the courses involved in the training. This may be provided via drop down menus or other appropriate human-interface mechanisms. Similarly, in operation 1225, the module receives inputs from the Administrator indicating criteria for selecting agents from the master agent list. The criteria could be indicated using a command language, a selection of indicators presented on a GUI, or a list of agent names. The type of interface associated with operation 1225 may vary in different embodiments and may involve a number of other operations and interactions. Any number of database-interface search tools could be used.

After the courses and agents have been selected and associated with each other, the manual agent selection module 1184 then generates in operation 1230 the SEL-ATL and appropriate TCD. The SEL-ATL may be a list of agents and associated training courses. The SEL-ATL could be formatted to identify a training course and all the agents to be trained for that course. The SEL-ATL may be segmented so that groups of agents are segmented based on priority for a given course, course size, or some other criteria. For example, a list of 30 agents may be segmented into 3 groups of 10 and each group is associated with the same training course. Alternatively, the SEL-ATL may represent a group of 10 agents that are to be trained in 3 consecutive weeks of training or 3 groups of 10 agents for facilities-based training, etc.

The manual agent selection module 1184 also generates an initial version of a TCD. The TCD indicates data about the training context, and may include the data elements previously discussed in conjunction with an exemplary TCD format, as well as other data elements not shown in FIG. 10. To the extent that the Administrator provides input using the agent selection module for defining these data elements, the manual agent selection module provides an appropriate interface for allowing the Administrator define these data elements. The administration tool may provide another means to edit, modify, or otherwise define these data elements.

After the SEL-ATL is generated, the manual agent selection module 1184 then notifies the workflow manager in operation 1235. At this point, the workflow manager 1180 controls the invocation of the subsequent modules. Thus, while the training flow is initiated by the agent selection module (either 1184 or 1181), the workflow manager controls the remaining portion of the training flow. In other embodiments, the workflow manager could periodically poll the ATL database 1182 to determine that an ATL was generated by an agent selection module. The manual agent selection module 1184 may continuously check for Administrator input for initiating another instance of the training flow, as multiple training flows can occur. Thus, an Administrator could initiate a training flow for one course involving a group of agents, and then initiate another training flow for another course.

Figure 13:
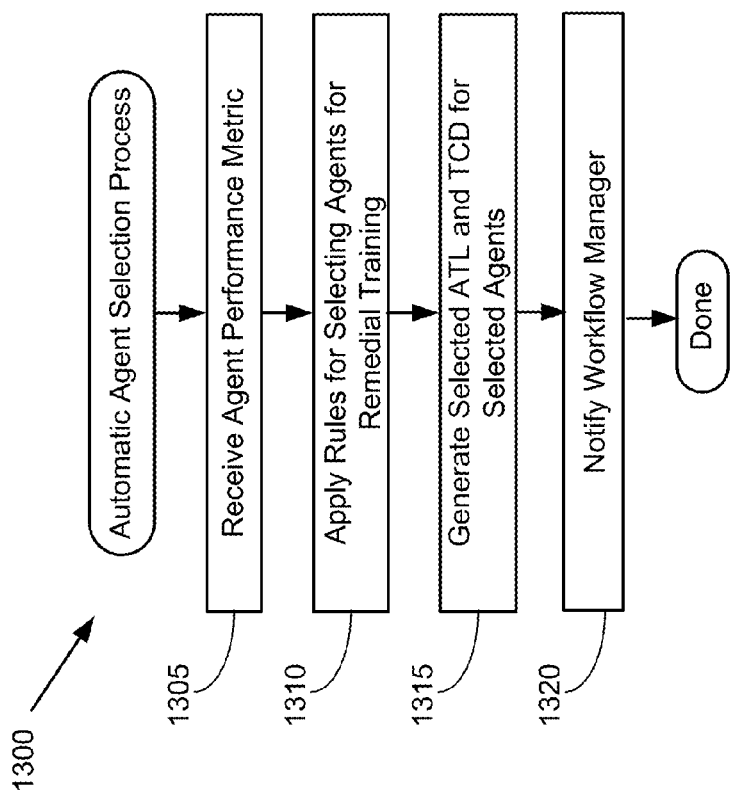
FIG. 13 illustrates one embodiment of a process flow associated with the automatic agent selection module.

FIG. 13 describes one embodiment of the process flow associated with the automatic agent selection module 1181. This module also selects agents to be trained as well as identifies the appropriate training course. This process 1300 begins in FIG. 13 with receiving agent performance related metrics in operation 1305. These metrics can be in various forms, and may report on all agents from which performance data is gathered. These can be received periodically, and can represent performance metrics for agents during a time window. Specifically, the performance results could be received on a daily or weekly basis.

In operation 1310, rules are applied in processing the agent performance related metrics to determine which of the agents are to be selected for training. The criteria may be based on analyzing performance data in light of a threshold level, and selecting agents with low performance metrics. Various algorithms and process flows could be defined for identifying the agents to be trained. The rules could be defined for the context of a particular outbound campaign.

Once the agents are selected and the appropriate training courses have been identified, then in operation 1315 the SEL-ATL is generated along with the TCD. That the agent placed on an ATL occurred by the automatic agent training module is noted in the TCD so that the learning management system is able to differentiate between an agent selected by the automatic agent selection process and an agent selected by the manual agent selection process. As was previously noted, the learning management system may determine the training flow based on how the agent was selected for training in light of conditions in the call center.

After the ATL and TCD are generated, the automatic agent selection module may inform the workflow manager in operation 1320. The workflow manager may then invoke other modules to complete the training flow. The ATL generated by either type of agent selection processing module identifies the agents and courses, and the next step is registering these agents for the course is required. Normally, the registration module would then be invoked to perform this process.

Registration Module

The registration process module registers the selected agents identified in the ATL for the indicated courses. The registration process module ensures, in part, that the requirements and rules required to register the agent for a course are met. In one embodiment, the registration process module is invoked by the workflow manager after completion of the agent selection process by one of the agent selection modules. One process flow for the registration process module is shown in FIG. 14.

Figure 14:
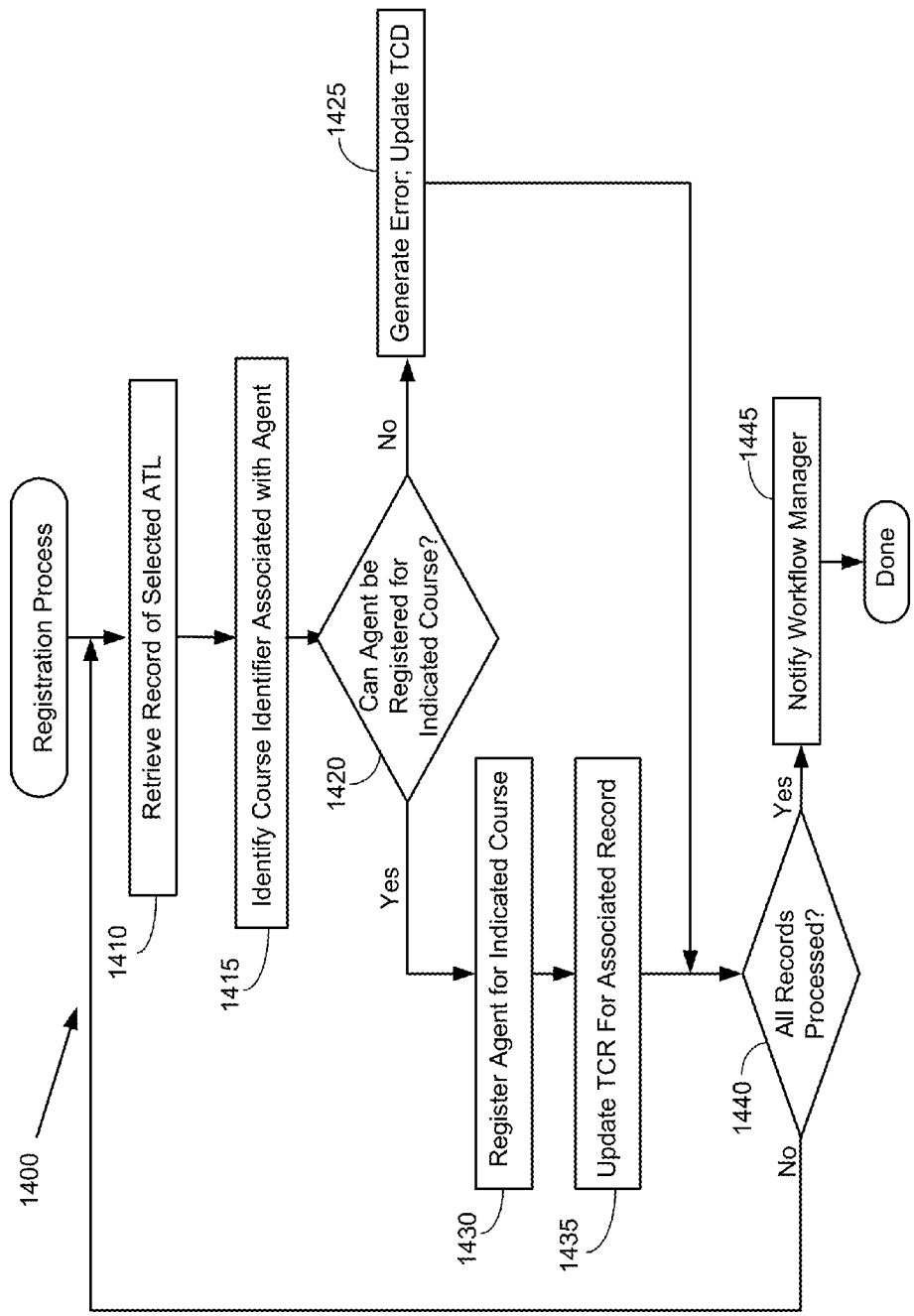
FIG. 14 illustrates one embodiment of a process flow associated with the registration module.

In FIG. 14, the process 1400 begins with retrieving the appropriate record from the SEL-ATL in operation 1410. The process 1400 involves an overall looping process where each record in the ATL is processed. For the initial pass, the initial record is retrieved. It is assumed for purposes of illustration that each course and/or agent to be trained is indicated in a distinct record. After the initial (or next) record is retrieved, then in operation 1415 the course associated with the agent is determined.

In operation 1420 a determination is made to see if the agent can be registered for the indicated course. The exact parameters used to determine the outcome of this test can vary with each embodiment and there may be a number of tests involved.

The determination of whether the agent can be registered may involve accessing two types of data stored in the training management module 1187. The first type is course-related data ("CRD"). CRD includes data associated with a particular course that may be used to determine whether registration can occur. The CRD may contain other course data used for other operations during the training flow. Exemplary data may include:

course duration: indicates how long the course is. Restrictions may be defined in a call center limiting the number of training hours for an agent during a given time period. The course duration may be used to determine whether the agent can be registered. This value can also be used during the scheduling process to determine the times when to schedule training.

course prerequisites: this indicates any courses that must be completed previously by the agent before the current course can be registered. The registration determination may include retrieving the agent profile and comparing courses taken to ensure that the prerequisites have been taken and passed.

preferred training format: this indicates whether the course is preferably a manual scheduling based training course, automatic scheduled based training course, snippet based training course, or an on-demand training course. An agent may be restricted from receiving on-demand training course, or other training formats. Further, courses themselves maybe limited to certain training formats.

maximum number of registrants/current number of registrants: this indicates if there is a limit on the number of registrants and the current number of agents currently registered. If the course is at capacity, then further agents may be prohibited from registering in that course. E-learning courses may be unlimited in the number of registrants that can take the course, but in other embodiments, courses may be limited by the size of facilities or by a number of licenses for using the course content, etc.

course status: this may be a general purpose flag indicating whether registration is open or closed. While capacity restraints may close a course to registrants, other aspects may cause a course to be closed to further registrants.

course provider: this identifies the course provider. This may indicate one of various third-party providers by name or provider number.

i. For third-party providers, additional information may include a contract number associated with receiving services from the third-party provider, ii. Access control information, so as to properly access the third-party provider, iii. Payment information, for invoicing and providing payment, etc. and contract number, to define a financial contractual context with the course provider.

Other parameters may be involved depending on the embodiment.

The second form of data that may be used to determine whether an agent can be registered are training management rules. These are rules which may be defined for the call center, agent group, or some for other context, that define additional criteria for agent registration. There may be any number of rules that can be defined that must be met in order to register an agent. These can be set using the administrator interface 1193 previously mentioned. Some examples include:

No agent can have more than 15 hours training per week,

No agent can have more than 8 hours training per day,

No agent can be registered for a course requiring out-of-state travel expenses,

No agent can be registered for a course requiring a certain skill level that the agent does not currently have, or An agent to be trained cannot be listed in a "training exclusion list."

Many other possible rules or criteria governing how or whether an agent could be registered can exist in other embodiments.

If it is determined that in operation 1425 that registration cannot proceed, then an error is generated and recorded in the TCD. The process continues at operation 1440 where a determination is made whether any additional records are to be processed.

If the agent can be registered, then in operation 1430 the agent is registered. In one embodiment, registration can be indicated by appropriately updating the TCD to record information associated with agent registration in operation 1435. Course-related data, such as the number of agents current registered in the course, may also be updated.

In operation 1440, a test is performed to see if all records have been processed. If not, then the process reiterates and selects the next record by returning to operation 1410. Otherwise, once the processing is complete, then in operation 1445 the workflow manager is informed that registration processing is completed. In other embodiments, the workflow manager may periodically poll the ATL or TCD to determine whether a change in the training flow is appropriate. In some embodiments, the registration processing module can be integrated or incorporated into the agent selection processing module.

Once the registration module has updated the TCD, the ATL may be referred to as a registered ATL ("R-ATL"). The registration process 400 can process a multitude of records associated with an ATL, and may be processing multiples ATLs.

Scheduling Module

The scheduling module schedules the agents identified in the R-ATL for the courses indicated. This presumes that the agents are registered for fixed-time training. In one embodiment, the scheduling process is not performed by the scheduling module itself, but coordinated by the scheduling module. In one embodiment, the scheduling module may invoke a scheduling engine residing in a WFM that is used for scheduling agents for call center shifts. Thus, the scheduling engine in the WFM is reused for scheduling agent training. This facilitates integrating the agent's work and training schedules.

Figure 15:
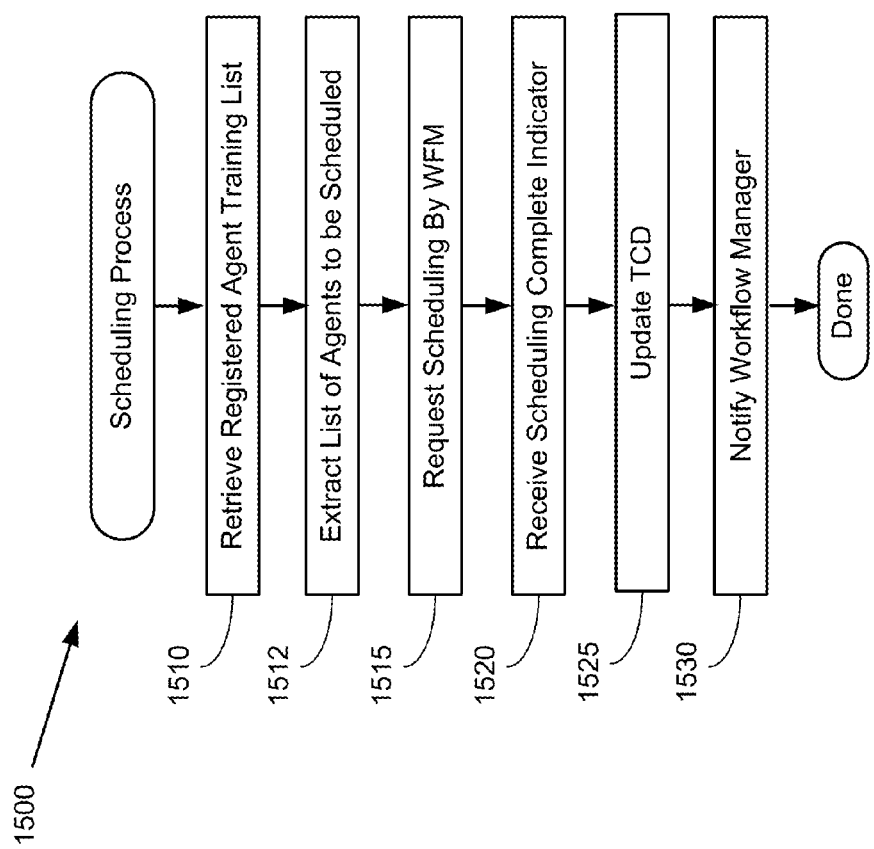
FIG. 15 illustrates one embodiment of a process flow associated with the scheduling module.

Recall that the scheduling process may not be involved in every training flow. Specifically, flex-time training courses do not involve course scheduling. Assuming that fixed-time training is involved, the process flow 1500 as shown in FIG. 15 may occur. The process begins with the scheduling module retrieving the R-ATL along providing the associated TCD information in operation 1510. Since not all agents will be involved in fixed-time scheduling, the scheduling module extracts only those agents in the R-ATL involved in fixed-time training in operation 1512 that are to be scheduled. Once the agents associated with fixed-time training are identified, the scheduling module then provides a set of records to the WFM module in operation 1515 for the agents requiring scheduling, thereby requesting the WFM to actually schedule the agents. In operation 1520, the scheduling module receives a scheduling complete indicator from the WFM indicating that the agents have been scheduled.

The actual scheduled times for each training course may be stored in the WFM in conjunction with the agent's work schedule. The scheduled times may also be reflected in the TCD for the agent. In other embodiments, a flag may indicate in the TCD that scheduling has occurred, and the TCD has a link to the actual training schedule information in the WFM. Thus, it is not necessary in all embodiments that the scheduling module actually receive the schedule itself from the WFM. As noted, the scheduling module does update the TCD to reflect scheduling has occurred, since the WFM may not be aware of the TCD structure. In some embodiments, the WFM may store and indicate the training course scheduled for the training session in the agent's schedule. In some embodiments, the WFM can store this information as plain text, since the WFM does not need to recognize the training course indicated for the agent at the given time. Once the TCD is updated in operation 1525, the schedule module in operation 1530 informs the workforce manager that scheduling is complete.

Interface Module

The interface module ("I/F module") interfaces the e-learning module with the content delivery system and other components to coordinate delivery of training content to the agent. In many embodiments, the I/F module itself does not deliver content, but coordinates with other systems or components that deliver actually deliver the content, such as the CDS. The CDS itself may be an available training system adapted to interface and coordinate content delivery with the e-learning module.

The I/F module interfaces not only with the CDS, but with other components as will be seen. As will be seen, some of the functionality involved between the I/F module and the workflow manager can be allocated differently. In one embodiment further described herein, the I/F module operates to convey and convert messages from one format to another so that the workflow manager (and/or other modules) can effectively communicate with the CDS, CHS, WFM, and agent workstation.

Figure 16:
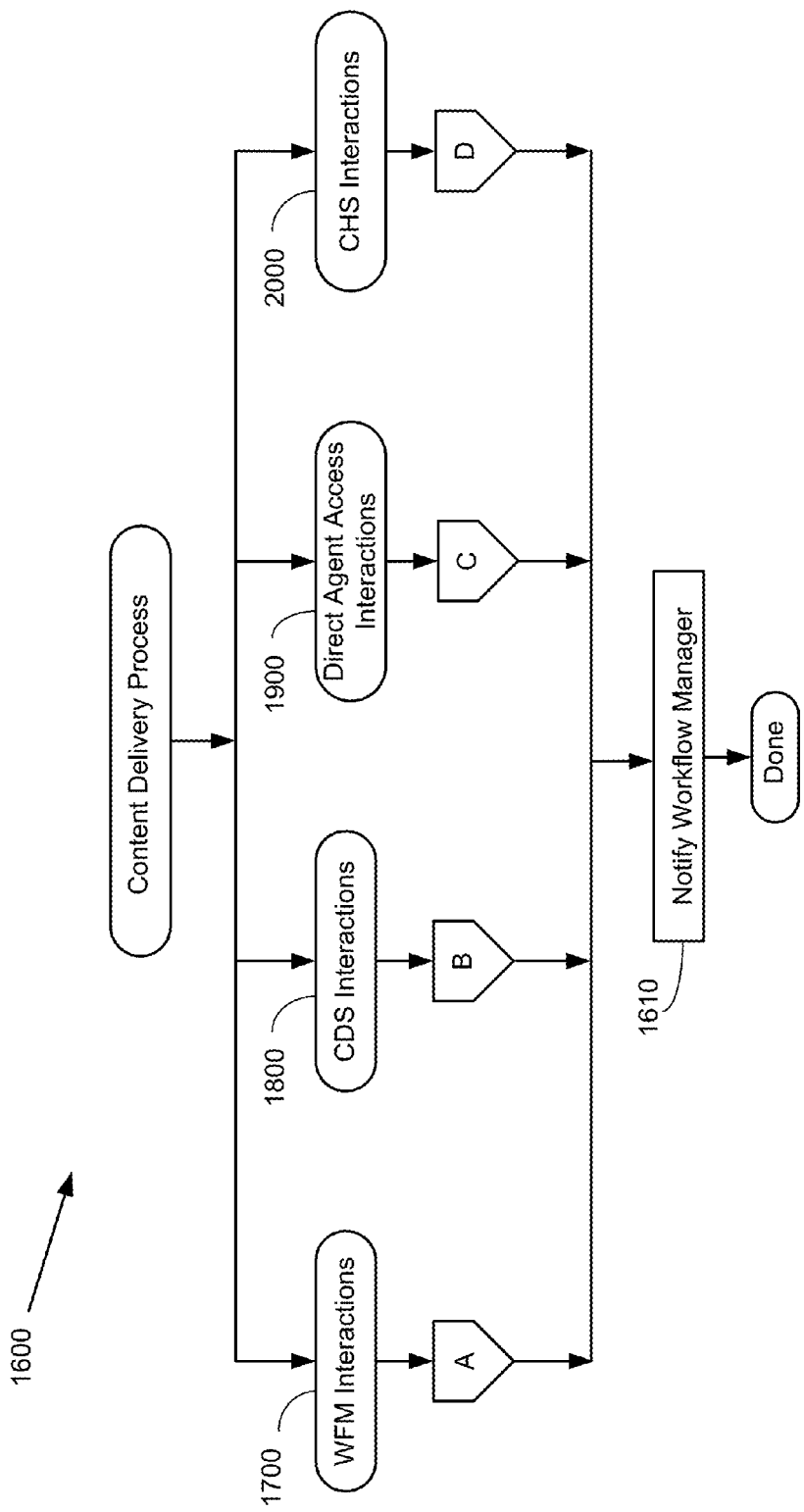
FIG. 16 illustrates one embodiment of a process flow associated with delivery of training content.

The process flow associated with the I/F module 1185 is dependent on the particular training format to be provided by the learning management system. The workflow manager is aware of the training format via the TCD, and informs the I/F module. (Alternatively, the I/F module may determine this itself by analyzing the TCD.) The I/F module then appropriately interfaces with the CDS and other call center components as appropriate to achieve the content delivery. Specifically, the I/F module 1185 may interface with the WFM 155, CDS 1120, agent's workstation 160, and CHS 1130 as shown by process 1600 in FIG. 16. Each of these interfaces are discussed individually as WFM interactions 1700, CDS interactions 1800, agent workstation interactions 1900, and CHS interactions 2000.

Interactions involving the I/F module may notify the workflow manager after completion of an interaction in operation 1610, and may receive further invocations from the workflow manager. These aspects will become evident in reviewing the various types of interactions identified above.

WFM Interactions

Figure 17:
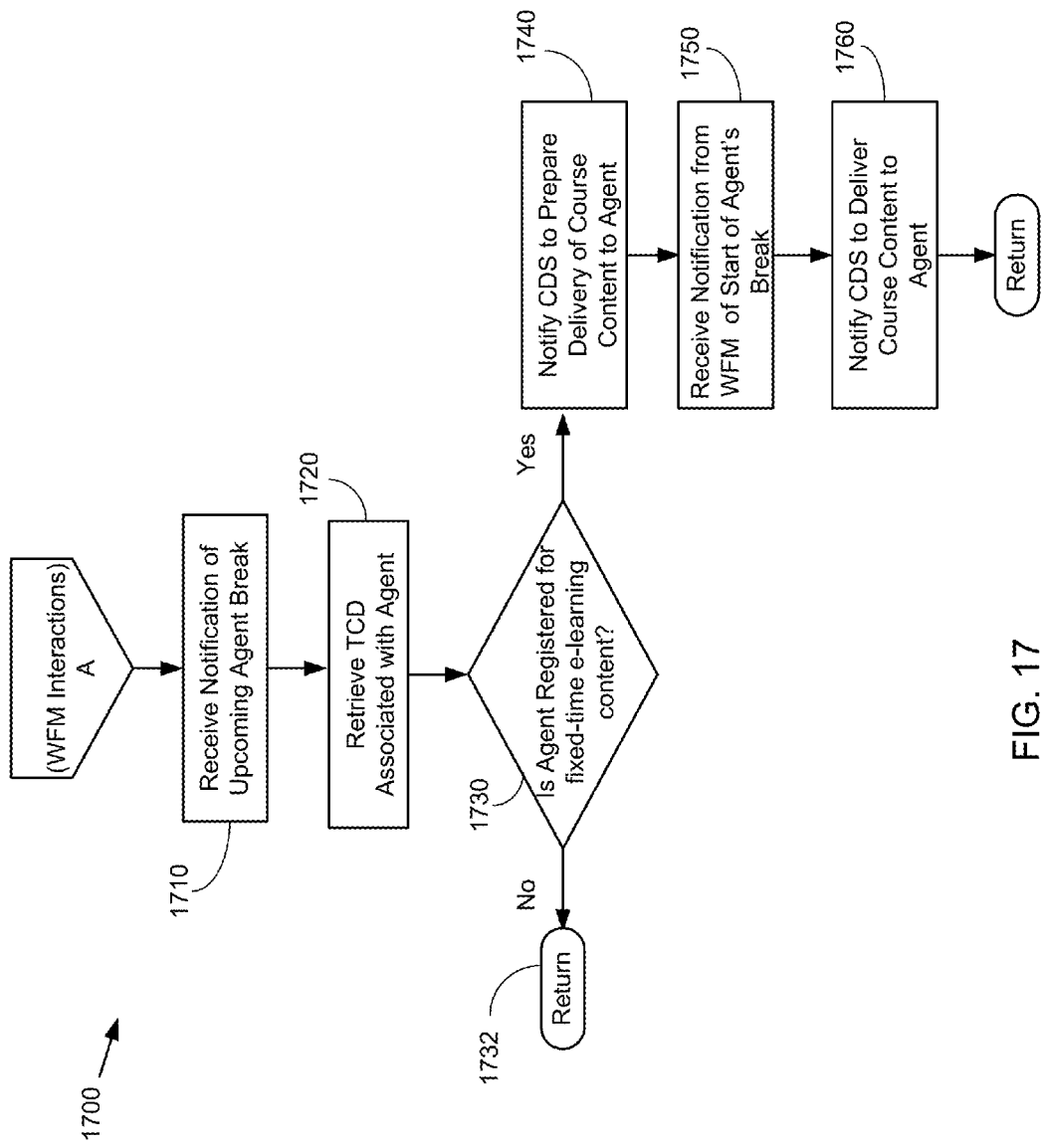
FIG. 17 illustrates one embodiment of a process flow interacting with the workforce management system.

The I/F module 1185 may interact with the WFM 155 in part by receiving various notifications pertaining to the beginning or ending of an upcoming training session and provide a corresponding command to the CDS 1120 to begin or terminate training content delivery. The process 1700 is shown in FIG. 17 and begins with the I/F module receiving from the WFM a notification of an upcoming training session for an indicated agent over interface 1157. The WFM may or may not be necessarily aware of the specific training course that an agent has been scheduled for, but the WFM is aware of the times that the agent is scheduled for fixed-time training.

The I/F module receives the notification from the WFM in operation 1710 and retrieves a TCD associated with the agent (this assumes there is a TCD associated with the agent; the absence of a TCD suggests an error condition). An examination of the TCD will indicate whether the agent is registered for fixed-time training. If the agent is not associated with fixed-time training (e.g., flex-time training) as tested in operation 1730, then the process returns in operation 1732 back to process 1600. This would be an error condition, since if the WFM has scheduled a training session and issued a training session notification, then there should be a TCD indicating the fixed time training session.

If the agent is registered for fixed-time training in operation 1730, the TCD will indicate the associated course that is to be taken, and other relevant contextual information about the training. As result, processing proceeds to operation 1740.

In operation 1740, the I/F module informs the CDS to prepare for the delivery of the indicated content to the indicated agent. In some embodiments, the WFM may issue an early indication notification before an upcoming training break (e.g., 5 minutes before) followed by a notification of the actual start of the training break. If so, then in one embodiment, the I/F module may indicate a corresponding notification to the CDS.

In operation 1750, the I/F module receives from the WFM the notification of the start of the training session and in response notifies the CDS in operation 1760 to begin delivery of the course content to the indicated agent. In some embodiments the early notification of an upcoming break is not provided by the WFM, and only the actual start of the training break is indicated by the WFM. A similar early/actual notification process may occur when the training break is about to end or actually is ending. Specifically, the I/F module may send a corresponding command for ending content delivery to the CDS.

CDS Interactions

Figure 18:
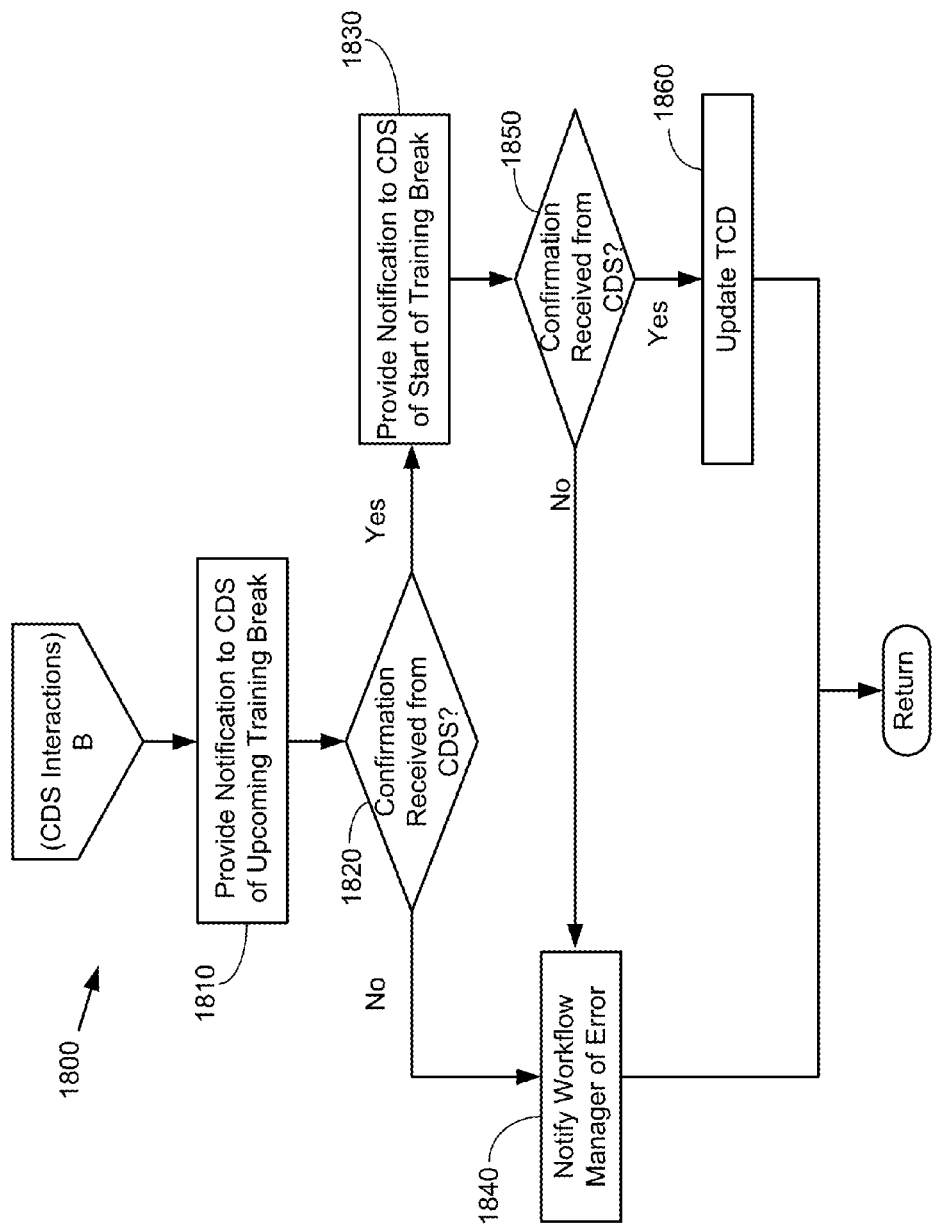
FIG. 18 illustrates one embodiment of a process flow interacting with the content delivery system.

The interactions between the I/F module and the CDS dovetail with the interactions between the I/F module and the WFM. Specifically, the I/F module interactions with the CDS may mirror the indications of the early notification of an upcoming training session and the actual notification of the beginning of the training session. The process flow 1800 of FIG. 18 details these interactions.

In operation 1810 a notification is provided to the CDS by the I/F module of an upcoming training break for an agent. This is sent in response to receiving the notification from the WFM. In operation 1820, a test is determined if confirmation is received from the CDS. If so, then after receiving an indication of the actual start of the training break from the WFM, a notification is sent to the CDS in operation 1830 of the beginning of the training session to provide the training content. The TCD is updated to reflect that training was initiated for the indicated course. If in either operation a confirmation is not received by the I/F module from the CDS, an error notification may be made in operation 1840 to the workflow manager.

Direct Agent Workstation Interactions

The I/F module 1185 may also interact with the agent directly via the agent workstation 160. In one embodiment, the I/F module 1185 may relay indications to the agent at the workstation regarding the early notification or actual notification of the beginning of a fixed-time training session.

Figure 19:
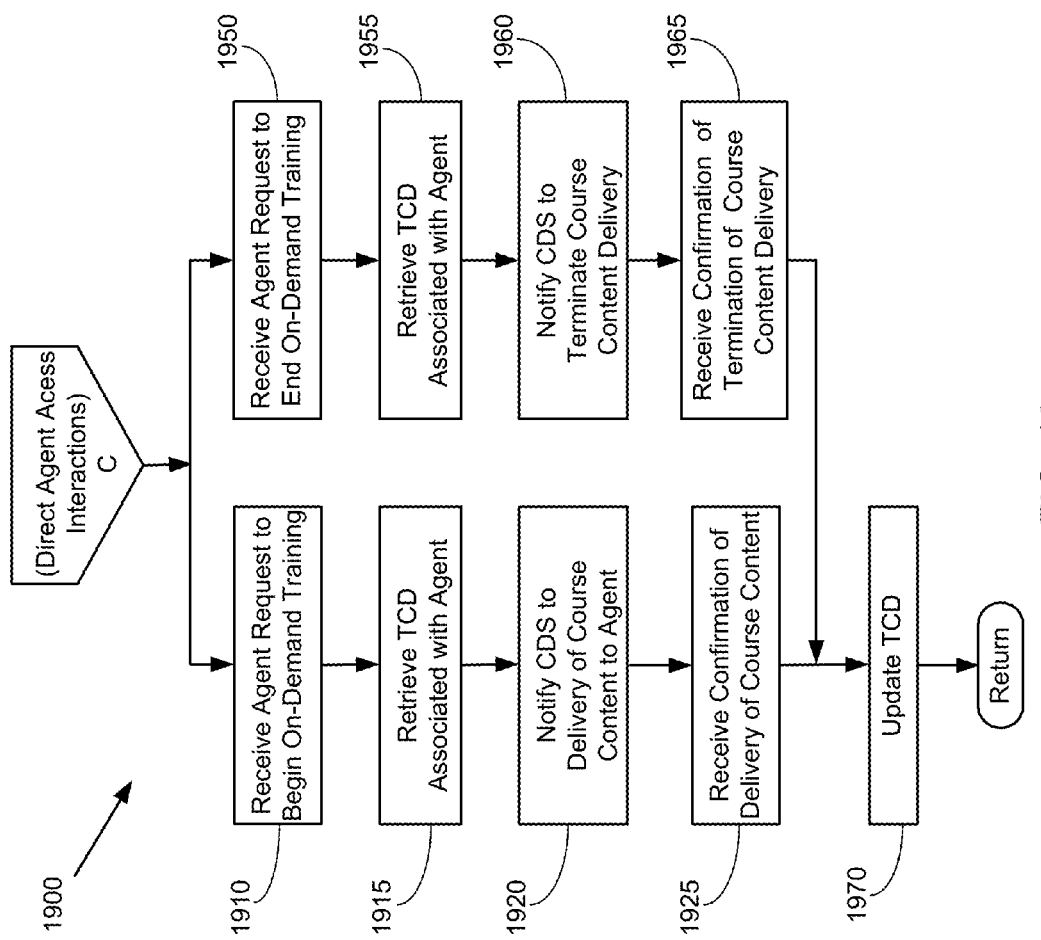
FIG. 19 illustrates one embodiment of a process flow interacting with an agent.

In other embodiments, the I/F module 1185 may be involved with interactions associated with flex-time training that is initiated by the agent. Specifically, in one embodiment, the I/F module receives requests for on-demand training originating from the agent as shown in FIG. 19. In flex-time training initiated by the agent, there are no notifications sent to the agent about a scheduled training session.

In FIG. 19, the process 1900 typically involves receiving either a request from the agent to begin on-demand training in operation 1910 or a request from the agent to end on-demand training in operation 1950. If a request for on-demand training is received in operation 1910, then in operation 1915 the TCD associated with that agent is retrieved. It is presumed that the agent has been registered for receiving on-demand courses (if not, the process would generate an error and return, which is not shown in FIG. 19). The TCD indicates which course(s) the agent may receive in what training format. Assuming the agent is registered for the requested course, a notification is provided to the CDS to begin delivery of the requested training content in operation 1920. In operation 1925 a confirmation is received that the CDS is providing the content, and the TCD is updated appropriately in operation 1970. Specifically, the TCD is updated to reflect the course has been started.

On the other hand, if the agent request received is to terminate on-demand training as indicated in operation 1950, the TCD is retrieved in operation 1955 and the CDS is instructed in operation 1960 to terminate the content delivery. A confirmation of termination is received in operation 1965 and the TCD is updated to reflect the cessation of the training. The TCD may up updated to reflect the course was completed or not, and if not, a bookmark may be recorded in the TCD.

CHS Interactions

Figure 20:
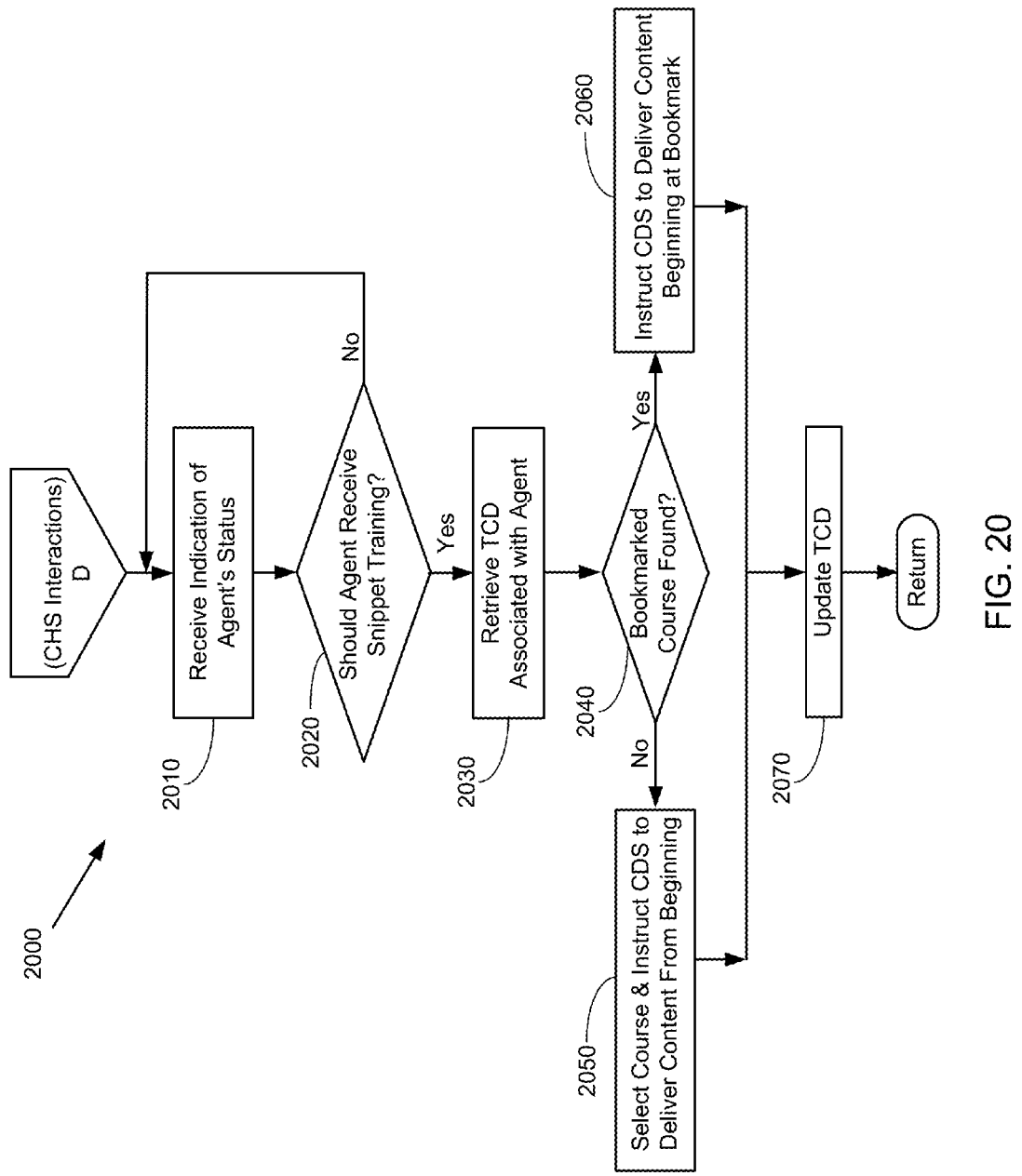
FIG. 20 illustrates one embodiment of a process flow interacting with a call handler system.

The I/F module 1185 may also interact with the CHS 1130. These types of interactions are often associated with flex-time training that are initiated by the e-learning module, as opposed to the agent. In one embodiment, the I/F module receives indications of an agent's status from the CHS and the e-learning module uses this to determine whether snippet training should be provided to the agent. One embodiment of the process 2000 is shown in FIG. 20.

In operation 2010, an indication of the agent's status from the CHS is received by the I/F module. The agent's status may be idle, and the I/F module may determine that conditions allow the agent to receive snippet training in operation 2020. This may be determined by the I/F module itself by applying various training management rules and/or by accessing TCD information associated with the agent. In other embodiments, another module may be queried (not shown) and may make the determination whether snippet training should be provided. If no training is to be provided (e.g., the agent has not been idle sufficiently long or call volumes are not sufficiently low), then the process may loop back to operation 2010. If the agent is to be provided with snippet training, then in operation 2030 the associated TCD information is retrieved so that a determination can be made as to which training courses may be provided.

In operation 2040 a determination is made whether a previous snippet session was interrupted. In other words, was a previously started course not completed? If so, then in operation 2060 the I/F module instructs the CDS to provide content for that course beginning with the bookmark. If there is no unfinished course, then in operation 2050 the I/F module instructs the CDS to deliver content from the beginning of a new (not completed) course. In other embodiments, the bookmark may be maintained by the CDS so that the I/F module merely has to inform the CDS of which course to provide and the CDS starts at the bookmark.

After the CDS has been informed, the I/F module updates the TCD so that data is maintained about the current training status of the agent. A process flow also exists for the I/F-module indicating to the CDS to cease snippet training, which can be based on indications from the CHS provided to the I/F module via interface 1154 of increased call volume. Appropriate updates to the TCD are performed as well when snippet training is ceased.

Post-Training Reporting Module

The post-training reporting ("PTR") module 1189 reports the training results to update training information in the agent's training profile. The PTR module may be invoked by the workflow manager whenever delivery ceases for a training course, which can occur after completion of the course, or because delivery of the course was interrupted.

Figure 21:
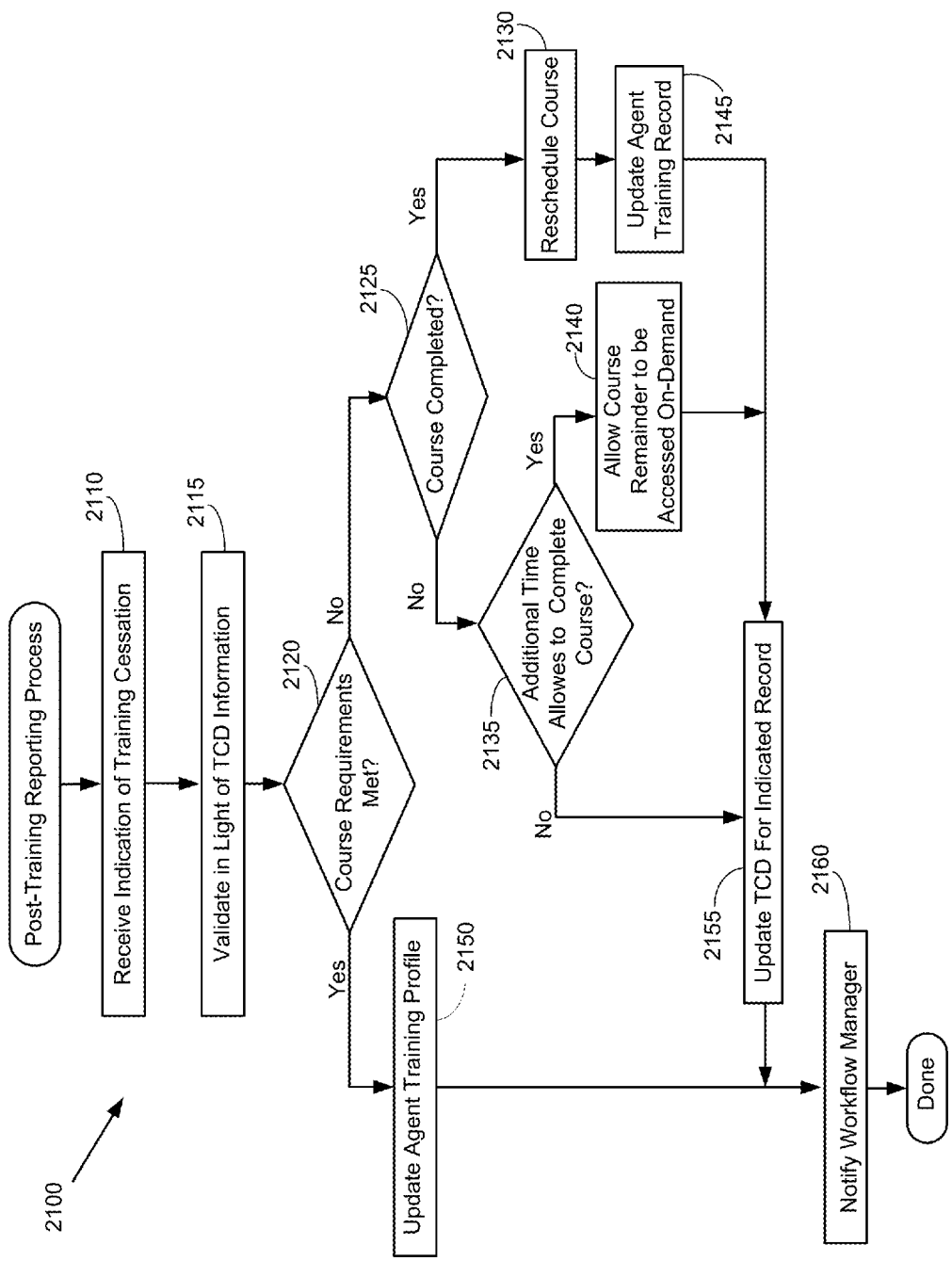
FIG. 21 illustrates one embodiment of a process flow associated with the post-training reporting module.

The process 2100 is shown in FIG. 21 and begins with receiving an indication of training cessation. This indication could be received by the workflow manager and used to trigger invocation of the post-training reporting module by sending a similar indication to the PTR module as shown in operation 2110. In other embodiments, the indication could be directly received by the post-training reporting module. The indication could be generated by the CDS in an automated form, or the indication could be provided by the Administrator after a conventional classroom training session has completed.

In operation 2115 the post-training reporting module retrieves the TCD information and validates that the agent should have received the course content. If the course was not to be provided, or that agent was not to receive training, then receiving such a training completion indicator would be an error condition. (This would be reflected by updating the TCD, but this operation is not shown in FIG. 21).

A test is performed in operation 2120 to determine whether the course requirements were met. This may involve: determining that the entire course was delivered, that a series of courses were completed, that any tests associated with the courses were passed, or other such criteria as appropriate. If the course requirements are completed, then in operation 2150 the agent training profile is updated as appropriate. In operation 2160 the workflow manager is informed, and the process is completed.

If, in operation 2120, the course requirements are not met, then the reason why they were not met may be analyzed. In this embodiment, a determination is made in operation 2125 whether the course delivery was completed. If not, then in operation 2135 a determination is made whether additional time may be allocated to complete the course. This would include, e.g., determining whether the course remainder can be completed via on-demand training. If not, then the TCD is updated to reflect the course was not completed. If, in operation 2135, additional time can allocated, then in operation 2140 the course may be indicated as available for on-demand training, and then the TCD is updated as appropriate in operation 2125.

If in operation 2125 the course was completed (but the course requirements in operation 2120 were not met), then this may be indicative that the agent failed a test on the course. In this case, the post-training reporting module may reschedule the course for the agent in operation 2130 and update the agent training profile accordingly in operation 2145. Alternatively, the post-training reporting module may simply report the condition and let, e.g., the Administrator determine whether the course should be rescheduled. The TCD is appropriately updated in operation 2155 and the workflow manage is notified in operation 2160. In some embodiments, the TCD may record the number of times an agent can take a course, and enforce a limit as to how many subsequent attempts are allowed.

The post-training reporting module reports the cessation of training when updating the agent profile and/or the TCD regardless of training format. In certain embodiments, depending on the form, if the training requirements are not completed, then the remaining portion may be continued via on-demand training. Alternatively, if training was completed, but not passed, then the training course may be rescheduled. In any case, the TCD is updated so that the e-learning module knows the current status of the training, including whether it was satisfactory completed, why it was not completed, and whether it should be available for completion via flex-time training or rescheduled as fixed-time training.

In some embodiments, the post-training reporting process may report partial completion of a training course that can never be completed. For example, a snippet training course may comprise a large number of trivia questions that are presented in a round robin or selected in a random manner. The course content may be periodically updated. In essence, this course is never completed, and the nature of the course may be such that no permanent updates to the agent training profile are made. The TCD is continually updated to reflect which question was last presented to an agent, and the course is indicated as "started" but "uncompleted." However, it may be that the training course is never intended to be completed.

The post-training report module may also generate reports to the agent for reporting course results. Alternatively, this functionality may be provided via the administration tools. This functionality allows the Administrator to view course status, pass rates, agent results, etc.

Those skilled in the art will recognize that other variations are possible, and additional data elements in the TCD may be used to properly define the training context status to allow determination of which actions are to be provided by a particular training flow process module.

Workflow Manager

The workflow manager 1180 ensures that the other modules are invoked as needed, and in the correct order. The workflow manager may also handle various exception conditions. In various embodiments, the workflow manager may or may not initiate the training flow, but in either instance coordinates the sequence of the training flow. In one embodiment, the initiation of the training flow may begin either by processing agent performance metrics (the automatic agent selection) or by processing Administrator input (manual agent selection) by the agent selection module.

Figure 22A:
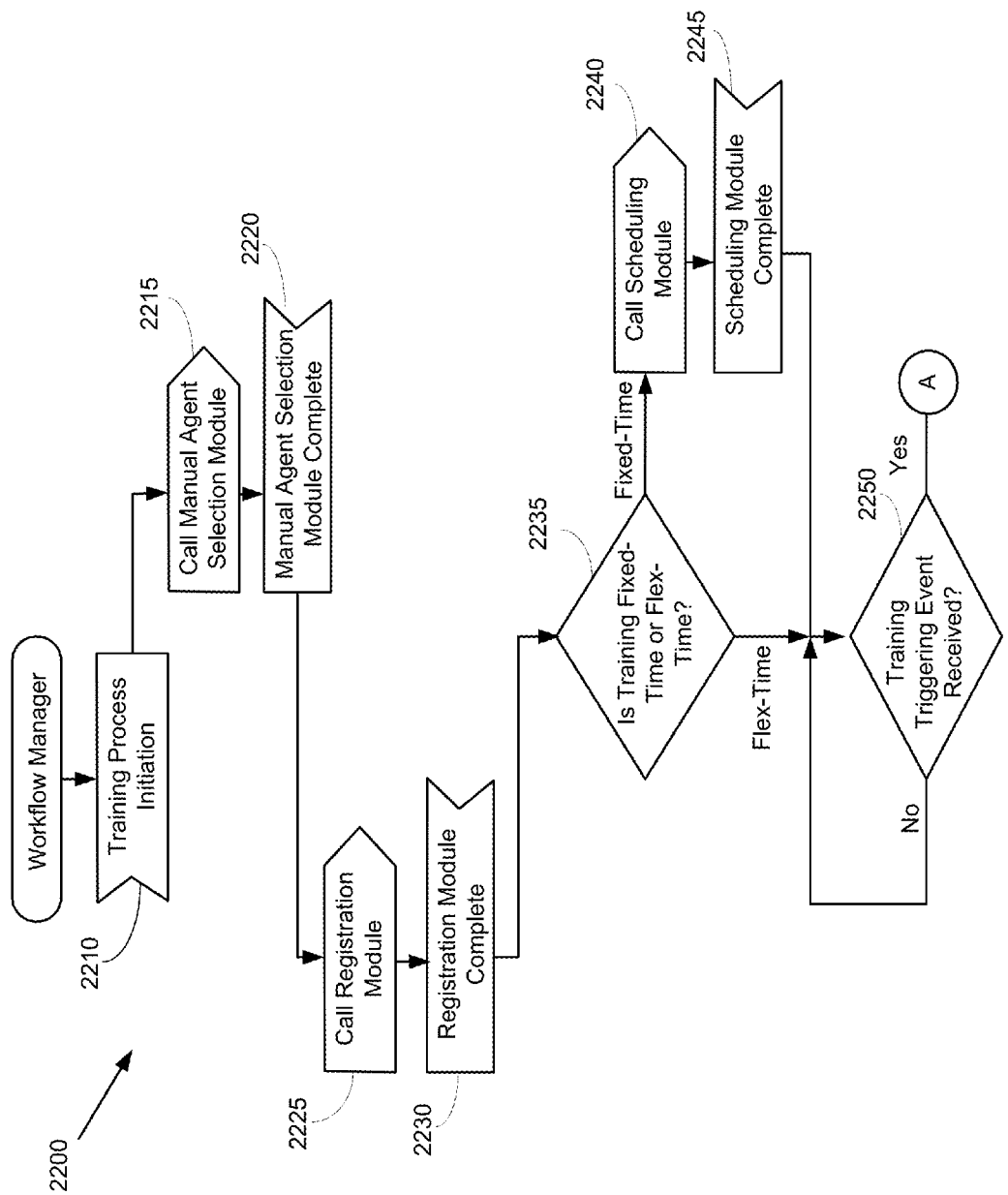
FIGS. 22A-22B illustrate one embodiment of a process flow associated with the workflow manager.
Figure 22B:
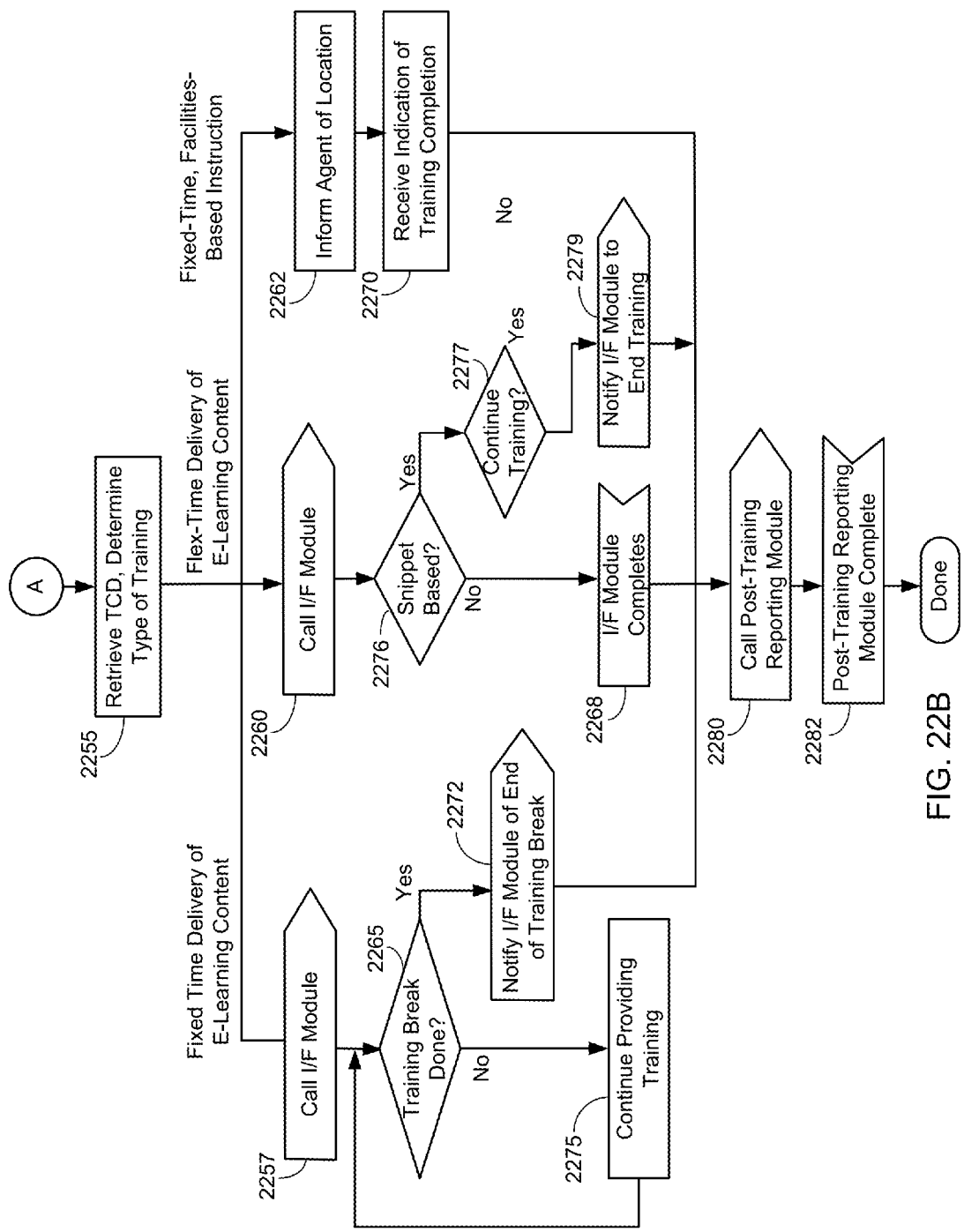

FIGS. 22A and 22B illustrate one process flow associated with the workflow manager. In this embodiment, the workflow manager initiates the training flow. Thus, the workflow manager in this embodiment receives a request from an Administrator to begin the training flow. (In other embodiments, the agent selection module may receive the request which initiates the training flow.) Beginning with FIG. 22, the process 2200 begins in operation 2210 with the workflow manager receiving input for initiating the training flow. This input could be, e.g., an Administrator indicating that training is to be provided to agents.

The workflow manager in operation 2215 then invokes the manual agent selection module. This module may provide various GUI based agent selection tools allowing the Administrator to select agents for training for a particular course. After the manual agent selection module has completed, it will notify the workflow manager which receives the notification in operation 2220. At this point, an SEL-ATL exists.

Next, in operation 2225 the workflow manager invokes the registration module that uses the SEL-ATL to then register the agents. Once the registration module has completed, an indication is received in operation 2230 that registration is completed. At this point, an R-ATL exists.

The workflow manager next determines in operation 2235 for each agent and/or course, whether the training is fixed-time or flex-time training. If the training is fixed-time, then scheduling is required. This results in the workflow manager invoking the scheduling module in operation 2240. Once scheduling has completed, an indication is received at the workflow manager in operation 2245. At this point, a schedule is created, but in many embodiments this is stored in the WFM. In some embodiments, scheduling information may also be stored in the ATL. If the training is flex-time, then no scheduling is required, and the scheduling module is effectively bypassed.

The workflow manager may wait for an event to trigger the training in operation 2250. This event is referred to as a "training triggering event" ("TTE") and how and when it is generated depends on the training format involved. For fixed-time training, the receipt of a training notification from the WFM may function as the TTE. The TTE could be either an indication of an upcoming training break for an agent or the actual notification of the beginning of the training break. For flex-time training, the TTE could be receipt of an agent request to initiate on-demand training. The TTE could also be a determination from a process monitoring the agent status and determining the agent is available for snippet training.

Turning to FIG. 22B, the workflow manager in operation 2255 retrieves the TCD to determine the training format involved. The actions the workflow manager takes at this junction may depend on the training format. The choices for one embodiment are shown in FIG. 22B, which represent three common training examples:

fixed-time delivery of e-learning;
flex-time delivery of e-learning; and
fixed-time, facilities-based instruction.

Other examples are possible, as FIG. 22B is intended to be illustrative, and not exhaustive in scope.

The fixed-time delivery of e-learning content can be embodied by an agent being assigned to take an e-learning course at their workstation during a scheduled training session. When content delivery occurs, the workflow manager invokes the CDS-I/F module to instruct the training content to be delivered in operation 2257. During the delivery of content, the WFM may track when the agent's training scheduling, including when the break is about to end or actually ends. The WFM will notify the e-learning module of the end of the training session, which informs the workflow manager that the training break has completed. Consequently, the workflow manager effectively determines in operation 2265 whether the training break is completed or not. If not completed, then the training content continues to be provided in operation 2275 and loops back to operation 2265. If training is completed, then the workflow manager in operation 2272 informs the CDS-I/F module that the training break is done, which in turn informs the CDS to cease content delivery.

If, in operation 2255 the TCD indicates that the training is flex-time delivery of e-learning content, the workflow manager then invokes the CDS-I/F module in operation 2260 to provide the training content. Flex-time training of e-learning content may be either on-demand or snippet based. If the latter, then the e-learning module may terminate snippet training if call volumes increase so that the agent is required to handle calls. Thus, in operation 2276 the workflow manager determines whether the training is snippet based. If so, then in operation 2277 the workflow manager will periodically check whether conditions allow training to continue. Various other conditions may be defined limiting snippet training. If conditions in operation 2277 allow training to continue, then the process loops back and continues monitoring conditions. If training cannot continue in operation 2277, the workflow manager notifies the I/F-CDS which in turn informs the CDS system to end snippet training.

If, in operation 2276 the training is on-demand (e.g., it is not snippet based), then the training may continue until the course is completed which is reflected in operation 2268 by the workflow manager receiving an indication of completion from the CDS-I/F module.

Returning to operation 2255, the workflow manager may perform another course of action if the training is fixed-time, facilities-based instruction. In this form of training, the agent is scheduled to report to a training facility, such as a classroom. In this case, the workflow manager may inform the agent of the location in operation 2262 and after the course the instructor may provide the training results. This may result in the workflow manager calling the post-training reporting module in operation 2280.

The workflow manager may invoke the post-training reporting module in operation 2280 after training is completed (regardless of training format) so that updates to the agent profile may be maintained. The post-training reporting module may invoked by the workflow manager to update the agent training profile in light of the updated TCD information. Once the post-training reporting module has completed as reflected by receiving an indication in operation 2282, the workflow manager process is done and the training flow is completed.

One skilled in the art will recognize that a number of process flow variations are possible with respect to the workflow manager. For example, some of the functions identified as occurring in the workflow manager may occur instead in one of the invoked modules. For example, if the training is fixed-time, facilities-based instruction, then a GUI may be provided to the classroom instructor so they can report whether the agents attended the session, completed the course, and passed any tests. If so, the GUI could be provided either by the workflow manager or the PST module. The GUI would collect and pass the data to the post-training reporting module.

Exemplary Message Flow

Figure 23:
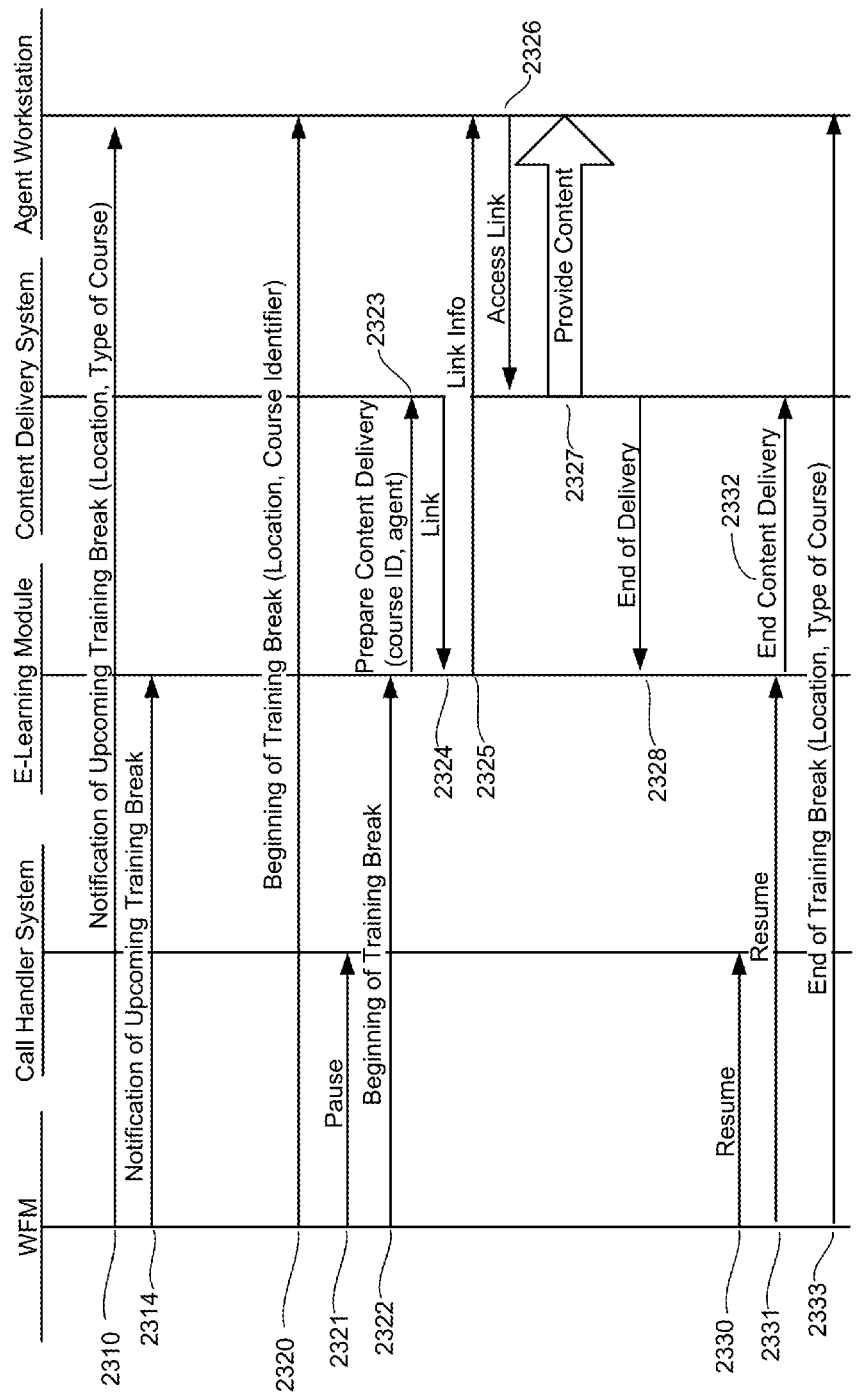
FIG. 23 illustrates one embodiment of a message flow associated with delivery of content during the training flow.

The coordination of activities between the various identified components and modules can be further illustrated by the message flow shown in FIG. 23. This message flow illustrates only one portion of the messaging between various components, and focuses on messaging involving the delivery of the training content. It is assumed that agents have been selected for training in some manner, e.g., the ATL indicates the agents that were selected, registered, and scheduled for training. In this example, the messaging flow is for delivery of training content in a fixed-time manner and is further based on the training content being delivered to the agent's workstation, as opposed to a facilities-based lecture format.

Turning to FIG. 23, there are five entities represented: the WFM, the call handler system, the e-learning module, the content delivery system, and the agent workstation. The process begins with message 2310 which is initiated by the WFM and sent to the agent workstation informing the agent of an upcoming training break. The WFM may indicate text, along with the time of the upcoming training break, indicating the purpose of the training. For example, the early notification message could indicate: "You have an upcoming training session on 'Telemarketing Basics' at 2:30 p.m." The WFM may send what is essentially a copy of this message, or one with similar content, to the e-learning module in message 2314. These messages, which are sent to the agent's workstation and the e-learning module, may be sent contemporaneously or in reverse order from what is illustrated. The early notification of an upcoming training session may not be implemented in all embodiments, but doing so provides the agent with time to prepare for the training session.

The next set of messages, 2320, 2321, and 2322 are the actual notification message initiated by the WFM to indicate the actual start of the training session. The message 2320 is sent from the WFM to the agent workstation to inform the agent of the beginning of the training session. Contemporaneously, a message 2321 is sent from the WFH to the call handler system to "pause" the agent from receiving calls. Finally, another message 2322 is sent from the WFM informing the e-learning module of the start of the training session for the agent. This message 2322 may also indicate the course number to the e-learning module and the agent identifier.

In some embodiments, the agent may be asked to confirm that they are ready to receive the training. This embodiment is not shown in FIG. 23.

The e-learning module upon receiving the notification of the beginning of the training break 2322 can treat this message as a training triggering event. This message 2322 from the WFM to the e-learning module causes the e-learning module to initiate content delivery. The initiation and delivery of content is represented by messages 2323, 2324, 2325, 2326, and 2327. Specifically, the message 2323 is sent from the e-learning module to the content delivery system to instruct it to prepare for delivery of the indicated training content. In response, the content delivery system returns in message 2323 a link, comprising an URL or other form of address. This message is sent from the CDS to the e-learning module to forward the link to the agent workstation. The e-learning module sends the link in message 2325 to the agent workstation. The messaging may include various security checks, such as a time-limited security value used by the CDS to verify that the requesting agent is authorized to access the CDS. Specifically, the message 2324 provided by the CDS may have a security nonce that is conveyed to the agent workstation and incorporated in the access messaging 2326 to authorize that agent. After the link is sent to the agent's workstation, the agent may select the link in message 2326 which can be interpreted as a request to the CDS to access the training content. The content delivery system may verify the information and then provide the content in message(s) 2327.

The above messaging example is one mechanism for accomplishing the connection between the agent workstation and the content delivery system. The provision of the training content can be in various forms. The agent workstation may access a web site hosted by the content delivery system or receive a presentation file downloaded to the agent workstation and executed locally. The concepts and technologies disclosed herein can be used with any of the known methods for transferring training information between a computer and a server, including those involving use of scripting languages, applets, locally executed programs, web browsers, web-based languages, etc. Thus, the messaging 2323-2327 is one embodiment of how content can be delivered to the agent's workstation, and those skilled in the art may define other approaches for the e-learning module to coordinate content delivery from the content delivery system to the agent workstation. The content delivery can take various forms, from a multimedia presentation, interactive GUI, webinar, web-cast, or other forms known in the art.

After the training content 2327 has been delivered, the content delivery system may transmit a message 2328 to the e-learning module indicating that training has been completed. This may cause the workflow manager to invoke the post-training reporting module. This may result in messaging internal to the e-learning module, which is not shown in FIG. 23.

After the completion of the training session, the agent may still have remaining time of a work shift to complete, and so the agent has to be returned to a state ready to handle calls. This is accomplished in messaging 2330-2333. The WFM monitors the time and knows when the agent's training session is scheduled to end. In message 2330 the WFM sends a "resume" message to the call handling system to inform it that the agent is now available to handle calls. Contemporaneously, the WFM provides a copy of the "resume" message 2331 to the e-learning module to inform it that the training break has ended. In one embodiment, the training break may already have ended before the "resume" message is sent to the e-learning module so as to provide a time buffer for the agent. If the content delivery system has not informed the e-learning module that content delivery has completed, then the e-learning module will transmit a message 2332 indicating that the training session has ended and that the content delivery should terminate content delivery. The WFM may also provide a message 2333 to the agent workstation indicating that the agent is now "on-line" for handling calls. The notifications from the WFM to the agent workstation may involve displaying an icon or sending a message to the agent's workstation indicating the change in status.

As shown in FIG. 23, the message flow for coordinating the beginning of a training break involves the following components: the WFM which maintains the agent's schedule, the call handler for suspending and resuming calls to the agent, the content delivery system for delivering training content, and the e-learning module coordinating these components. The messaging shown is illustrative of one embodiment and other embodiments may involve a greater degree of handshaking between the components, error handling, and features.

Third-party Content Delivery System

The CDS may be a closely integrated system operated and controlled by the call center, which may operate and control the WFM and CHS. In other embodiments, the call center may contract out to a third-party content training provider. In this embodiment, the CDS may be remotely accessed, and can be one of several CDS utilized to provide training content to agents in the call center.

A third-party training content provider may generate training content offered as a fee-for-service. For example, a third-party training provider may provide training content for a certain topic, which may be required to meet various federal regulations or industry certifications. For example, a call center dealing with medical information may receive training for their agents on the Health Insurance Portability and Accountability Act ("HIPPA") related regulations. In another example, a client engaging a call center to engage in a calling campaign for a particular financial product may provide product training content for the agents prior to commencement of the campaign.

A variety of sources for training content are to be accommodated and using a third-party CDS may require mechanisms to: 1) accommodate identification and access to the CDS by the e-learning module, 2) incorporate appropriate security and authentication mechanisms, and 3) provide financial billing and settlement procedures.

The identification and access of the third-party CDS may require indicating for each course, the appropriate third-party content provider hosting the content. This could be indicated by the Administrator when configuring the system by defining content provider names and their associated address. The TCD may indicate for each course the content provider name, which could be resolved to a URL for accessing the content provider.

The third-party content provider may require validation for each agent allowed to connect with the third-party content provider. Mechanisms maybe required for the e-learning module to convey the agent's credentials, or a secondary set of credentials so that the agent is not required to log-in. Further, when indicating to the third-party CDS what course should be provided to the agent, the course indication may have to match to the course identification scheme used by the third-party content provider. This can be done using translation tables as is known to those skilled in the art. This also can be maintained in the TCD.

In addition, the call center may contract out for various training programs with the same provider at various times for the same set of agents. This may require identification of an appropriate contract for services when establishing the training. For example, a call center may negotiate two contracts for receiving different training content for its agents. It may be advantageous to reference which contract is involved when an agent receives training content. Further, financial settlement procedures may be incorporated for receiving content from a third-party source. This allows invoicing and payments to be made in advance, periodically, or for each course downloaded.

Figure 24:
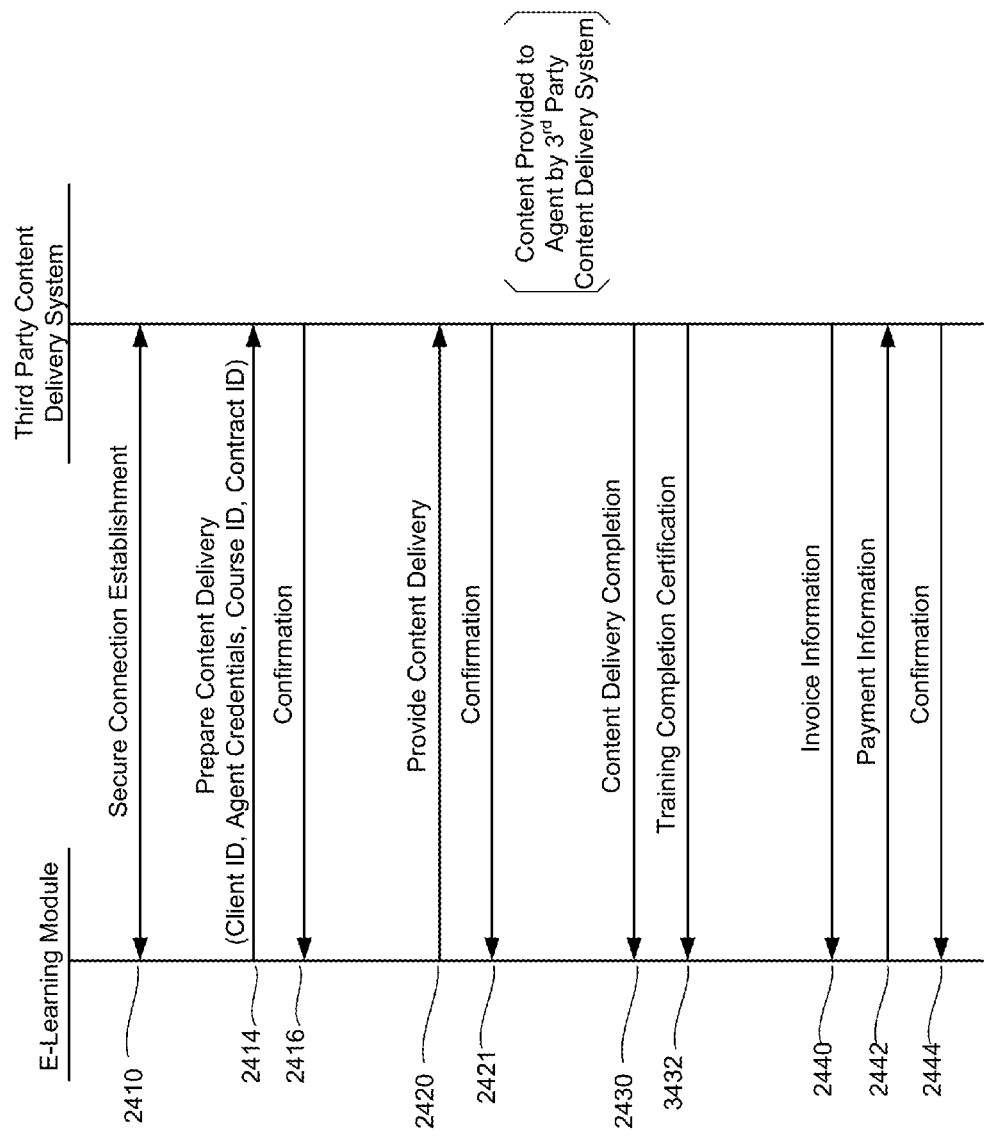
FIG. 24 illustrates another embodiment of a message flow associated with delivery of training content involving a third-party content provider.

One possible messaging flow illustrating additional information to be exchanged between the e-learning module and the third-party content delivery system is shown in FIG. 24. The initial messaging 2410 may involve messaging for establishment of a secure connection. This can use existing secure protocols, digital signatures, digests, or other mechanisms to ensure that the information that will be exchanged is secure. This is particularly pertinent if financial settlement information will be later exchanged.

Next, messaging for preparing for content delivery 2414 may indicate a client identifier (e.g., the call center provider), the agent identifier and credentials, the course identification, and a contract identifier. This allows the content provider to identify the client, the agent, the course, and the contract governing the delivery of information. A confirmation message 2416 is provided by the third-party content delivery system in response.

Messages 2420 and 2421 request content delivery and confirm the same. No new data elements may be required in this embodiment for requesting content delivery. Upon completion of training indicated by message 2430, a training completion certification may be sent that certifies completion of training. In one embodiment, this certificate is proof itself that training was provided and completed by the agent (similar in concept to a diploma). This certificate can be viewed as a "receipt" of training delivery, and further may be used to prove that the agent received training. For example, in order to demonstrate compliance with regulations by showing that agents received certain training, the certification can be used as proof of training. Finally, additional messaging may be used to provide financial settlement between the call center and the third-party content provider, including transferring an invoice in message 2440 from the content provider and providing payment information 2442. A final confirmation message 2444 may also be involved.

The certificate of training may be provided by the CDS to the e-learning module, and, in turn, may be provided by the e-learning module for storage into the agent training profile. In certain embodiments, the certificate of training may incorporate the appropriate authentication data to ensure that it represents a valid certificate. A copy of the certificate or associated authentication data may also be kept by the CDS 1120 to facilitate subsequent verification. In some embodiments, a copy may be emailed or otherwise communicated to the agent as evidence of completing the course.

The logical operations described herein are implemented as a sequence of computer implemented acts or one or more program modules running on a computing system and/or as interconnected machine logic circuits or circuit modules within the computing system. The implementation is a matter of choice dependent on the performance and other requirements of the computing system. Accordingly, the logical operations described herein are referred to variously as states, operations, acts, or modules. These operations, acts, and modules may be implemented in software, in firmware, in special purpose digital logic, and any combination thereof. Greater or fewer operations may be performed than shown in the figures and described herein. These operations may also be performed in a different order than those described herein.

VARIOUS EMBODIMENTS

Figure 26:
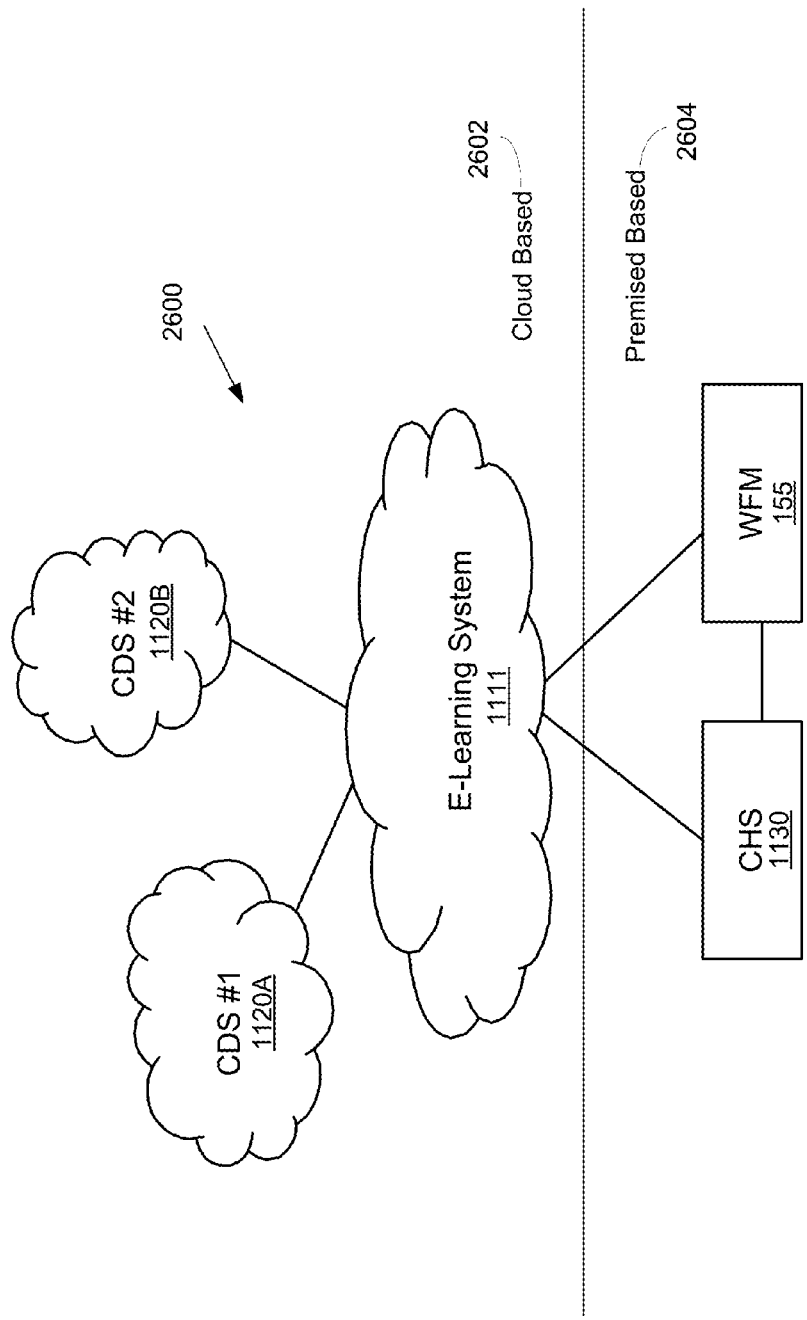
FIG. 26 illustrates one embodiment of a premised-based and cloud-based deployment.

In one embodiment, the components shown in FIG. 11A may all be deployed at the premises of a call center. In another embodiment, all the components may be deployed in a hosted manner, and the components are shared by various users. In other embodiments, various components may be deployed in a hybrid manner, where some components are premised based and some are hosted. FIG. 26 illustrates one embodiment of a hybrid arrangement 2600.

In FIG. 26, the hybrid arrangement involves certain components being hosted, or cloud-based 2602, and other components being premised-based 2604. Specifically, the e-learning system 156, which comprises the various e-learning modules and other modules, can be provided in a hosted manner to a variety of premise-based call centers. The e-learning system 156 can access other cloud based service providers, such as first content delivery server 1120A or a second content delivery server 1120B. In this embodiment, the e-learning system 156 interacts with the CHS 1130 and the WFM 155, which are premised based. Since the agent training may not occur every day, this arrangement allows a call center to receive the services of the e-learning system 156 without having to deploy additional hardware or manage the software associated with it for infrequent use.

The various deployments may also have varying levels of integration between the components. In a fully integrated system, the operation of the CHS is integrated with the scheduling of a training session, as well as receiving updated agent skill levels once the training session is completed. Further, in a fully integrated system, an agent can seamless transition from call handling to training without having to log-out from the CHS and log-in to the CDS. In other embodiments, the CHS or CDS may not be fully integrated. However, not all of the components need to be fully integrated in order to practice the principles and technologies disclosed herein.

Exemplary Computer Processing Device

Figure 25:
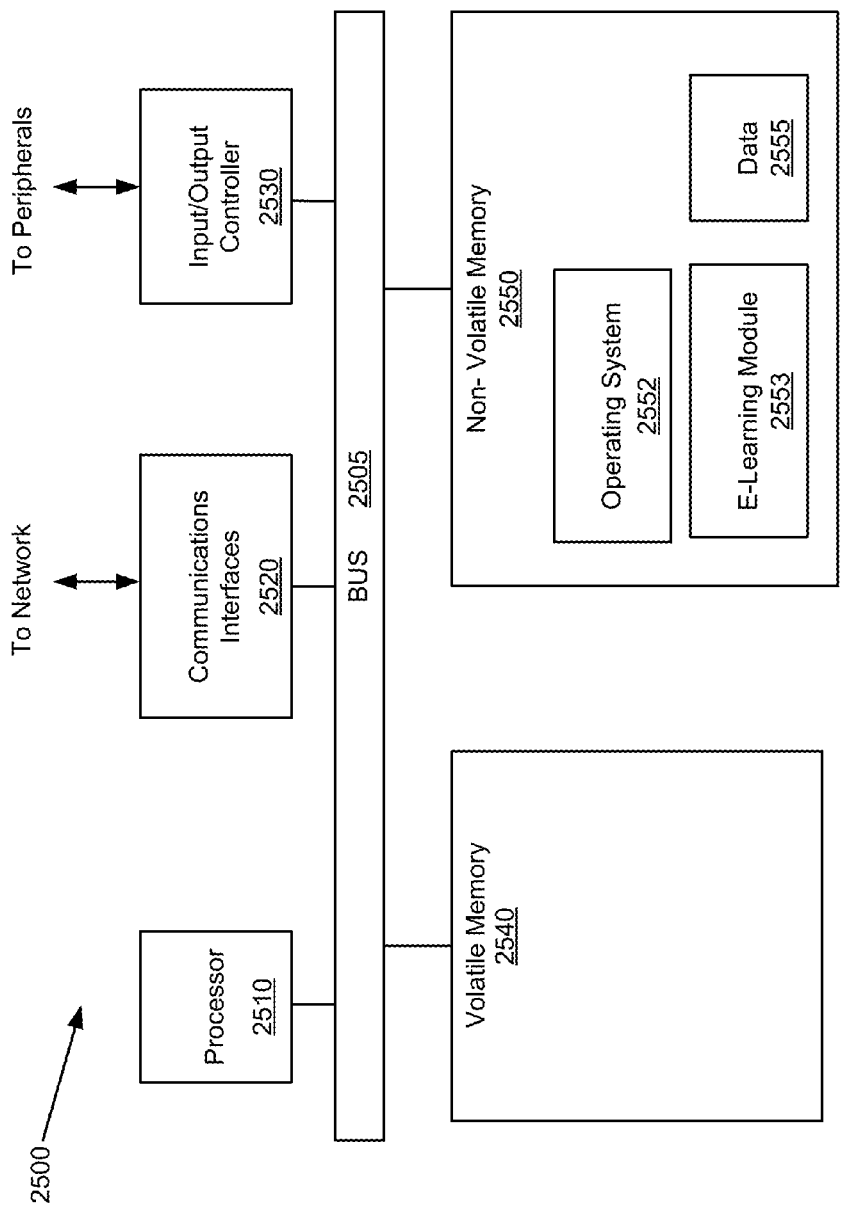

As discussed in conjunction with FIG. 1, the call center architecture 100 may comprise various components, such as a computer processing device, that form the basis of the components described previously. FIG. 25 is an exemplary schematic diagram of a computer processing system that may be used in an embodiment of the call center architecture to practice the technologies disclosed herein. FIG. 25 provides an exemplary schematic of a processing system 2500, which could represent individually or in combination, for example, the ACD 130, CTI server 145, WFM 155, agent computer 160*a*, or other components previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein. In one embodiment, the e-learning module is incorporated into the WFM and augments the functionality typically found in an WFM.

As shown in FIG. 25, the processing system 2500 may include one or more processors 2510 that may communicate with other elements within the processing system 2500 via a bus 2505. The processor 2510 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 2500 may also include one or more communications interfaces 2520 for communicating data via the local network 170 with various external devices, such as other servers of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 2530 may also communicate with one or more input devices or peripherals using an interface 2535, such as, but not limited to: a keyboard, a mouse, a touch screen/display input, microphone, pointing device, etc. The input/output controller 2530 may also communicate with output devices or peripherals, such as displays, printers, speakers, headsets, banner displays, etc. These may be used, in part, to receive Administrator input, including for interacting with the manual agent selection module.

The processor 2510 may be configured to execute instructions stored in volatile memory 2540, non-volatile memory 2550, or other forms of computer readable storage media accessible to the processor 2510. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 2550 may store program code and data, which also may be loaded into the volatile memory 2540 at execution time. Specifically, the non-volatile memory 2550 may store one or more program modules such as the e-learning module 2553 (including the other above referenced modules) and/or operating system code 2552 containing instructions for performing the process and/or functions associated with the technologies disclosed herein. The e-learning module 2553 may also access, generate, or store data 2555, including the data described above in conjunction with the training process and agent training profil, in the non-volatile memory 2550, as well as in the volatile memory 2540. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 2510. These may form a part of, or may interact with, the e-learning module 2553.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system for providing training content during a training session for an agent wherein the training session has either a fixed-time training format or a flex-time training format, the system comprising:
    a workforce manager ("WFM") configured to
        generate a work schedule for the agent, the work schedule comprising a shift for the agent, the shift comprising a work start time and a work end time,
        schedule the training session for the agent during the shift in response to a request for scheduling the training session having the fixed-time training format, wherein the training session having the fixed-time training format is associated with a training session start time and a training session end time,
        provide a beginning-of-training session indication associated with the training session start time to a call handler system ("CHS") when the training session has the fixed-time training format, and
        provide an end-of-training session indication associated with the training session end time to the CHS when the training session has the fixed-time training format,
    wherein the CHS is configured to
        process calls involving the agent during the shift for the agent, wherein the CHS is further configured to suspend offering calls associated with the agent in response to receiving the beginning-of-training session indication from the WFM at the beginning of the training session when the training session has the fixed-time training format and resume offering calls associated with the agent in response to receiving the end-of-training session indication received from the WFM after the training session when the training session has the fixed-time training format;
    a content delivery system ("CDS") configured to
        receive agent identification data identifying the agent and an indication of the training content, and
        provide the training content to a computer of the agent during the training session regardless of whether the training session has the fixed-time format or the flex-time format; and
    an e-learning module configured to
        coordinate delivery of the training content from the CDS to the computer at the training session start time when the training session has the fixed-time training format, and
        coordinate delivery of the training content from the CDS to the computer when the training session has the flex-time training format.

2. The system of claim 1 wherein the e-learning module comprises:
    a selection module configured to receive input from an administrator to select the agent and produce a selected agent list comprising the agent identification data;
    a registration module configured to process the selected agent list to produce a registered agent training list comprising the agent identification data;
    an interface module configured to provide the indication of the training content and the agent identification data of the agent to the CDS; and
    a post-training reporting module configure to update an agent training profile associated with the agent identification data in response to a training completed indication generated by the CDS.

3. The system of claim 1, wherein training context data is maintained by the system and used by a workflow manager to coordinate delivery of training content.

4. The system of claim 3, wherein the agent is associated with a record structure comprising the training context data that is maintained by the e-learning module.

5. The system of claim 1, wherein the WFM provides the beginning-of-training indication to the computer used by the agent.

6. The system of claim 1, wherein the e-learning module provides a URL to the computer used by the agent to access the training content provided by the CDS.

7. The system of claim 1, wherein the e-learning module is further configured to coordinate with the CDS the provision of the training session having a flex-time format to the agent at an unscheduled time.

8. The system of claim 1, wherein the e-learning module is further configured to coordinate with the CDS the provision of the training session having a fixed-time format to the agent at a scheduled time.

\* \* \* \* \*